US012681587B2

(12) United States Patent
Hindi et al.

(10) Patent No.: US 12,681,587 B2
(45) Date of Patent: Jul. 14, 2026

(54) ATTENTION AWARE VIRTUAL ASSISTANT DISMISSAL

(71) Applicant: Apple Inc., Cupertino, CA (US)

(72) Inventors: Musa M. Hindi, Santa Clara, CA (US); Rohit Dasari, San Francisco, CA (US); Trungtin Tran, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/261,850

(22) Filed: Jul. 7, 2025

(65) Prior Publication Data

US 2025/0373699 A1 Dec. 4, 2025

Related U.S. Application Data

(63) Continuation of application No. 18/773,295, filed on Jul. 15, 2024, now Pat. No. 12,386,434, which is a
(Continued)

(51) Int. Cl.
*G06F 3/0346* (2013.01)
*G06F 3/01* (2006.01)
(Continued)

(52) U.S. Cl.
CPC ............ *G06F 3/0346* (2013.01); *G06F 3/013* (2013.01); *G06F 3/0414* (2013.01); *G06F 3/167* (2013.01);
(Continued)

(58) Field of Classification Search
CPC ...... G06F 3/0346; G06F 3/013; G06F 3/0414; G06F 3/167; G10L 15/07; G10L 15/22; G10L 25/78; H04L 67/141; H04L 67/143
See application file for complete search history.

(56) References Cited

U.S. PATENT DOCUMENTS

| | | | |
|---|---|---|---|
| 8,934,645 | B2 | 1/2015 | Coffman et al. |
| 8,942,434 | B1 | 1/2015 | Karakotsios et al. |

(Continued)

FOREIGN PATENT DOCUMENTS

| | | | |
|---|---|---|---|
| AU | 2015271922 A1 | 1/2016 | |
| AU | 2015297035 A1 | 11/2016 | |

(Continued)

OTHER PUBLICATIONS

"Adding Environments", Available online at: https://manual.keyshot.com/manual/environments/adding-environments/, Retrieved on Jun. 9, 2023, 2 pages.

(Continued)

*Primary Examiner* — Michael Pervan
(74) *Attorney, Agent, or Firm* — YHE Law LLP

(57) ABSTRACT

Systems and processes for operating an intelligent automated assistant are provided. An example process includes initiating a virtual assistant session responsive to receiving user input. In accordance with initiating the virtual assistant session, the process includes determining, based on data obtained using one or more sensors of the electronic device, whether one or more criteria representing expressed user disinterest are satisfied. In accordance with determining that the one or more criteria representing expressed user disinterest are satisfied prior to a first time, the process includes automatically deactivating the virtual assistant session prior to the first time. The first time is defined by a setting of the electronic device. In accordance with determining that the one or more criteria representing expressed user disinterest are not satisfied prior to the first time, the process includes automatically deactivating the virtual assistant session at the first time.

30 Claims, 19 Drawing Sheets

Related U.S. Application Data continuation of application No. 18/130,346, filed on Apr. 3, 2023, now Pat. No. 12,061,752, which is a continuation of application No. 17/836,907, filed on Jun. 9, 2022, now Pat. No. 11,630,525, which is a continuation of application No. 17/322,115, filed on May 17, 2021, now Pat. No. 11,360,577, which is a continuation of application No. 16/885,027, filed on May 27, 2020, now Pat. No. 11,009,970, which is a continuation of application No. 16/039,099, filed on Jul. 18, 2018, now Pat. No. 10,684,703.

(60) Provisional application No. 62/679,332, filed on Jun. 1, 2018.

(51) Int. Cl.

| | |
|---|---|
| *G06F 3/041* | (2006.01) |
| *G06F 3/16* | (2006.01) |
| *G10L 15/07* | (2013.01) |
| *G10L 15/22* | (2006.01) |
| *G10L 25/78* | (2013.01) |
| *H04L 67/141* | (2022.01) |
| *H04L 67/143* | (2022.01) |

(52) U.S. Cl.
CPC .............. *G10L 15/07* (2013.01); *G10L 15/22* (2013.01); *G10L 25/78* (2013.01); *H04L 67/141* (2013.01); *H04L 67/143* (2013.01)

(56) References Cited

U.S. PATENT DOCUMENTS

| | | | |
|---|---|---|---|
| 8,943,036 | B1 | 1/2015 | Coudron |
| 8,943,582 | B1 | 1/2015 | Zhou et al. |
| 8,947,323 | B1 | 2/2015 | Raffle et al. |
| 8,954,425 | B2 | 2/2015 | Xiao et al. |
| 8,958,854 | B1 | 2/2015 | Morley et al. |
| 8,970,478 | B2 | 3/2015 | Johansson |
| 8,970,629 | B2 | 3/2015 | Kim et al. |
| 8,994,718 | B2 | 3/2015 | Latta et al. |
| 8,995,767 | B2 | 3/2015 | Graham |
| 9,002,703 | B1 | 4/2015 | Crosley |
| 9,007,301 | B1 | 4/2015 | Raffle et al. |
| 9,108,109 | B2 | 8/2015 | Pare et al. |
| 9,123,272 | B1 | 9/2015 | Baldwin et al. |
| 9,135,333 | B2 | 9/2015 | Cameron et al. |
| 9,152,185 | B2 | 10/2015 | Karakotsios et al. |
| 9,158,115 | B1 | 10/2015 | Worley et al. |
| 9,164,975 | B2 | 10/2015 | Milewski et al. |
| 9,185,062 | B1 | 11/2015 | Yang et al. |
| 9,189,611 | B2 | 11/2015 | Wssingbo |
| 9,195,746 | B2 | 11/2015 | Tomko et al. |
| 9,196,072 | B2 | 11/2015 | Oh et al. |
| 9,196,219 | B1 | 11/2015 | Zhou et al. |
| 9,201,500 | B2 | 12/2015 | Srinivasan et al. |
| 9,201,585 | B1 | 12/2015 | Karakotsios et al. |
| 9,207,835 | B1 | 12/2015 | Yang et al. |
| 9,207,852 | B1 | 12/2015 | Zhou et al. |
| 9,223,415 | B1 | 12/2015 | Zhou et al. |
| 9,230,368 | B2 | 1/2016 | Keane et al. |
| 9,232,353 | B2 | 1/2016 | Bozarth et al. |
| 9,237,334 | B2 | 1/2016 | Cheng et al. |
| 9,239,879 | B2 | 1/2016 | Pan et al. |
| 9,241,149 | B2 | 1/2016 | Redmann |
| 9,256,785 | B2 | 2/2016 | Qvarfordt |
| 9,271,111 | B2 | 2/2016 | Blanksteen |
| 9,274,597 | B1 | 3/2016 | Karakotsios et al. |
| 9,282,222 | B1 | 3/2016 | Karakotsios et al. |
| 9,286,287 | B1 | 3/2016 | Tierney |
| 9,293,118 | B2 | 3/2016 | Matsui |
| 9,294,757 | B1 | 3/2016 | Lewis et al. |
| 9,298,334 | B1 | 3/2016 | Zimmerman et al. |
| 9,316,827 | B2 | 4/2016 | Lindley et al. |

| | | | |
|---|---|---|---|
| 9,336,514 | B2 | 5/2016 | Gittleman |
| 9,348,458 | B2 | 5/2016 | Steve et al. |
| 9,355,301 | B2 | 5/2016 | Karakotsios et al. |
| 9,383,189 | B2 | 7/2016 | Bridges et al. |
| 9,384,594 | B2 | 7/2016 | Maciocci et al. |
| 9,396,580 | B1 | 7/2016 | Nowrouzezahrai et al. |
| 9,400,559 | B2 | 7/2016 | Latta et al. |
| 9,400,575 | B1 | 7/2016 | Karakotsios et al. |
| 9,426,193 | B2 | 8/2016 | Goodman |
| 9,436,357 | B2 | 9/2016 | Pallakoff et al. |
| 9,437,047 | B2 | 9/2016 | Chang et al. |
| 9,448,635 | B2 | 9/2016 | Macdougall et al. |
| 9,448,687 | B1 | 9/2016 | Mckenzie et al. |
| 9,449,427 | B1 | 9/2016 | Baldwin et al. |
| 9,465,479 | B2 | 10/2016 | Cho et al. |
| 9,491,374 | B1 | 11/2016 | Avrahami et al. |
| 9,495,801 | B2 | 11/2016 | Ebstyne et al. |
| 9,501,873 | B2 | 11/2016 | Salter et al. |
| 9,519,371 | B2 | 12/2016 | Nishida |
| 9,524,347 | B1 | 12/2016 | Jung et al. |
| 9,526,127 | B1 | 12/2016 | Taubman et al. |
| 9,544,257 | B2 | 1/2017 | Ogundokun et al. |
| 9,563,272 | B2 | 2/2017 | Karakotsios et al. |
| 9,563,331 | B2 | 2/2017 | Poulos et al. |
| 9,575,559 | B2 | 2/2017 | Andrysco |
| 9,588,651 | B1 | 3/2017 | Buchanan et al. |
| 9,612,722 | B2 | 4/2017 | Miller et al. |
| 9,619,105 | B1 | 4/2017 | Dal Mutto |
| 9,619,519 | B1 | 4/2017 | Dorner |
| 9,628,844 | B2 | 4/2017 | Conrad et al. |
| 9,653,067 | B2 | 5/2017 | Brooks et al. |
| 9,659,069 | B2 | 5/2017 | Runov et al. |
| 9,672,588 | B1 | 6/2017 | Doucette et al. |
| 9,681,112 | B2 | 6/2017 | Son |
| 9,684,372 | B2 | 6/2017 | Xun et al. |
| 9,691,000 | B1 | 6/2017 | Karakotsios et al. |
| 9,720,456 | B1 | 8/2017 | Karakotsios et al. |
| 9,734,402 | B2 | 8/2017 | Jang et al. |
| 9,740,297 | B2 | 8/2017 | Karakotsios et al. |
| 9,754,016 | B1 | 9/2017 | Bozarth et al. |
| 9,778,814 | B2 | 10/2017 | Ambrus et al. |
| 9,779,517 | B2 | 10/2017 | Ballard et al. |
| 9,786,281 | B1 | 10/2017 | Adams et al. |
| 9,829,708 | B1 | 11/2017 | Asada |
| 9,851,866 | B2 | 12/2017 | Goossens et al. |
| 9,864,498 | B2 | 1/2018 | Olsson et al. |
| 9,870,130 | B2 | 1/2018 | Schubert et al. |
| 9,886,087 | B1 | 2/2018 | Wald et al. |
| 9,933,833 | B2 | 4/2018 | Tu et al. |
| 9,933,937 | B2 | 4/2018 | Lemay et al. |
| 9,934,614 | B2 | 4/2018 | Ramsby et al. |
| 9,946,803 | B2 | 4/2018 | Karakotsios et al. |
| 9,948,989 | B1 | 4/2018 | Hannum et al. |
| 9,952,042 | B2 | 4/2018 | Abovitz et al. |
| 9,978,180 | B2 | 5/2018 | Margolis et al. |
| 9,990,002 | B2 | 6/2018 | Kim |
| 9,998,410 | B1 | 6/2018 | Morris |
| 10,001,838 | B2 | 6/2018 | Karakotsios et al. |
| 10,019,984 | B2 | 7/2018 | Kuo et al. |
| 10,049,460 | B2 | 8/2018 | Romano et al. |
| 10,101,803 | B2 | 10/2018 | Faaborg et al. |
| 10,102,675 | B2 | 10/2018 | Fan et al. |
| 10,157,040 | B2 | 12/2018 | Ballinger et al. |
| 10,175,483 | B2 | 1/2019 | Salter et al. |
| 10,180,572 | B2 | 1/2019 | Osterhout et al. |
| 10,192,347 | B2 | 1/2019 | Bui et al. |
| 10,203,764 | B2 | 2/2019 | Katz et al. |
| 10,210,867 | B1 | 2/2019 | Chan et al. |
| 10,255,917 | B2 | 4/2019 | Carey et al. |
| 10,307,671 | B2 | 6/2019 | Barney et al. |
| 10,319,352 | B2 | 6/2019 | Kar et al. |
| 10,353,532 | B1 | 7/2019 | Holz et al. |
| 10,360,300 | B2 | 7/2019 | Sarikaya et al. |
| 10,394,320 | B2 | 8/2019 | George-svahn et al. |
| 10,395,772 | B1 | 8/2019 | Lucas et al. |
| 10,448,189 | B2 | 10/2019 | Link |
| 10,488,941 | B2 | 11/2019 | Lam et al. |
| 10,489,651 | B2 | 11/2019 | Luccin et al. |
| 10,499,044 | B1 | 12/2019 | Giokaris et al. |

(56) References Cited

U.S. PATENT DOCUMENTS

| | | | |
|---|---|---|---|
| 10,534,439 B2 | 1/2020 | Raffa et al. |
| 10,545,584 B2 | 1/2020 | Tome et al. |
| 10,564,714 B2 | 2/2020 | Marggraff et al. |
| 10,565,448 B2 | 2/2020 | Bell et al. |
| 10,571,715 B2 | 2/2020 | Rizzo et al. |
| 10,579,912 B2 | 3/2020 | Holtmann |
| 10,635,683 B2 | 4/2020 | Runov et al. |
| 10,642,368 B2 | 5/2020 | Chen |
| 10,645,494 B1 | 5/2020 | Oh et al. |
| 10,664,043 B2 | 5/2020 | Ikuta et al. |
| 10,664,048 B2 | 5/2020 | Cieplinski et al. |
| 10,664,050 B2 | 5/2020 | Alcaide et al. |
| 10,671,241 B1 | 6/2020 | Jia et al. |
| 10,678,403 B2 | 6/2020 | Duarte et al. |
| 10,691,216 B2 | 6/2020 | Geisner et al. |
| 10,699,488 B1 | 6/2020 | Terrano |
| 10,701,661 B1 | 6/2020 | Coelho et al. |
| 10,708,965 B1 | 7/2020 | Subramanian et al. |
| 10,712,900 B2 | 7/2020 | Osman et al. |
| 10,714,117 B2 | 7/2020 | Binder et al. |
| 10,726,631 B1 | 7/2020 | Ha |
| 10,732,721 B1 | 8/2020 | Clements |
| 10,754,434 B2 | 8/2020 | Hall et al. |
| 10,762,143 B2 | 9/2020 | Packer et al. |
| 10,762,716 B1 | 9/2020 | Paul et al. |
| 10,768,421 B1 | 9/2020 | Rosenberg et al. |
| 10,768,693 B2 | 9/2020 | Powderly et al. |
| 10,778,778 B1 | 9/2020 | Blanksteen |
| 10,798,438 B2 | 10/2020 | Conrad et al. |
| 10,824,912 B2 | 11/2020 | Joy |
| 10,846,864 B2 | 11/2020 | Kim et al. |
| 10,852,814 B1 | 12/2020 | Caron et al. |
| 10,860,096 B2 | 12/2020 | Kelly et al. |
| 10,861,242 B2 | 12/2020 | Lacey et al. |
| 10,890,967 B2 | 1/2021 | Stellmach et al. |
| 10,902,952 B2 | 1/2021 | Lucas et al. |
| 10,922,744 B1 | 2/2021 | Mahajan |
| 10,929,099 B2 | 2/2021 | Querze et al. |
| 10,936,148 B1 | 3/2021 | Merkl et al. |
| 10,937,425 B2 | 3/2021 | Summa et al. |
| 10,956,724 B1 | 3/2021 | Terrano |
| 10,959,090 B1 | 3/2021 | Paiz |
| 10,976,804 B1 | 4/2021 | Atlas et al. |
| 10,983,663 B2 | 4/2021 | Iglesias |
| 11,003,308 B1 | 5/2021 | Dryer et al. |
| 11,023,035 B1 | 6/2021 | Atlas et al. |
| 11,023,036 B1 | 6/2021 | Atlas et al. |
| 11,023,109 B2 | 6/2021 | Pahud et al. |
| 11,024,079 B1 | 6/2021 | Chuah et al. |
| 11,030,515 B2 | 6/2021 | Kaufmann et al. |
| 11,055,920 B1 | 7/2021 | Bramwell et al. |
| 11,056,213 B2 | 7/2021 | Beal et al. |
| 11,079,995 B1 | 8/2021 | Hulbert et al. |
| 11,082,463 B2 | 8/2021 | Felman |
| 11,119,985 B1 | 9/2021 | Alagianambi et al. |
| 11,138,798 B2 | 10/2021 | Paul et al. |
| 11,146,909 B1 | 10/2021 | Pinto et al. |
| 11,175,791 B1 | 11/2021 | Patnaikuni et al. |
| 11,176,755 B1 | 11/2021 | Tichenor et al. |
| 11,181,980 B2 | 11/2021 | Deleeuw |
| 11,195,524 B2 | 12/2021 | Mukherjee et al. |
| 11,195,534 B1 | 12/2021 | Shen et al. |
| 11,199,898 B2 | 12/2021 | Blume et al. |
| 11,200,742 B1 | 12/2021 | Post et al. |
| 11,204,678 B1 | 12/2021 | Baker et al. |
| 11,210,863 B1 | 12/2021 | Yan et al. |
| 11,221,669 B2 * | 1/2022 | White .................... G06N 20/10 |
| 11,232,643 B1 | 1/2022 | Stevens et al. |
| 11,235,183 B1 | 2/2022 | Dashevsky et al. |
| 11,240,390 B2 | 2/2022 | Kubota |
| 11,243,734 B2 | 2/2022 | Boissière et al. |
| 11,246,002 B1 | 2/2022 | Donley et al. |
| 11,249,556 B1 | 2/2022 | Schwarz et al. |
| 11,250,844 B2 | 2/2022 | Mont-Reynaud et al. |
| 11,262,885 B1 | 3/2022 | Burckel |
| 11,282,497 B2 | 3/2022 | Wang et al. |
| 11,294,472 B2 | 4/2022 | Tang et al. |
| 11,294,475 B1 | 4/2022 | Pinchon et al. |
| 11,307,653 B1 | 4/2022 | Qian et al. |
| 11,340,756 B2 | 5/2022 | Faulkner et al. |
| 11,343,420 B1 | 5/2022 | Herz et al. |
| 11,347,319 B2 | 5/2022 | Goel et al. |
| 11,347,525 B1 | 5/2022 | Graham et al. |
| 11,348,300 B2 | 5/2022 | Zimmermann et al. |
| 11,379,033 B2 | 7/2022 | O'Hern et al. |
| 11,409,363 B2 | 8/2022 | Chen et al. |
| 11,416,080 B2 | 8/2022 | Heo et al. |
| 11,423,886 B2 | 8/2022 | Gruber et al. |
| 11,423,898 B2 | 8/2022 | Shum et al. |
| 11,432,095 B1 | 8/2022 | Satongar et al. |
| 11,461,973 B2 | 10/2022 | Pinchon |
| 11,496,571 B2 | 11/2022 | Berliner et al. |
| 11,531,402 B1 | 12/2022 | Stolzenberg |
| 11,531,459 B2 | 12/2022 | Poupyrev et al. |
| 11,532,397 B2 | 12/2022 | Lucas et al. |
| 11,537,997 B2 | 12/2022 | Vangala et al. |
| 11,551,663 B1 | 1/2023 | Bissell et al. |
| 11,557,102 B2 | 1/2023 | Palangie et al. |
| 11,567,625 B2 | 1/2023 | Faulkner et al. |
| 11,573,363 B2 | 2/2023 | Zou et al. |
| 11,574,452 B2 | 2/2023 | Berliner et al. |
| 11,599,239 B2 | 3/2023 | Rockel et al. |
| 11,615,596 B2 | 3/2023 | Faulkner et al. |
| 11,630,525 B2 | 4/2023 | Hindi et al. |
| 11,641,460 B1 | 5/2023 | Geusz et al. |
| 11,669,155 B2 | 6/2023 | Bowman et al. |
| 11,681,364 B1 | 6/2023 | Zhang et al. |
| 11,683,447 B2 | 6/2023 | Lin et al. |
| 11,688,417 B2 | 6/2023 | Konzelmann et al. |
| 11,720,171 B2 | 8/2023 | Pastrana Vicente et al. |
| 11,726,551 B1 | 8/2023 | Richter |
| 11,726,577 B2 | 8/2023 | Katz |
| 11,730,226 B2 | 8/2023 | Stolarz et al. |
| 11,733,824 B2 | 8/2023 | Iskandar et al. |
| 11,762,457 B1 | 9/2023 | Ikkai et al. |
| 11,762,473 B2 | 9/2023 | Cipoletta et al. |
| 11,763,092 B2 | 9/2023 | Duong et al. |
| 11,768,544 B2 | 9/2023 | Schwarz et al. |
| 11,847,748 B2 | 12/2023 | Liu et al. |
| 11,861,136 B1 | 1/2024 | Faulkner et al. |
| 11,875,013 B2 | 1/2024 | Lemay et al. |
| 11,886,643 B2 | 1/2024 | Irie et al. |
| 11,899,845 B2 | 2/2024 | Chung et al. |
| 11,900,936 B2 | 2/2024 | Lindahl |
| 11,908,159 B2 | 2/2024 | Haapoja et al. |
| 11,909,453 B2 | 2/2024 | Javaudin et al. |
| 11,914,759 B2 | 2/2024 | Klein et al. |
| 11,922,588 B2 | 3/2024 | Fillhardt et al. |
| 11,928,263 B2 | 3/2024 | Jung et al. |
| 11,934,569 B2 | 3/2024 | Pastrana Vicente et al. |
| 11,954,242 B2 | 4/2024 | Dascola et al. |
| 11,979,836 B2 | 5/2024 | Freeman et al. |
| 11,983,326 B2 | 5/2024 | Lacey |
| 11,988,832 B2 | 5/2024 | Singh et al. |
| 11,989,965 B2 | 5/2024 | Tarighat Mehrabani |
| 11,995,301 B2 | 5/2024 | Hylak et al. |
| 11,995,457 B2 | 5/2024 | Ellis et al. |
| 12,020,667 B2 | 6/2024 | Griswold et al. |
| 12,032,803 B2 | 7/2024 | Pastrana Vicente et al. |
| 12,061,738 B2 | 8/2024 | Du et al. |
| 12,062,127 B2 | 8/2024 | Park et al. |
| 12,099,653 B2 | 9/2024 | Chawda et al. |
| 12,099,695 B1 | 9/2024 | Smith et al. |
| 12,113,948 B1 | 10/2024 | Smith et al. |
| 12,118,200 B1 | 10/2024 | Shutzberg et al. |
| 12,141,557 B2 | 11/2024 | Makkar |
| 12,145,626 B1 | 11/2024 | Gayaka et al. |
| 12,154,236 B1 | 11/2024 | Herman et al. |
| 12,159,096 B1 | 12/2024 | Penfield et al. |
| 12,165,635 B2 | 12/2024 | Gruber et al. |
| 12,217,000 B1 | 2/2025 | Setlur et al. |
| 12,236,546 B1 | 2/2025 | Lipton |
| 12,287,954 B1 | 4/2025 | Atallah et al. |
| 12,327,557 B2 | 6/2025 | Hussain et al. |

(56)　　　　References Cited

U.S. PATENT DOCUMENTS

| | | |
|---|---|---|
| 2008/0189110 A1 | 8/2008 | Freeman et al. |
| 2011/0295590 A1 | 12/2011 | Lloyd et al. |
| 2013/0109412 A1 | 5/2013 | Nguyen et al. |
| 2013/0212470 A1 | 8/2013 | Karunamuni et al. |
| 2013/0325844 A1 | 12/2013 | Plaisant |
| 2014/0033071 A1 | 1/2014 | Gruber et al. |
| 2014/0035824 A1 | 2/2014 | Bernstein et al. |
| 2014/0046922 A1 | 2/2014 | Crook et al. |
| 2014/0081633 A1 | 3/2014 | Badaskar |
| 2014/0156269 A1 | 6/2014 | Lee et al. |
| 2014/0180697 A1 | 6/2014 | Torok et al. |
| 2014/0278413 A1 | 9/2014 | Pitschel et al. |
| 2014/0365885 A1 | 12/2014 | Carson et al. |
| 2015/0006290 A1 | 1/2015 | Tomkins et al. |
| 2015/0009118 A1 | 1/2015 | Thomas et al. |
| 2015/0019970 A1 | 1/2015 | Matsubara et al. |
| 2015/0035822 A1 | 2/2015 | Arsan et al. |
| 2015/0042679 A1 | 2/2015 | Järvenpää |
| 2015/0058718 A1 | 2/2015 | Kim et al. |
| 2015/0067580 A1 | 3/2015 | Um et al. |
| 2015/0067811 A1 | 3/2015 | Agnew et al. |
| 2015/0077335 A1 | 3/2015 | Taguchi et al. |
| 2015/0095844 A1 | 4/2015 | Cho et al. |
| 2015/0097795 A1 | 4/2015 | Lisseman et al. |
| 2015/0099480 A1 | 4/2015 | Reiter |
| 2015/0121466 A1 | 4/2015 | Brands et al. |
| 2015/0123890 A1 | 5/2015 | Kapur et al. |
| 2015/0123901 A1 | 5/2015 | Schwesinger et al. |
| 2015/0128075 A1 | 5/2015 | Kempinski |
| 2015/0131850 A1 | 5/2015 | Qvarfordt |
| 2015/0133051 A1 | 5/2015 | Jamal-Syed et al. |
| 2015/0135108 A1 | 5/2015 | Pope et al. |
| 2015/0145887 A1 | 5/2015 | Forutanpour et al. |
| 2015/0149929 A1 | 5/2015 | Shepherd et al. |
| 2015/0153833 A1 | 6/2015 | Pinault et al. |
| 2015/0154291 A1 | 6/2015 | Shepherd et al. |
| 2015/0163610 A1 | 6/2015 | Sampat et al. |
| 2015/0169506 A1 | 6/2015 | Leventhal et al. |
| 2015/0177937 A1 | 6/2015 | Poletto et al. |
| 2015/0186092 A1 | 7/2015 | Francis et al. |
| 2015/0193982 A1 | 7/2015 | Mihelich et al. |
| 2015/0195208 A1 | 7/2015 | Ozawa |
| 2015/0198940 A1 | 7/2015 | Hwang et al. |
| 2015/0205106 A1 | 7/2015 | Norden |
| 2015/0212576 A1 | 7/2015 | Ambrus et al. |
| 2015/0220152 A1 | 8/2015 | Tait et al. |
| 2015/0221132 A1 | 8/2015 | Kruglick |
| 2015/0242095 A1 | 8/2015 | Sonnenberg |
| 2015/0254905 A1 | 9/2015 | Ramsby et al. |
| 2015/0262428 A1 | 9/2015 | Tatzgern et al. |
| 2015/0277575 A1 | 10/2015 | Ataee et al. |
| 2015/0277581 A1 | 10/2015 | Coombs |
| 2015/0302334 A1 | 10/2015 | Thomas et al. |
| 2015/0302847 A1 | 10/2015 | Yun et al. |
| 2015/0317831 A1 | 11/2015 | Ebstyne et al. |
| 2015/0317832 A1 | 11/2015 | Ebstyne et al. |
| 2015/0331240 A1 | 11/2015 | Poulos et al. |
| 2015/0331576 A1 | 11/2015 | Piya et al. |
| 2015/0332091 A1 | 11/2015 | Kim et al. |
| 2015/0356971 A1 | 12/2015 | Stolcke et al. |
| 2015/0370323 A1 | 12/2015 | Cieplinski et al. |
| 2015/0381974 A1 | 12/2015 | Hoffman et al. |
| 2016/0012642 A1 | 1/2016 | Lee et al. |
| 2016/0015470 A1 | 1/2016 | Border |
| 2016/0018898 A1 | 1/2016 | Tu et al. |
| 2016/0025971 A1 | 1/2016 | Crow et al. |
| 2016/0026243 A1 | 1/2016 | Bertram et al. |
| 2016/0026253 A1 | 1/2016 | Bradski et al. |
| 2016/0036996 A1 | 2/2016 | Midholt et al. |
| 2016/0041391 A1 | 2/2016 | Van et al. |
| 2016/0041597 A1 | 2/2016 | Graham et al. |
| 2016/0043974 A1 | 2/2016 | Purcell et al. |
| 2016/0050642 A1 | 2/2016 | Brown et al. |
| 2016/0062636 A1 | 3/2016 | Jung et al. |
| 2016/0065519 A1 | 3/2016 | Waltermann et al. |
| 2016/0066277 A1 | 3/2016 | Yang et al. |
| 2016/0077710 A1 | 3/2016 | Lewis et al. |
| 2016/0080552 A1 | 3/2016 | Keating et al. |
| 2016/0085301 A1 | 3/2016 | Lopez |
| 2016/0093108 A1 | 3/2016 | Mao et al. |
| 2016/0098093 A1 | 4/2016 | Cheon et al. |
| 2016/0098094 A1 | 4/2016 | Minkkinen |
| 2016/0105795 A1 | 4/2016 | Hou et al. |
| 2016/0127690 A1 | 5/2016 | Kaehler et al. |
| 2016/0133044 A1 | 5/2016 | Lynch |
| 2016/0133052 A1 | 5/2016 | Choi et al. |
| 2016/0170507 A1 | 6/2016 | Miller et al. |
| 2016/0171304 A1 | 6/2016 | Golding et al. |
| 2016/0173683 A1 | 6/2016 | Abreu et al. |
| 2016/0179191 A1 | 6/2016 | Kim et al. |
| 2016/0179336 A1 | 6/2016 | Ambrus et al. |
| 2016/0180737 A1 | 6/2016 | Clark et al. |
| 2016/0188902 A1 | 6/2016 | Jin |
| 2016/0189426 A1 | 6/2016 | Thomas et al. |
| 2016/0193104 A1 | 7/2016 | Du |
| 2016/0196692 A1 | 7/2016 | Kjallstrom et al. |
| 2016/0203729 A1 | 7/2016 | Zilca |
| 2016/0210784 A1 | 7/2016 | Ramsby et al. |
| 2016/0216768 A1 | 7/2016 | Goetz et al. |
| 2016/0224122 A1 | 8/2016 | Dietz et al. |
| 2016/0224524 A1 | 8/2016 | Kay et al. |
| 2016/0225012 A1 | 8/2016 | Ha et al. |
| 2016/0225164 A1 | 8/2016 | Tomlin et al. |
| 2016/0227267 A1 | 8/2016 | Tsurutani et al. |
| 2016/0253063 A1 | 9/2016 | Critchlow |
| 2016/0253821 A1 | 9/2016 | Romano et al. |
| 2016/0275702 A1 | 9/2016 | Reynolds et al. |
| 2016/0291922 A1 | 10/2016 | Montgomerie et al. |
| 2016/0306434 A1 | 10/2016 | Ferrin |
| 2016/0307562 A1 | 10/2016 | Zhao et al. |
| 2016/0309081 A1 | 10/2016 | Frahm et al. |
| 2016/0313890 A1 | 10/2016 | Walline et al. |
| 2016/0320849 A1 | 11/2016 | Koo |
| 2016/0328667 A1 | 11/2016 | Macciola et al. |
| 2016/0334940 A1 | 11/2016 | Kandadai et al. |
| 2016/0350973 A1 | 12/2016 | Shapira et al. |
| 2016/0352887 A1 | 12/2016 | Na et al. |
| 2016/0357266 A1 | 12/2016 | Patel et al. |
| 2016/0364895 A1 | 12/2016 | Santossio et al. |
| 2016/0370858 A1 | 12/2016 | Leppanen et al. |
| 2016/0372117 A1 | 12/2016 | Klose et al. |
| 2016/0373647 A1 | 12/2016 | García Morate et al. |
| 2016/0373714 A1 | 12/2016 | Lee et al. |
| 2016/0379409 A1 | 12/2016 | Gavriliuc et al. |
| 2017/0011424 A1 | 1/2017 | Abou-Rizk et al. |
| 2017/0032568 A1 | 2/2017 | Gharpure et al. |
| 2017/0038829 A1 | 2/2017 | Lanier et al. |
| 2017/0038837 A1 | 2/2017 | Faaborg et al. |
| 2017/0038849 A1 | 2/2017 | Hwang |
| 2017/0039770 A1 | 2/2017 | Lanier et al. |
| 2017/0047064 A1 | 2/2017 | Kirihara |
| 2017/0048341 A1 | 2/2017 | Karakotsios et al. |
| 2017/0052393 A1 | 2/2017 | Kweon |
| 2017/0052595 A1 | 2/2017 | Poulos et al. |
| 2017/0053383 A1 | 2/2017 | Heo |
| 2017/0060230 A1 | 3/2017 | Faaborg et al. |
| 2017/0061694 A1 | 3/2017 | Giraldi et al. |
| 2017/0083202 A1 | 3/2017 | Yang et al. |
| 2017/0090566 A1 | 3/2017 | George-svahn et al. |
| 2017/0109930 A1 | 4/2017 | Holzer et al. |
| 2017/0115728 A1 | 4/2017 | Park et al. |
| 2017/0123487 A1 | 5/2017 | Hazra et al. |
| 2017/0131964 A1 | 5/2017 | Baek et al. |
| 2017/0132694 A1 | 5/2017 | Damy |
| 2017/0132822 A1 | 5/2017 | Marschke et al. |
| 2017/0139471 A1 | 5/2017 | Bury et al. |
| 2017/0146801 A1 | 5/2017 | Stempora |
| 2017/0147180 A1 | 5/2017 | Yoon et al. |
| 2017/0148339 A1 | 5/2017 | Van Curen et al. |
| 2017/0153866 A1 | 6/2017 | Grinberg et al. |
| 2017/0154326 A1 | 6/2017 | Jo et al. |
| 2017/0162177 A1 | 6/2017 | Lebeck et al. |
| 2017/0169616 A1 | 6/2017 | Wiley et al. |
| 2017/0177074 A1 | 6/2017 | Spencer-harper et al. |

(56)　　　　References Cited

U.S. PATENT DOCUMENTS

| | | |
|---|---|---|
| 2017/0177738 A1 | 6/2017 | Goldman |
| 2017/0178392 A1 | 6/2017 | Zuccarino et al. |
| 2017/0206691 A1 | 7/2017 | Harrises et al. |
| 2017/0206692 A1 | 7/2017 | Sheaffer et al. |
| 2017/0212583 A1 | 7/2017 | Krasadakis |
| 2017/0213388 A1 | 7/2017 | Margolis et al. |
| 2017/0221264 A1 | 8/2017 | Perry |
| 2017/0228130 A1 | 8/2017 | Palmaro |
| 2017/0236332 A1 | 8/2017 | Kipman et al. |
| 2017/0243352 A1 | 8/2017 | Kutliroff et al. |
| 2017/0249355 A1 | 8/2017 | Kang et al. |
| 2017/0251143 A1 | 8/2017 | Peruch et al. |
| 2017/0256096 A1 | 9/2017 | Faaborg et al. |
| 2017/0262544 A1 | 9/2017 | Brette et al. |
| 2017/0263058 A1 | 9/2017 | Muta |
| 2017/0269712 A1 | 9/2017 | Forsblom et al. |
| 2017/0270174 A1 | 9/2017 | Runov et al. |
| 2017/0277396 A1 | 9/2017 | Chung et al. |
| 2017/0285737 A1 | 10/2017 | Khalid et al. |
| 2017/0287215 A1 | 10/2017 | Lalonde et al. |
| 2017/0287225 A1 | 10/2017 | Powderly et al. |
| 2017/0302903 A1 | 10/2017 | Ng et al. |
| 2017/0308163 A1 | 10/2017 | Cieplinski et al. |
| 2017/0315715 A1 | 11/2017 | Fujita et al. |
| 2017/0326457 A1 | 11/2017 | Tilton et al. |
| 2017/0336878 A1 | 11/2017 | Iyer et al. |
| 2017/0337033 A1 | 11/2017 | Duyan et al. |
| 2017/0337287 A1 | 11/2017 | Gill |
| 2017/0344223 A1 | 11/2017 | Holzer et al. |
| 2017/0351094 A1 | 12/2017 | Poulos et al. |
| 2017/0351485 A1 | 12/2017 | Kohler et al. |
| 2017/0357389 A1 | 12/2017 | Fleizach et al. |
| 2017/0357661 A1 | 12/2017 | Hornkvist et al. |
| 2017/0358141 A1 | 12/2017 | Stafford et al. |
| 2017/0364147 A1 | 12/2017 | Canella et al. |
| 2017/0364198 A1 | 12/2017 | Yoganandan et al. |
| 2017/0364925 A1 | 12/2017 | Wilkinson et al. |
| 2017/0365102 A1 | 12/2017 | Huston et al. |
| 2018/0005433 A1 | 1/2018 | Kohler et al. |
| 2018/0024681 A1 | 1/2018 | Bernstein et al. |
| 2018/0035155 A1 | 2/2018 | Garner et al. |
| 2018/0061408 A1 | 3/2018 | Andreas et al. |
| 2018/0067622 A1 | 3/2018 | Chaudhri et al. |
| 2018/0074661 A1 | 3/2018 | Zhao et al. |
| 2018/0075658 A1 | 3/2018 | Lanier et al. |
| 2018/0077383 A1 | 3/2018 | Akao et al. |
| 2018/0081519 A1 | 3/2018 | Kim |
| 2018/0084287 A1 | 3/2018 | Shimura |
| 2018/0088787 A1 | 3/2018 | Bereza et al. |
| 2018/0088896 A1 | 3/2018 | Olson |
| 2018/0095634 A1 | 4/2018 | Alexander |
| 2018/0095636 A1 | 4/2018 | Valdivia et al. |
| 2018/0095649 A1 | 4/2018 | Valdivia et al. |
| 2018/0097643 A1 | 4/2018 | Raleigh et al. |
| 2018/0101223 A1 | 4/2018 | Ishihara et al. |
| 2018/0107445 A1 | 4/2018 | Ohmura |
| 2018/0114364 A1 | 4/2018 | Mcphee et al. |
| 2018/0120944 A1 | 5/2018 | Wang et al. |
| 2018/0122138 A1 | 5/2018 | Piya et al. |
| 2018/0130255 A1 | 5/2018 | Hazeghi et al. |
| 2018/0136815 A1 | 5/2018 | Tomizuka et al. |
| 2018/0143693 A1 | 5/2018 | Calabrese et al. |
| 2018/0146080 A1 | 5/2018 | Li et al. |
| 2018/0150204 A1 | 5/2018 | Macgillivray |
| 2018/0150997 A1 | 5/2018 | Austin |
| 2018/0157332 A1 | 6/2018 | Nie |
| 2018/0158222 A1 | 6/2018 | Hayashi |
| 2018/0165853 A1 | 6/2018 | Inagi et al. |
| 2018/0173404 A1 | 6/2018 | Smith |
| 2018/0173544 A1 | 6/2018 | Hyodo et al. |
| 2018/0173963 A1 | 6/2018 | Taylor |
| 2018/0174363 A1 | 6/2018 | Vanblon et al. |
| 2018/0181185 A1 | 6/2018 | Graham et al. |
| 2018/0181199 A1 | 6/2018 | Harvey et al. |
| 2018/0181272 A1 | 6/2018 | Olsson et al. |
| 2018/0188802 A1 | 7/2018 | Okumura |
| 2018/0197336 A1 | 7/2018 | Rochford et al. |
| 2018/0197341 A1 | 7/2018 | Loberg et al. |
| 2018/0210628 A1 | 7/2018 | Mcphee et al. |
| 2018/0218214 A1 | 8/2018 | Pestun et al. |
| 2018/0220195 A1 | 8/2018 | Panchaksharaiah et al. |
| 2018/0225875 A1 | 8/2018 | Yasrebi |
| 2018/0233139 A1 | 8/2018 | Finkelstein et al. |
| 2018/0239144 A1 | 8/2018 | Woods et al. |
| 2018/0240211 A1 | 8/2018 | Chatterjee et al. |
| 2018/0246569 A1 | 8/2018 | Arakawa et al. |
| 2018/0247449 A1 | 8/2018 | Park et al. |
| 2018/0275753 A1 | 9/2018 | Publicover et al. |
| 2018/0285063 A1 | 10/2018 | Huynh et al. |
| 2018/0286126 A1 | 10/2018 | Schwarz et al. |
| 2018/0293484 A1 | 10/2018 | Wang et al. |
| 2018/0293977 A1 | 10/2018 | Liensberger |
| 2018/0300023 A1 | 10/2018 | Hein |
| 2018/0302687 A1 | 10/2018 | Bhattacharjee et al. |
| 2018/0308473 A1 | 10/2018 | Scholar |
| 2018/0315248 A1 | 11/2018 | Bastov et al. |
| 2018/0322701 A1 | 11/2018 | Pahud et al. |
| 2018/0322871 A1 | 11/2018 | Chuang et al. |
| 2018/0330544 A1 | 11/2018 | Corso et al. |
| 2018/0336265 A1 | 11/2018 | Tu et al. |
| 2018/0348861 A1 | 12/2018 | Uscinski et al. |
| 2018/0348986 A1 | 12/2018 | Sawaki |
| 2018/0349678 A1 | 12/2018 | Koskan et al. |
| 2018/0350099 A1 | 12/2018 | Yerkes et al. |
| 2018/0350119 A1 | 12/2018 | Kocharlakota et al. |
| 2018/0350144 A1 | 12/2018 | Rathod |
| 2018/0364810 A1 | 12/2018 | Parshionikar |
| 2018/0365318 A1 | 12/2018 | et al. |
| 2018/0373803 A1 | 12/2018 | Shultz et al. |
| 2018/0374480 A1 | 12/2018 | Wang et al. |
| 2019/0012060 A1 | 1/2019 | Moore et al. |
| 2019/0018479 A1 | 1/2019 | Minami |
| 2019/0018498 A1 | 1/2019 | West et al. |
| 2019/0018692 A1 | 1/2019 | Indyk et al. |
| 2019/0025906 A1 | 1/2019 | Strong et al. |
| 2019/0027143 A1 | 1/2019 | Gelfenbeyn et al. |
| 2019/0034076 A1 | 1/2019 | Vinayak et al. |
| 2019/0034849 A1 | 1/2019 | Romaine et al. |
| 2019/0043259 A1 | 2/2019 | Wang et al. |
| 2019/0050062 A1 | 2/2019 | Chen et al. |
| 2019/0050196 A1 | 2/2019 | Li |
| 2019/0056785 A1 | 2/2019 | Suk |
| 2019/0058763 A1 | 2/2019 | Wei et al. |
| 2019/0073109 A1 | 3/2019 | Zhang et al. |
| 2019/0080572 A1 | 3/2019 | Kim et al. |
| 2019/0088149 A1 | 3/2019 | Fink et al. |
| 2019/0088255 A1 | 3/2019 | Talwar et al. |
| 2019/0094963 A1 | 3/2019 | Nijs |
| 2019/0094979 A1 | 3/2019 | Hall et al. |
| 2019/0101991 A1 | 4/2019 | Brennan |
| 2019/0102439 A1 | 4/2019 | Francis et al. |
| 2019/0102953 A1 | 4/2019 | Lindsay et al. |
| 2019/0103101 A1 | 4/2019 | Danila et al. |
| 2019/0130622 A1 | 5/2019 | Hoover et al. |
| 2019/0130633 A1 | 5/2019 | Haddad et al. |
| 2019/0132654 A1 | 5/2019 | Hu et al. |
| 2019/0138183 A1 | 5/2019 | Rosas et al. |
| 2019/0139538 A1 | 5/2019 | Gelfenbeyn et al. |
| 2019/0146128 A1 | 5/2019 | Cao et al. |
| 2019/0155495 A1 | 5/2019 | Klein et al. |
| 2019/0158645 A1 | 5/2019 | Yang et al. |
| 2019/0164340 A1 | 5/2019 | Pejic et al. |
| 2019/0164553 A1 | 5/2019 | Leeb |
| 2019/0166175 A1 | 5/2019 | Ross et al. |
| 2019/0172261 A1 | 6/2019 | Alt et al. |
| 2019/0172262 A1 | 6/2019 | Mchugh et al. |
| 2019/0182631 A1 | 6/2019 | Park |
| 2019/0187787 A1* | 6/2019 | White .................... G06F 3/013 |
| 2019/0188895 A1 | 6/2019 | Miller et al. |
| 2019/0188918 A1 | 6/2019 | Brewer et al. |
| 2019/0196666 A1 | 6/2019 | Kurzweil et al. |
| 2019/0204906 A1 | 7/2019 | Ross et al. |
| 2019/0205366 A1 | 7/2019 | Matsumoto et al. |
| 2019/0212827 A1 | 7/2019 | Kin et al. |

(56) References Cited

U.S. PATENT DOCUMENTS

| | | |
|---|---|---|
| 2019/0213389 A1 | 7/2019 | Peruch et al. |
| 2019/0221208 A1 | 7/2019 | Chen et al. |
| 2019/0227763 A1 | 7/2019 | Kaufthal |
| 2019/0228503 A1 | 7/2019 | Tokuchi |
| 2019/0228589 A1 | 7/2019 | Dascola et al. |
| 2019/0238818 A1 | 8/2019 | Held et al. |
| 2019/0251884 A1 | 8/2019 | Burns et al. |
| 2019/0258365 A1 | 8/2019 | Zurmoehle et al. |
| 2019/0259290 A1 | 8/2019 | Lynch |
| 2019/0266774 A1 | 8/2019 | Sommerlade et al. |
| 2019/0279407 A1 | 9/2019 | Mchugh et al. |
| 2019/0294252 A1 | 9/2019 | Li |
| 2019/0294312 A1 | 9/2019 | Rohrbacher |
| 2019/0297471 A1 | 9/2019 | Baer et al. |
| 2019/0302977 A1 | 10/2019 | Pendergast et al. |
| 2019/0306093 A1 | 10/2019 | Schilling et al. |
| 2019/0310757 A1 | 10/2019 | Lee et al. |
| 2019/0311718 A1 | 10/2019 | Huber et al. |
| 2019/0317594 A1 | 10/2019 | Stent |
| 2019/0324529 A1 | 10/2019 | Stellmach et al. |
| 2019/0325600 A1 | 10/2019 | Balan et al. |
| 2019/0325654 A1 | 10/2019 | Stisser et al. |
| 2019/0332244 A1 | 10/2019 | Beszteri et al. |
| 2019/0333278 A1 | 10/2019 | Palangie et al. |
| 2019/0339770 A1 | 11/2019 | Kurlethimar et al. |
| 2019/0339804 A1 | 11/2019 | Gleeson et al. |
| 2019/0340816 A1 | 11/2019 | Rogers |
| 2019/0340832 A1 | 11/2019 | Srinivasan et al. |
| 2019/0341040 A1 | 11/2019 | Kirazci et al. |
| 2019/0346678 A1 | 11/2019 | Nocham |
| 2019/0346922 A1 | 11/2019 | Young et al. |
| 2019/0349575 A1 | 11/2019 | Knepper et al. |
| 2019/0354259 A1 | 11/2019 | Park |
| 2019/0361521 A1 | 11/2019 | Stellmach et al. |
| 2019/0362560 A1 | 11/2019 | Choi et al. |
| 2019/0369569 A1 | 12/2019 | Olsen et al. |
| 2019/0370492 A1 | 12/2019 | Falchuk et al. |
| 2019/0370556 A1 | 12/2019 | Kline et al. |
| 2019/0371072 A1 | 12/2019 | Lindberg et al. |
| 2019/0371279 A1 | 12/2019 | Mak |
| 2019/0377487 A1 | 12/2019 | Bailey et al. |
| 2019/0377897 A1 | 12/2019 | Griffin et al. |
| 2019/0379765 A1 | 12/2019 | Fajt et al. |
| 2019/0384406 A1 | 12/2019 | Smith et al. |
| 2020/0004401 A1 | 1/2020 | Hwang et al. |
| 2020/0005539 A1 | 1/2020 | Hwang et al. |
| 2020/0012341 A1 | 1/2020 | Stellmach et al. |
| 2020/0020157 A1 | 1/2020 | Powers et al. |
| 2020/0026349 A1 | 1/2020 | Fontanel et al. |
| 2020/0034162 A1 | 1/2020 | Takiya et al. |
| 2020/0034492 A1 | 1/2020 | Verbeke et al. |
| 2020/0038120 A1 | 2/2020 | Ziraknejad et al. |
| 2020/0043243 A1 | 2/2020 | Bhushan et al. |
| 2020/0045249 A1 | 2/2020 | Francois et al. |
| 2020/0048825 A1 | 2/2020 | Schultz et al. |
| 2020/0050426 A1 | 2/2020 | Jung et al. |
| 2020/0051527 A1 | 2/2020 | Ngo |
| 2020/0073624 A1 | 3/2020 | Teo et al. |
| 2020/0075002 A1 | 3/2020 | Pufahl et al. |
| 2020/0081526 A1 | 3/2020 | Walker et al. |
| 2020/0082602 A1 | 3/2020 | Jones |
| 2020/0089314 A1 | 3/2020 | Poupyrev et al. |
| 2020/0092537 A1 | 3/2020 | Sutter et al. |
| 2020/0097246 A1 | 3/2020 | Mccoy et al. |
| 2020/0098140 A1 | 3/2020 | Jagnow et al. |
| 2020/0098173 A1 | 3/2020 | Mccall |
| 2020/0099989 A1 | 3/2020 | Niemirska et al. |
| 2020/0103976 A1 | 4/2020 | Dierk et al. |
| 2020/0104194 A1 | 4/2020 | Chalmers et al. |
| 2020/0106965 A1 | 4/2020 | Malia et al. |
| 2020/0117213 A1 | 4/2020 | Tian et al. |
| 2020/0121296 A1 | 4/2020 | Seo et al. |
| 2020/0126291 A1 | 4/2020 | Nguyen et al. |
| 2020/0128227 A1 | 4/2020 | Chavez et al. |
| 2020/0128232 A1 | 4/2020 | Hwang et al. |
| 2020/0129850 A1 | 4/2020 | Ohashi |
| 2020/0135141 A1 | 4/2020 | Day et al. |
| 2020/0159017 A1 | 5/2020 | Lin et al. |
| 2020/0160860 A1 | 5/2020 | Singh et al. |
| 2020/0167937 A1 | 5/2020 | Rosson |
| 2020/0184962 A1 | 6/2020 | Chen |
| 2020/0202129 A1 | 6/2020 | Reyes et al. |
| 2020/0210418 A1 | 7/2020 | Runov et al. |
| 2020/0214682 A1 | 7/2020 | Zaslavsky et al. |
| 2020/0225735 A1 | 7/2020 | Schwarz |
| 2020/0225746 A1 | 7/2020 | Bar-zeev et al. |
| 2020/0225747 A1 | 7/2020 | Bar-zeev et al. |
| 2020/0225830 A1 | 7/2020 | Tang et al. |
| 2020/0226814 A1 | 7/2020 | Tang et al. |
| 2020/0234084 A1 | 7/2020 | Seaton et al. |
| 2020/0236069 A1 | 7/2020 | Nowak-Przygodzki et al. |
| 2020/0236214 A1 | 7/2020 | Mehta et al. |
| 2020/0242648 A1 | 7/2020 | Glazier et al. |
| 2020/0242844 A1 | 7/2020 | Bae et al. |
| 2020/0257245 A1 | 8/2020 | Linville et al. |
| 2020/0257484 A1 | 8/2020 | Qian et al. |
| 2020/0272303 A1 | 8/2020 | Jia et al. |
| 2020/0285069 A1 | 9/2020 | Villalpando et al. |
| 2020/0285314 A1 | 9/2020 | Cieplinski et al. |
| 2020/0286299 A1 | 9/2020 | Wang et al. |
| 2020/0312318 A1 | 10/2020 | Olson et al. |
| 2020/0314604 A1 | 10/2020 | Harijan et al. |
| 2020/0319704 A1 | 10/2020 | Kathuria et al. |
| 2020/0322178 A1 | 10/2020 | Wang et al. |
| 2020/0322575 A1 | 10/2020 | Valli |
| 2020/0328913 A1 | 10/2020 | Wyas et al. |
| 2020/0329358 A1 | 10/2020 | Hamre et al. |
| 2020/0348807 A1 | 11/2020 | Garcia et al. |
| 2020/0356221 A1 | 11/2020 | Behzadi et al. |
| 2020/0356928 A1 | 11/2020 | Lee et al. |
| 2020/0357374 A1 | 11/2020 | Verweij et al. |
| 2020/0363867 A1 | 11/2020 | Azimi et al. |
| 2020/0371577 A1 | 11/2020 | Graham et al. |
| 2020/0371602 A1 | 11/2020 | Kanda |
| 2020/0371673 A1 | 11/2020 | Faulkner |
| 2020/0379626 A1 | 12/2020 | Guyomard et al. |
| 2020/0387214 A1 | 12/2020 | Ravasz et al. |
| 2020/0387228 A1 | 12/2020 | Ravasz et al. |
| 2020/0387287 A1 | 12/2020 | Ravasz et al. |
| 2020/0410960 A1 | 12/2020 | Saito et al. |
| 2021/0004146 A1 | 1/2021 | Linville et al. |
| 2021/0011556 A1 | 1/2021 | Atlas et al. |
| 2021/0034163 A1 | 2/2021 | Goel et al. |
| 2021/0034319 A1 | 2/2021 | Wang et al. |
| 2021/0042979 A1 | 2/2021 | Ballagas et al. |
| 2021/0055789 A1 | 2/2021 | Tsai et al. |
| 2021/0055910 A1 | 2/2021 | Takahashi et al. |
| 2021/0067418 A1 | 3/2021 | Ely et al. |
| 2021/0072709 A1 | 3/2021 | Oliver et al. |
| 2021/0074062 A1 | 3/2021 | Madonna et al. |
| 2021/0090337 A1 | 3/2021 | Ravasz et al. |
| 2021/0090348 A1 | 3/2021 | Croxford et al. |
| 2021/0096726 A1 | 4/2021 | Faulkner et al. |
| 2021/0097766 A1 | 4/2021 | Palangie et al. |
| 2021/0102820 A1 | 4/2021 | Le et al. |
| 2021/0103333 A1 | 4/2021 | Cieplinski et al. |
| 2021/0103452 A1 | 4/2021 | Pratt et al. |
| 2021/0117623 A1 | 4/2021 | Aly et al. |
| 2021/0119955 A1 | 4/2021 | Penov et al. |
| 2021/0125414 A1 | 4/2021 | Berkebile |
| 2021/0125609 A1 | 4/2021 | Dusan et al. |
| 2021/0134248 A1 | 5/2021 | Wan et al. |
| 2021/0134286 A1 | 5/2021 | Burton et al. |
| 2021/0141437 A1 | 5/2021 | Graham et al. |
| 2021/0142552 A1 | 5/2021 | Kimura et al. |
| 2021/0157402 A1 | 5/2021 | Parshionikar |
| 2021/0158624 A1 | 5/2021 | Moon et al. |
| 2021/0165484 A1 | 6/2021 | Suguhara et al. |
| 2021/0165923 A1 | 6/2021 | Johnston |
| 2021/0166437 A1 | 6/2021 | Legendre et al. |
| 2021/0166689 A1 | 6/2021 | Kim et al. |
| 2021/0173340 A1 | 6/2021 | Kim |
| 2021/0173536 A1 | 6/2021 | Kondo |
| 2021/0177306 A1 | 6/2021 | Meugels et al. |

(56) References Cited

U.S. PATENT DOCUMENTS

| | | |
|---|---|---|
| 2021/0191600 A1 | 6/2021 | Lemay et al. |
| 2021/0201029 A1 | 7/2021 | Ju et al. |
| 2021/0218571 A1 | 7/2021 | Ansari et al. |
| 2021/0219023 A1 | 7/2021 | Sheng et al. |
| 2021/0225043 A1 | 7/2021 | Tang et al. |
| 2021/0227601 A1 | 7/2021 | Eom et al. |
| 2021/0241483 A1 | 8/2021 | Dryer et al. |
| 2021/0241777 A1 | 8/2021 | Bladsy et al. |
| 2021/0248674 A1 | 8/2021 | Ogunbunmi |
| 2021/0249018 A1 | 8/2021 | Shin et al. |
| 2021/0272367 A1 | 9/2021 | Richter |
| 2021/0279967 A1 | 9/2021 | Gernoth et al. |
| 2021/0286502 A1 | 9/2021 | Lemay et al. |
| 2021/0287439 A1 | 9/2021 | Goodrich et al. |
| 2021/0295592 A1 | 9/2021 | Von Cramon |
| 2021/0303074 A1 | 9/2021 | Vanblon et al. |
| 2021/0303107 A1 | 9/2021 | Pla I Conesa et al. |
| 2021/0312684 A1 | 10/2021 | Zimmermann et al. |
| 2021/0312713 A1 | 10/2021 | Peri et al. |
| 2021/0312717 A1 | 10/2021 | Mao |
| 2021/0326094 A1 | 10/2021 | Buerli et al. |
| 2021/0327140 A1 | 10/2021 | Rothkopf et al. |
| 2021/0327436 A1 | 10/2021 | Zheng |
| 2021/0331069 A1 | 10/2021 | Gustafson et al. |
| 2021/0333864 A1 | 10/2021 | Harvey et al. |
| 2021/0350564 A1 | 11/2021 | Peuhkurinen et al. |
| 2021/0350604 A1 | 11/2021 | Pejsa et al. |
| 2021/0365108 A1 | 11/2021 | Burns et al. |
| 2021/0366440 A1 | 11/2021 | Burns et al. |
| 2021/0368136 A1 | 11/2021 | Chalmers et al. |
| 2021/0374221 A1 | 12/2021 | Markhasin et al. |
| 2021/0375022 A1 | 12/2021 | Lee et al. |
| 2021/0375279 A1 | 12/2021 | Lee et al. |
| 2021/0383097 A1 | 12/2021 | Guerard et al. |
| 2021/0383803 A1 | 12/2021 | Takimoto |
| 2021/0400744 A1 | 12/2021 | Chen et al. |
| 2021/0405760 A1 | 12/2021 | Schoen |
| 2021/0407507 A1 | 12/2021 | Zhou et al. |
| 2022/0011577 A1 | 1/2022 | Lawver et al. |
| 2022/0011855 A1 | 1/2022 | Hazra et al. |
| 2022/0012002 A1 | 1/2022 | Bar-zeev et al. |
| 2022/0020142 A1 | 1/2022 | Anderson et al. |
| 2022/0028108 A1 | 1/2022 | Haapoja et al. |
| 2022/0030197 A1 | 1/2022 | Ishimoto |
| 2022/0035479 A1 | 2/2022 | Lasater et al. |
| 2022/0051342 A1 | 2/2022 | Brandmaier et al. |
| 2022/0052867 A1 | 2/2022 | Nakano et al. |
| 2022/0070241 A1 | 3/2022 | Yerli |
| 2022/0076496 A1 | 3/2022 | Palangie et al. |
| 2022/0080260 A1 | 3/2022 | Zhang et al. |
| 2022/0083145 A1 | 3/2022 | Matsunaga et al. |
| 2022/0083197 A1 | 3/2022 | Rockel et al. |
| 2022/0084279 A1 | 3/2022 | Lindmeier et al. |
| 2022/0091722 A1 | 3/2022 | Faulkner et al. |
| 2022/0091723 A1 | 3/2022 | Faulkner et al. |
| 2022/0092269 A1 | 3/2022 | Le |
| 2022/0092862 A1 | 3/2022 | Faulkner et al. |
| 2022/0093191 A1 | 3/2022 | Yang |
| 2022/0100265 A1 | 3/2022 | Kies et al. |
| 2022/0100270 A1 | 3/2022 | Pastrana Vicente et al. |
| 2022/0101593 A1 | 3/2022 | Rockel et al. |
| 2022/0101612 A1 | 3/2022 | Palangie et al. |
| 2022/0101861 A1 | 3/2022 | Antos et al. |
| 2022/0104910 A1 | 4/2022 | Shelton et al. |
| 2022/0121275 A1 | 4/2022 | Balaji et al. |
| 2022/0121344 A1 | 4/2022 | Pastrana Vicente et al. |
| 2022/0122610 A1 | 4/2022 | Carbune et al. |
| 2022/0124286 A1 | 4/2022 | Punwani et al. |
| 2022/0130107 A1 | 4/2022 | Lindh |
| 2022/0137701 A1 | 5/2022 | Bowman et al. |
| 2022/0137705 A1 | 5/2022 | Hashimoto et al. |
| 2022/0147135 A1 | 5/2022 | Graham et al. |
| 2022/0148257 A1 | 5/2022 | Boubekeur et al. |
| 2022/0155853 A1 | 5/2022 | Fan et al. |
| 2022/0155863 A1 | 5/2022 | Wang et al. |
| 2022/0155909 A1 | 5/2022 | Kawashima et al. |
| 2022/0157083 A1 | 5/2022 | Jandhyala et al. |
| 2022/0157318 A1 | 5/2022 | Sharifi et al. |
| 2022/0165013 A1 | 5/2022 | Velez et al. |
| 2022/0172727 A1 | 6/2022 | Sharifi et al. |
| 2022/0179503 A1 | 6/2022 | Timonen et al. |
| 2022/0187907 A1 | 6/2022 | Lee et al. |
| 2022/0191570 A1 | 6/2022 | Reid et al. |
| 2022/0191577 A1 | 6/2022 | Singhal et al. |
| 2022/0197403 A1 | 6/2022 | Hughes et al. |
| 2022/0198755 A1 | 6/2022 | Pinchon |
| 2022/0221976 A1 | 7/2022 | Agarwal et al. |
| 2022/0229524 A1 | 7/2022 | Mckenzie et al. |
| 2022/0229534 A1 | 7/2022 | Terre et al. |
| 2022/0230399 A1 | 7/2022 | Evangelista et al. |
| 2022/0232191 A1 | 7/2022 | Kawakami et al. |
| 2022/0236857 A1 | 7/2022 | Sharifi et al. |
| 2022/0239718 A1 | 7/2022 | Song et al. |
| 2022/0244536 A1 | 8/2022 | Sha et al. |
| 2022/0245888 A1 | 8/2022 | Singh et al. |
| 2022/0253125 A1 | 8/2022 | Wallen et al. |
| 2022/0253136 A1 | 8/2022 | Holder et al. |
| 2022/0253149 A1 | 8/2022 | Berliner et al. |
| 2022/0253194 A1 | 8/2022 | Berliner et al. |
| 2022/0255995 A1 | 8/2022 | Berliner et al. |
| 2022/0276720 A1 | 9/2022 | Yasui |
| 2022/0279063 A1 | 9/2022 | Coffman et al. |
| 2022/0279303 A1 | 9/2022 | Marculescu et al. |
| 2022/0287676 A1 | 9/2022 | Steines et al. |
| 2022/0291808 A1 | 9/2022 | Stevens et al. |
| 2022/0292783 A1 | 9/2022 | Jayaram et al. |
| 2022/0292784 A1 | 9/2022 | Jayaram et al. |
| 2022/0292785 A1 | 9/2022 | Jayaram et al. |
| 2022/0295032 A1 | 9/2022 | Jayaram et al. |
| 2022/0295040 A1 | 9/2022 | Jayaram et al. |
| 2022/0295139 A1 | 9/2022 | Jayaram et al. |
| 2022/0301232 A1 | 9/2022 | Park et al. |
| 2022/0301264 A1 | 9/2022 | O'Leary et al. |
| 2022/0303680 A1 | 9/2022 | Ahmed et al. |
| 2022/0311950 A1 | 9/2022 | Ith et al. |
| 2022/0319453 A1 | 10/2022 | Llull et al. |
| 2022/0326837 A1 | 10/2022 | Dessero et al. |
| 2022/0335697 A1 | 10/2022 | Harding et al. |
| 2022/0335926 A1 | 10/2022 | Saptharishi et al. |
| 2022/0335932 A1 | 10/2022 | Sharifi et al. |
| 2022/0350463 A1 | 11/2022 | Walkin et al. |
| 2022/0365595 A1 | 11/2022 | Cieplinski et al. |
| 2022/0365740 A1 | 11/2022 | Chang et al. |
| 2022/0374136 A1 | 11/2022 | Chang et al. |
| 2022/0375315 A1 | 11/2022 | Faaborg et al. |
| 2022/0382385 A1 | 12/2022 | Chen et al. |
| 2022/0383592 A1 | 12/2022 | Hare et al. |
| 2022/0388630 A1 | 12/2022 | Saptharishi et al. |
| 2022/0392135 A1 | 12/2022 | Cundall et al. |
| 2022/0397962 A1 | 12/2022 | Goel et al. |
| 2022/0408164 A1 | 12/2022 | Lee et al. |
| 2022/0413691 A1 | 12/2022 | Becker et al. |
| 2022/0414975 A1 | 12/2022 | Becker et al. |
| 2022/0414999 A1 | 12/2022 | Ravasz et al. |
| 2022/0415094 A1 | 12/2022 | Kim et al. |
| 2023/0004216 A1 | 1/2023 | Rodgers et al. |
| 2023/0007335 A1 | 1/2023 | Gupta et al. |
| 2023/0008537 A1 | 1/2023 | Henderson et al. |
| 2023/0021861 A1 | 1/2023 | Fujiwara et al. |
| 2023/0027040 A1 | 1/2023 | Wang et al. |
| 2023/0030699 A1 | 2/2023 | Zion et al. |
| 2023/0031832 A1 | 2/2023 | Lipton et al. |
| 2023/0032545 A1 | 2/2023 | Mindlin et al. |
| 2023/0032771 A1 | 2/2023 | Zion et al. |
| 2023/0034825 A1 | 2/2023 | Runov et al. |
| 2023/0036192 A1 | 2/2023 | Alakoye |
| 2023/0068660 A1 | 3/2023 | Brent et al. |
| 2023/0069764 A1 | 3/2023 | Jonker et al. |
| 2023/0074080 A1 | 3/2023 | Miller et al. |
| 2023/0076326 A1 | 3/2023 | Xu et al. |
| 2023/0081386 A1 | 3/2023 | Moon et al. |
| 2023/0086766 A1 | 3/2023 | Olwal et al. |
| 2023/0092282 A1 | 3/2023 | Boesel et al. |
| 2023/0092874 A1 | 3/2023 | Krivoruchko et al. |

(56) References Cited

U.S. PATENT DOCUMENTS

| | | |
|---|---|---|
| 2023/0093979 A1 | 3/2023 | Stauber et al. |
| 2023/0100610 A1 | 3/2023 | Pastrana Vicente et al. |
| 2023/0100689 A1 | 3/2023 | Chiu et al. |
| 2023/0103076 A1 | 3/2023 | Zhou et al. |
| 2023/0103161 A1 | 3/2023 | Li et al. |
| 2023/0114080 A1 | 4/2023 | Yang et al. |
| 2023/0114663 A1 | 4/2023 | Pellegrini et al. |
| 2023/0119162 A1 | 4/2023 | Lipton et al. |
| 2023/0120052 A1 | 4/2023 | Wallen et al. |
| 2023/0125662 A1 | 4/2023 | Burakov et al. |
| 2023/0133579 A1 | 5/2023 | Chang et al. |
| 2023/0145266 A1 | 5/2023 | Pittman et al. |
| 2023/0150513 A1 | 5/2023 | Rangarajan et al. |
| 2023/0152889 A1 | 5/2023 | Cieplinski et al. |
| 2023/0152935 A1 | 5/2023 | Mckenzie et al. |
| 2023/0154122 A1 | 5/2023 | Dascola et al. |
| 2023/0163987 A1 | 5/2023 | Young et al. |
| 2023/0168745 A1 | 6/2023 | Yoda |
| 2023/0168788 A1 | 6/2023 | Faulkner et al. |
| 2023/0169959 A1 | 6/2023 | Dhillon |
| 2023/0176806 A1 | 6/2023 | Chen et al. |
| 2023/0185426 A1 | 6/2023 | Rockel et al. |
| 2023/0186577 A1 | 6/2023 | Rockel et al. |
| 2023/0197078 A1 | 6/2023 | Bobbili et al. |
| 2023/0206572 A1 | 6/2023 | Pazmino et al. |
| 2023/0221833 A1 | 7/2023 | Holder et al. |
| 2023/0244857 A1 | 8/2023 | Weiss et al. |
| 2023/0259265 A1 | 8/2023 | Krivoruchko et al. |
| 2023/0260240 A1 | 8/2023 | Jayaram et al. |
| 2023/0266859 A1 | 8/2023 | Day et al. |
| 2023/0273706 A1 | 8/2023 | Smith et al. |
| 2023/0274504 A1 | 8/2023 | Ren et al. |
| 2023/0290042 A1 | 9/2023 | Casella et al. |
| 2023/0308610 A1 | 9/2023 | Henderson et al. |
| 2023/0315270 A1 | 10/2023 | Hylak et al. |
| 2023/0316634 A1 | 10/2023 | Chiu et al. |
| 2023/0316658 A1 | 10/2023 | Smith et al. |
| 2023/0325004 A1 | 10/2023 | Burns et al. |
| 2023/0325046 A1 | 10/2023 | De Almeida E De Vincenzo et al. |
| 2023/0333646 A1 | 10/2023 | Pastrana Vicente et al. |
| 2023/0334808 A1 | 10/2023 | Sundstrom et al. |
| 2023/0341932 A1 | 10/2023 | Silva et al. |
| 2023/0343049 A1 | 10/2023 | Boesel et al. |
| 2023/0351091 A1 | 11/2023 | Gil et al. |
| 2023/0351149 A1 | 11/2023 | Yu et al. |
| 2023/0351702 A1 | 11/2023 | Tan et al. |
| 2023/0353398 A1 | 11/2023 | White |
| 2023/0359199 A1 | 11/2023 | Adachi et al. |
| 2023/0373305 A1 | 11/2023 | Beck et al. |
| 2023/0377259 A1 | 11/2023 | Becker et al. |
| 2023/0377295 A1 | 11/2023 | Angevine et al. |
| 2023/0377299 A1 | 11/2023 | Becker et al. |
| 2023/0377300 A1 | 11/2023 | Becker et al. |
| 2023/0384907 A1 | 11/2023 | Boesel et al. |
| 2023/0388357 A1 | 11/2023 | Faulkner et al. |
| 2023/0394755 A1 | 12/2023 | Negoita et al. |
| 2023/0396854 A1 | 12/2023 | Sanders et al. |
| 2024/0037886 A1 | 2/2024 | Chiu et al. |
| 2024/0045492 A1 | 2/2024 | Richter |
| 2024/0061645 A1 | 2/2024 | Seo |
| 2024/0062279 A1 | 2/2024 | Scully et al. |
| 2024/0070948 A1 | 2/2024 | Bradley et al. |
| 2024/0086031 A1 | 3/2024 | Palangie et al. |
| 2024/0086032 A1 | 3/2024 | Palangie et al. |
| 2024/0087256 A1 | 3/2024 | Hylak et al. |
| 2024/0094863 A1 | 3/2024 | Smith et al. |
| 2024/0094866 A1 | 3/2024 | Lemay et al. |
| 2024/0094882 A1 | 3/2024 | Brewer et al. |
| 2024/0095984 A1 | 3/2024 | Ren et al. |
| 2024/0102821 A1 | 3/2024 | Vallet et al. |
| 2024/0103613 A1 | 3/2024 | Chawda et al. |
| 2024/0103616 A1 | 3/2024 | Yerkes et al. |
| 2024/0103636 A1 | 3/2024 | Lindmeier et al. |
| 2024/0103676 A1 | 3/2024 | Pastrana Vicente et al. |
| 2024/0103684 A1 | 3/2024 | Yu et al. |
| 2024/0103685 A1 | 3/2024 | Pazmino et al. |
| 2024/0103686 A1 | 3/2024 | Pazmino et al. |
| 2024/0103687 A1 | 3/2024 | Pastrana Vicente et al. |
| 2024/0103701 A1 | 3/2024 | Pastrana Vicente et al. |
| 2024/0103704 A1 | 3/2024 | Pastrana Vicente et al. |
| 2024/0103707 A1 | 3/2024 | Henderson et al. |
| 2024/0103716 A1 | 3/2024 | Pastrana Vicente et al. |
| 2024/0103803 A1 | 3/2024 | Krivoruchko et al. |
| 2024/0104353 A1 | 3/2024 | Leblond et al. |
| 2024/0104836 A1 | 3/2024 | Dessero et al. |
| 2024/0104843 A1 | 3/2024 | Mckenzie et al. |
| 2024/0104870 A1 | 3/2024 | Fuste Lleixa et al. |
| 2024/0104873 A1 | 3/2024 | Pastrana Vicente et al. |
| 2024/0104875 A1 | 3/2024 | Couche et al. |
| 2024/0104876 A1 | 3/2024 | Couche et al. |
| 2024/0104877 A1 | 3/2024 | Henderson et al. |
| 2024/0119682 A1 | 4/2024 | Rudman et al. |
| 2024/0135612 A1 | 4/2024 | Hold-geoffroy et al. |
| 2024/0135959 A1 | 4/2024 | Kulkarni et al. |
| 2024/0152256 A1 | 5/2024 | Dascola et al. |
| 2024/0176441 A1 | 5/2024 | Yang et al. |
| 2024/0185514 A1 | 6/2024 | Singh et al. |
| 2024/0192764 A1 | 6/2024 | Dascola et al. |
| 2024/0193892 A1 | 6/2024 | Lutter et al. |
| 2024/0195652 A1 | 6/2024 | Rexach et al. |
| 2024/0200967 A1 | 6/2024 | Arroyo et al. |
| 2024/0203066 A1 | 6/2024 | Kawashima et al. |
| 2024/0205509 A1 | 6/2024 | Kim et al. |
| 2024/0221273 A1 | 7/2024 | Dusseau et al. |
| 2024/0221291 A1 | 7/2024 | Henderson et al. |
| 2024/0233097 A1 | 7/2024 | Ngo et al. |
| 2024/0233288 A1 | 7/2024 | Stauber et al. |
| 2024/0242423 A1 | 7/2024 | Chakraborty et al. |
| 2024/0256032 A1 | 8/2024 | Holder et al. |
| 2024/0265656 A1 | 8/2024 | Victor-faichney et al. |
| 2024/0265796 A1 | 8/2024 | Ippadi Veerabhadre Gowda et al. |
| 2024/0272722 A1 | 8/2024 | Gitter et al. |
| 2024/0272782 A1 | 8/2024 | Pastrana Vicente et al. |
| 2024/0273838 A1 | 8/2024 | Palangie et al. |
| 2024/0281108 A1 | 8/2024 | Krivoruchko et al. |
| 2024/0281109 A1 | 8/2024 | Manjunath et al. |
| 2024/0281206 A1 | 8/2024 | Gruber et al. |
| 2024/0282301 A1 | 8/2024 | Lindahl |
| 2024/0291953 A1 | 8/2024 | Cerra et al. |
| 2024/0302948 A1 | 9/2024 | Hylak et al. |
| 2024/0303268 A1 | 9/2024 | Graham et al. |
| 2024/0310971 A1 | 9/2024 | Kawashima et al. |
| 2024/0338104 A1 | 10/2024 | Salter et al. |
| 2024/0338173 A1 | 10/2024 | Daryanani et al. |
| 2024/0338921 A1 | 10/2024 | Burgner et al. |
| 2024/0345799 A1 | 10/2024 | Gruber et al. |
| 2024/0346282 A1 | 10/2024 | Sanghavi et al. |
| 2024/0347041 A1 | 10/2024 | Castellani et al. |
| 2024/0347059 A1 | 10/2024 | Manjunath et al. |
| 2024/0361832 A1 | 10/2024 | Calderone et al. |
| 2024/0361833 A1 | 10/2024 | Calderone et al. |
| 2024/0361835 A1 | 10/2024 | Hylak et al. |
| 2024/0361901 A1 | 10/2024 | Ravasz et al. |
| 2024/0363109 A1 | 10/2024 | Hshieh et al. |
| 2024/0371373 A1 | 11/2024 | Munro et al. |
| 2024/0371381 A1 | 11/2024 | Orr et al. |
| 2024/0373198 A1 | 11/2024 | Lalji et al. |
| 2024/0378211 A1 | 11/2024 | Chan et al. |
| 2024/0379101 A1 | 11/2024 | Bhuwalka et al. |
| 2024/0379102 A1 | 11/2024 | Duffy et al. |
| 2024/0379105 A1 | 11/2024 | Ellis et al. |
| 2024/0379110 A1 | 11/2024 | Sinesio et al. |
| 2024/0386877 A1 | 11/2024 | Schlakman et al. |
| 2024/0393876 A1 | 11/2024 | Chawda et al. |
| 2024/0393921 A1 | 11/2024 | Ramaswamy et al. |
| 2024/0402800 A1 | 12/2024 | Shutzberg et al. |
| 2024/0402821 A1 | 12/2024 | Meyer et al. |
| 2024/0403080 A1 | 12/2024 | Laurita et al. |
| 2024/0403997 A1 | 12/2024 | Checa Oloriz et al. |
| 2024/0404206 A1 | 12/2024 | Chiu et al. |
| 2024/0404207 A1 | 12/2024 | Laurita et al. |
| 2024/0404232 A1 | 12/2024 | Rockwell et al. |
| 2024/0404233 A1 | 12/2024 | Boesel et al. |

(56) References Cited

U.S. PATENT DOCUMENTS

| | | |
|---|---|---|
| 2024/0404515 A1 | 12/2024 | Salim et al. |
| 2024/0404519 A1 | 12/2024 | Anderson et al. |
| 2024/0404520 A1 | 12/2024 | Kohli et al. |
| 2024/0406150 A1 | 12/2024 | Capelis et al. |
| 2024/0411444 A1 | 12/2024 | Shutzberg et al. |
| 2024/0420435 A1 | 12/2024 | Gitter et al. |
| 2024/0428488 A1 | 12/2024 | Ren et al. |
| 2025/0005855 A1 | 1/2025 | Holder et al. |
| 2025/0005864 A1 | 1/2025 | Dessero et al. |
| 2025/0008057 A1 | 1/2025 | Chiu et al. |
| 2025/0013343 A1 | 1/2025 | Smith et al. |
| 2025/0013344 A1 | 1/2025 | Smith et al. |
| 2025/0022466 A1 | 1/2025 | Piernot et al. |
| 2025/0024008 A1 | 1/2025 | Cerra et al. |
| 2025/0028423 A1 | 1/2025 | Dessero et al. |
| 2025/0029319 A1 | 1/2025 | Boesel et al. |
| 2025/0029328 A1 | 1/2025 | Smith et al. |
| 2025/0029339 A1 | 1/2025 | Akmal et al. |
| 2025/0029343 A1 | 1/2025 | Herman et al. |
| 2025/0031002 A1 | 1/2025 | Hawkins et al. |
| 2025/0036253 A1 | 1/2025 | Stauber et al. |
| 2025/0036255 A1 | 1/2025 | Pastrana Vicente et al. |
| 2025/0036267 A1 | 1/2025 | Burgess et al. |
| 2025/0037723 A1 | 1/2025 | Gruber et al. |
| 2025/0046310 A1 | 2/2025 | Milden |
| 2025/0053375 A1 | 2/2025 | Carson et al. |
| 2025/0069328 A1 | 2/2025 | Herscher et al. |
| 2025/0069605 A1 | 2/2025 | Kim et al. |
| 2025/0077060 A1 | 3/2025 | Becker et al. |
| 2025/0077066 A1 | 3/2025 | Lutter |
| 2025/0077786 A1 | 3/2025 | Nell et al. |
| 2025/0078420 A1 | 3/2025 | Dessero et al. |
| 2025/0078429 A1 | 3/2025 | Dascola et al. |
| 2025/0078835 A1 | 3/2025 | Novitchenko et al. |
| 2025/0087209 A1 | 3/2025 | Perkins et al. |
| 2025/0095648 A1 | 3/2025 | Manjunath et al. |
| 2025/0097337 A1 | 3/2025 | Vilhauer et al. |
| 2025/0103132 A1 | 3/2025 | Rickwald et al. |
| 2025/0103828 A1 | 3/2025 | Del Vecchio et al. |
| 2025/0104335 A1 | 3/2025 | Huang et al. |
| 2025/0104367 A1 | 3/2025 | Huang et al. |
| 2025/0104429 A1 | 3/2025 | Biddulph et al. |
| 2025/0106581 A1 | 3/2025 | Lutter et al. |
| 2025/0106582 A1 | 3/2025 | Lutter et al. |
| 2025/0110570 A1 | 4/2025 | Ottens et al. |
| 2025/0110605 A1 | 4/2025 | Huang et al. |
| 2025/0110757 A1 | 4/2025 | Palkovics et al. |
| 2025/0110774 A1 | 4/2025 | Zeitlin |
| 2025/0111472 A1 | 4/2025 | Lutter et al. |
| 2025/0111605 A1 | 4/2025 | Huang et al. |
| 2025/0111622 A1 | 4/2025 | Stern et al. |
| 2025/0117079 A1 | 4/2025 | Chiu et al. |
| 2025/0118038 A1 | 4/2025 | Sorrentino et al. |
| 2025/0118328 A1 | 4/2025 | Binder et al. |
| 2025/0124927 A1 | 4/2025 | Hornberger et al. |
| 2025/0130707 A1 | 4/2025 | Stauber et al. |
| 2025/0140255 A1 | 5/2025 | Kudurshian et al. |
| 2025/0149024 A1 | 5/2025 | Castellani et al. |
| 2025/0149038 A1 | 5/2025 | Simes et al. |
| 2025/0150669 A1 | 5/2025 | Van Os et al. |
| 2025/0156031 A1 | 5/2025 | Holder et al. |
| 2025/0157136 A1 | 5/2025 | Lindmeier et al. |
| 2025/0157467 A1 | 5/2025 | Lasko et al. |
| 2025/0159027 A1 | 5/2025 | Hansen et al. |
| 2025/0165069 A1 | 5/2025 | Calderone et al. |
| 2025/0165130 A1 | 5/2025 | Napolitano et al. |
| 2025/0165279 A1 | 5/2025 | Zeitlin |
| 2025/0166626 A1 | 5/2025 | Garcia et al. |
| 2025/0182750 A1 | 6/2025 | Greborio et al. |
| 2025/0190233 A1 | 6/2025 | Radebaugh et al. |
| 2025/0201264 A1 | 6/2025 | Binder et al. |
| 2025/0211711 A1 | 6/2025 | Binder et al. |
| 2025/0225333 A1 | 7/2025 | Cox et al. |
| 2025/0225985 A1 | 7/2025 | Webber et al. |
| 2025/0227360 A1 | 7/2025 | Richter |

| | | |
|---|---|---|
| 2025/0246189 A1 | 7/2025 | Garcia et al. |
| 2025/0258724 A1 | 8/2025 | Circosta et al. |
| 2025/0259629 A1 | 8/2025 | Walker et al. |

FOREIGN PATENT DOCUMENTS

| | | |
|---|---|---|
| AU | 2017100557 A4 | 6/2017 |
| AU | 2018329647 A1 | 4/2020 |
| CA | 2980333 A1 | 10/2016 |
| CA | 3033344 A1 | 2/2018 |
| CN | 104509080 A | 4/2015 |
| CN | 104541325 A | 4/2015 |
| CN | 104714771 A | 6/2015 |
| CN | 104769645 A | 7/2015 |
| CN | 104916287 A | 9/2015 |
| CN | 104981681 A | 10/2015 |
| CN | 105027194 A | 11/2015 |
| CN | 105264461 A | 1/2016 |
| CN | 105264478 A | 1/2016 |
| CN | 103583031 B | 2/2016 |
| CN | 105814535 A | 7/2016 |
| CN | 105917404 A | 8/2016 |
| CN | 105955579 A | 9/2016 |
| CN | 106098060 A | 11/2016 |
| CN | 106205615 A | 12/2016 |
| CN | 106297782 A | 1/2017 |
| CN | 106791071 A | 5/2017 |
| CN | 106990838 A | 7/2017 |
| CN | 107077201 A | 8/2017 |
| CN | 107181851 A | 9/2017 |
| CN | 107210033 A | 9/2017 |
| CN | 107408387 A | 11/2017 |
| CN | 107491257 A | 12/2017 |
| CN | 107491284 A | 12/2017 |
| CN | 107527005 A | 12/2017 |
| CN | 107851003 A | 3/2018 |
| CN | 107886948 A | 4/2018 |
| CN | 108292203 A | 7/2018 |
| CN | 108352006 A | 7/2018 |
| CN | 108519818 A | 9/2018 |
| CN | 108573702 A | 9/2018 |
| CN | 108633307 A | 10/2018 |
| CN | 108733766 A | 11/2018 |
| CN | 109257941 A | 1/2019 |
| CN | 109564592 A | 4/2019 |
| CN | 109584879 A | 4/2019 |
| CN | 109634128 A | 4/2019 |
| CN | 109951424 A | 6/2019 |
| CN | 110019752 A | 7/2019 |
| CN | 110168526 A | 8/2019 |
| CN | 110413171 A | 11/2019 |
| CN | 110476142 A | 11/2019 |
| CN | 110543230 A | 12/2019 |
| CN | 110612566 A | 12/2019 |
| CN | 110651325 A | 1/2020 |
| CN | 110673718 A | 1/2020 |
| CN | 110910872 A | 3/2020 |
| CN | 110945584 A | 3/2020 |
| CN | 111052230 A | 4/2020 |
| CN | 111357048 A | 6/2020 |
| CN | 111402900 A | 7/2020 |
| CN | 111580652 A | 8/2020 |
| CN | 111611088 A | 9/2020 |
| CN | 111641843 A | 9/2020 |
| CN | 111913565 A | 11/2020 |
| CN | 112017672 A | 12/2020 |
| CN | 112068757 A | 12/2020 |
| CN | 112099720 A | 12/2020 |
| CN | 105900376 B | 2/2021 |
| CN | 112567332 A | 3/2021 |
| CN | 113424145 A | 9/2021 |
| CN | 109491508 B | 8/2022 |
| CN | 115309271 A | 11/2022 |
| CN | 116132905 A | 5/2023 |
| CN | 117043722 A | 11/2023 |
| CN | 117857981 A | 4/2024 |
| CN | 118102204 A | 5/2024 |
| DE | 102016125811 A1 | 11/2017 |
| DE | 102020128536 A1 | 5/2021 |

(56) References Cited

FOREIGN PATENT DOCUMENTS

| | | |
|---|---|---|
| EP | 2893297 A1 | 7/2015 |
| EP | 2947545 A1 | 11/2015 |
| EP | 3072257 A1 | 9/2016 |
| EP | 3088997 A1 | 11/2016 |
| EP | 3093737 A2 | 11/2016 |
| EP | 3118722 A1 | 1/2017 |
| EP | 3133472 A2 | 2/2017 |
| EP | 3249497 A1 | 11/2017 |
| EP | 3278218 A1 | 2/2018 |
| EP | 3306444 A1 | 4/2018 |
| EP | 3316075 A1 | 5/2018 |
| EP | 3345379 A1 | 7/2018 |
| EP | 3451135 A1 | 3/2019 |
| EP | 3503101 A1 | 6/2019 |
| EP | 3179474 B1 | 7/2019 |
| EP | 2732436 B1 | 9/2019 |
| EP | 2898399 B1 | 11/2019 |
| EP | 3570144 A1 | 11/2019 |
| EP | 3586481 A1 | 1/2020 |
| EP | 3588255 A1 | 1/2020 |
| EP | 3588493 A1 | 1/2020 |
| EP | 3654147 A1 | 5/2020 |
| EP | 2864932 B1 | 8/2020 |
| EP | 3806092 A1 | 4/2021 |
| EP | 3859494 A1 | 8/2021 |
| EP | 3959714 A1 | 3/2022 |
| EP | 4155867 A1 | 3/2023 |
| EP | 3688726 B1 | 8/2023 |
| EP | 4276819 A2 | 11/2023 |
| GB | 2540791 A | 2/2017 |
| JP | 2015-56173 A | 3/2015 |
| JP | 2015-515040 A | 5/2015 |
| JP | 2015-118332 A | 6/2015 |
| JP | 2016-502192 A | 1/2016 |
| JP | 2016-96513 A | 5/2016 |
| JP | 2016-194744 A | 11/2016 |
| JP | 2017-27206 A | 2/2017 |
| JP | 2017-58528 A | 3/2017 |
| JP | 2017-126009 A | 7/2017 |
| JP | 2017-531221 A | 10/2017 |
| JP | 2018-5516 A | 1/2018 |
| JP | 2018-5517 A | 1/2018 |
| JP | 2018-41477 A | 3/2018 |
| JP | 2018-509014 A | 3/2018 |
| JP | 2018-510445 A | 4/2018 |
| JP | 2018-514005 A | 5/2018 |
| JP | 2018-88118 A | 6/2018 |
| JP | 2018-101019 A | 6/2018 |
| JP | 2018-106499 A | 7/2018 |
| JP | 6419993 B2 | 11/2018 |
| JP | 6438869 B2 | 11/2018 |
| JP | 2019-40333 A | 3/2019 |
| JP | 2019-169154 A | 10/2019 |
| JP | 2019-175449 A | 10/2019 |
| JP | 2019-527881 A | 10/2019 |
| JP | 2019-532382 A | 11/2019 |
| JP | 2019-536131 A | 12/2019 |
| JP | 2020-503595 A | 1/2020 |
| JP | 2020-86913 A | 6/2020 |
| JP | 2022-53334 A | 4/2022 |
| JP | 2022-175629 A | 11/2022 |
| JP | 2023-52278 A | 4/2023 |
| JP | 7487276 B2 | 5/2024 |
| KR | 10-2015-0043108 A | 4/2015 |
| KR | 10-2016-0012139 A | 2/2016 |
| KR | 10-2017-0027240 A | 3/2017 |
| KR | 10-2017-0075625 A | 7/2017 |
| KR | 10-2017-0131465 A | 11/2017 |
| KR | 10-2018-0102171 A | 9/2018 |
| KR | 10-2019-0100512 A | 8/2019 |
| KR | 10-2019-0100957 A | 8/2019 |
| KR | 10-2020-0010296 A | 1/2020 |
| KR | 10-2020-0015616 A | 2/2020 |
| KR | 10-2020-0035103 A | 4/2020 |
| KR | 10-2020-0039030 A | 4/2020 |
| KR | 10-2020-0110788 A | 9/2020 |
| KR | 10-2020-0135496 A | 12/2020 |
| KR | 10-2021-0000327 A | 1/2021 |
| KR | 10-2021-0002722 A | 1/2021 |
| KR | 10-2204444 B1 | 1/2021 |
| KR | 10-2021-0083016 A | 7/2021 |
| KR | 10-2596190 B1 | 10/2023 |
| KR | 10-2677096 B1 | 6/2024 |
| WO | 2011/088053 A2 | 7/2011 |
| WO | 2012/166277 A1 | 12/2012 |
| WO | 2013/048880 A1 | 4/2013 |
| WO | 2013/057153 A1 | 4/2013 |
| WO | 2013/173504 A1 | 11/2013 |
| WO | 2014/004544 A2 | 1/2014 |
| WO | 2014/004612 A1 | 1/2014 |
| WO | 2014/022306 A2 | 2/2014 |
| WO | 2014/040022 A2 | 3/2014 |
| WO | 2014/047047 A1 | 3/2014 |
| WO | 2014/093339 A1 | 6/2014 |
| WO | 2014/093911 A2 | 6/2014 |
| WO | 2014/124332 A2 | 8/2014 |
| WO | 2014/144395 A2 | 9/2014 |
| WO | 2014/144949 A2 | 9/2014 |
| WO | 2014/149473 A1 | 9/2014 |
| WO | 2014/190106 A1 | 11/2014 |
| WO | 2014/197635 A2 | 12/2014 |
| WO | 2014/197730 A1 | 12/2014 |
| WO | 2014/200728 A1 | 12/2014 |
| WO | 2014/200731 A1 | 12/2014 |
| WO | 2014/209264 A1 | 12/2014 |
| WO | 2014/210392 A2 | 12/2014 |
| WO | 2015/004620 A2 | 1/2015 |
| WO | 2015/108758 A1 | 7/2015 |
| WO | 2015/130150 A1 | 9/2015 |
| WO | 2015/183755 A1 | 12/2015 |
| WO | 2015/183991 A1 | 12/2015 |
| WO | 2015/192117 A1 | 12/2015 |
| WO | 2015/195216 A1 | 12/2015 |
| WO | 2016/014877 A1 | 1/2016 |
| WO | 2016/106494 A1 | 7/2016 |
| WO | 2016/122902 A2 | 8/2016 |
| WO | 2016/126522 A1 | 8/2016 |
| WO | 2016/158792 A1 | 10/2016 |
| WO | 2016/161130 A1 | 10/2016 |
| WO | 2017/024142 A1 | 2/2017 |
| WO | 2017/058298 A1 | 4/2017 |
| WO | 2017/088487 A1 | 6/2017 |
| WO | 2017/112003 A1 | 6/2017 |
| WO | 2017/218153 A1 | 12/2017 |
| WO | 2018/005557 A1 | 1/2018 |
| WO | 2018/018810 A1 | 2/2018 |
| WO | 2018/034904 A1 | 2/2018 |
| WO | 2018/046957 A2 | 3/2018 |
| WO | 2018/125428 A1 | 7/2018 |
| WO | 2018/175735 A1 | 9/2018 |
| WO | 2018/208439 A1 | 11/2018 |
| WO | 2018/212885 A1 | 11/2018 |
| WO | 2018/213801 A1 | 11/2018 |
| WO | 2019/067902 A1 | 4/2019 |
| WO | 2019/074771 A1 | 4/2019 |
| WO | 2019/090434 A1 | 5/2019 |
| WO | 2019/135932 A1 | 7/2019 |
| WO | 2019/142560 A1 | 7/2019 |
| WO | 2019/147699 A2 | 8/2019 |
| WO | 2019/157869 A2 | 8/2019 |
| WO | 2019/172678 A1 | 9/2019 |
| WO | 2019/209608 A1 | 10/2019 |
| WO | 2019/213111 A1 | 11/2019 |
| WO | 2019/217163 A1 | 11/2019 |
| WO | 2019/236412 A1 | 12/2019 |
| WO | 2020/022039 A1 | 1/2020 |
| WO | 2020/066682 A1 | 4/2020 |
| WO | 2020/068372 A1 | 4/2020 |
| WO | 2020/121483 A1 | 6/2020 |
| WO | 2020/179027 A1 | 9/2020 |
| WO | 2020/226784 A1 | 11/2020 |
| WO | 2020/242595 A1 | 12/2020 |
| WO | 2020/247256 A1 | 12/2020 |
| WO | 2021/061351 A1 | 4/2021 |

(56) References Cited

FOREIGN PATENT DOCUMENTS

| WO | 2021/133053 | A1 | 7/2021 |
|---|---|---|---|
| WO | 2021/173839 | A1 | 9/2021 |
| WO | 2021/202783 | A1 | 10/2021 |
| WO | 2022/046340 | A1 | 3/2022 |
| WO | 2022/055821 | A1 | 3/2022 |
| WO | 2022/055822 | A1 | 3/2022 |
| WO | 2022/066395 | A1 | 3/2022 |
| WO | 2022/066399 | A1 | 3/2022 |
| WO | 2022/066535 | A2 | 3/2022 |
| WO | 2022/067075 | A1 | 3/2022 |
| WO | 2022/067343 | A2 | 3/2022 |
| WO | 2022/072187 | A2 | 4/2022 |
| WO | 2022/146936 | A1 | 7/2022 |
| WO | 2022/146938 | A1 | 7/2022 |
| WO | 2022/147146 | A1 | 7/2022 |
| WO | 2022/164881 | A1 | 8/2022 |
| WO | 2022/192040 | A1 | 9/2022 |
| WO | 2022/204664 | A1 | 9/2022 |
| WO | 2022/208797 | A1 | 10/2022 |
| WO | 2022/225795 | A1 | 10/2022 |
| WO | 2023/043646 | A1 | 3/2023 |
| WO | 2023/081574 | A1 | 5/2023 |
| WO | 2023/096940 | A2 | 6/2023 |
| WO | 2023/141535 | A1 | 7/2023 |
| WO | 2023/204841 | A1 | 10/2023 |
| WO | 2023/229989 | A1 | 11/2023 |
| WO | 2024/015321 | A1 | 1/2024 |
| WO | 2025/076064 | A1 | 4/2025 |

OTHER PUBLICATIONS

Apple Support, "Use Continuity to connect your Mac, iPhone, iPad, and Apple Watch", Available online at: https://support.apple.com/en-us/HT204681, Dec. 23, 2022, 4 pages.

Apple Support, "Use Message Effects with iMessage on Your iPhone, iPad, and iPod Touch", Available online at: https://support.apple.com/en-us/HT206894, Feb. 2, 2024, 5 pages.

"AquaSnap Window Manager: Dock, Snap, Tile, Organize", Available Online at: https://www.nurgo-software.com/products/aquasnap, Retrieved on Jun. 27, 2023, 5 pages.

"Area Light", Available online at: https://manual.keyshot.com/manual/materials/material-types/light-sources/area-light/, Retrieved on Jun. 9, 2023, 24 pages.

Artec Leo, Artec 3D, Retrieved from the Internet: <URL: https://artec3d.com/portable-3d-scanners/artec-leo>, Retrieved on Apr. 25, 2024, 39 pages.

Bhowmick, Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.

Brennan, Dominic, "4 Virtual Reality Desktops For Vive, Rift, And Windows VR Compared", Available online at: https://www.roadtovr.com/virtual-reality-desktop-compared-oculus-rift-htc-vive/, Jan. 3, 2018, 4 pages.

Cas and Chary XR, "Oculus Go & Your Phone As 2nd Controller!!—An InexpensiveWay To Play PC VR Games", Available Online at: https://www.youtube.com/watch?v=i_iRVa0kemw, Mar. 8, 2019, 22 pages.

Chatterjee, et al., "Gaze+Gesture: Expressive, Precise and Targeted Free-Space Interactions", ICMI '15: Proceedings of the 2015 ACM on International Conference on Multimodal Interaction, Available online at: https://dl.acm.org/doi/10.1145/2818346.2820752, Nov. 9-13, 2015, 8 pages.

Choe, et al., "Augmented-Reality-Based 3D Emotional Messenger for Dynamic User Communication with Smart Devices", Electronics, vol. 9, No. 1127, https://doi.org/10.3390/electronics9071127, Available Online at: https://www.mdpi.com/2079-9292/9/7/1127, Jul. 10, 2020, 15 pages.

"Coloring a Point Cloud Using 3DF Zephyr Pro", Available Online at: https://web.archive.org/web/20170522233043/http://www.3dflow.net:80/technology/docume nts/3df-zephyr-tutorials/point-cloud-coloring-using-3df-zephyr/, May 22, 2017, 1 page.

Cooleobrad, "How to Use Your Phone or Tablet in VR! I iOS and Android", Available online at: https://www.youtube.com/watch?v=QhfZjbVUxZE, Dec. 20, 2017, 4 pages.

"Data Sheet RealityCapture TARASQUE 1.2", Available Online at: https://web.archive.org/web/20220327110303/https://www.capturingreality.com/assets/Documents/datasheet_TARASQUE_1.2.pdf, Mar. 27, 2022, 5 pages.

DB Creations, "Voxel World Lens", Available Online at: https://www.snapchat.com/lens/689751dd6a7d446280d903d15d79f104, Retrieved on Apr. 25, 2024, 1 page.

Delmonte et al., "Semantics and Discourse Processing for Expressive TTS", Proceedings of the EM N LP 2015 Workshop on Linking Models of Lexical, Sentential and Discourse-level Semantics, Sep. 18, 2015, pp. 32-43.

Didehkhorshid, et al., "Text Input in Virtual Reality Using a Tracked Drawing Tablet", HCII 2020, LNCS 12428, Available Online at: https://link.springer.com/chapter/10.1007/978-3-030-59990-4_24, https://doi.org/10.1007/978-3-030-59990-4_24, 2020, pp. 314-329.

Digitize Designs, "Artec Leo Full 3D Scanning Demo w/ Sample Data", Available online at: <https://www.youtube.com/watch?v=ecBKo_h3Pug>, Feb. 23, 2019, 36 pages.

Dilmegani, et al., "Large Language Model Training in 2025", Available online at: https://research.aimultiple.com/large-language-model-training/, Oct. 10, 2024, 13 pages.

Ephtracy, "MagicaVoxel 0.99.5 Review", Available Online at: https://www.youtube.com/watch?v=WPPFnHQWwFk, Jun. 7, 2020, 2 pages.

Eye-supported target positioning in MRTK, Mixed Reality Toolkit Documentation, Available Online at: https://microsoft.github.io/MixedRealityToolkit-Unity/Documentation/EyeTracking/EyeTracking_Positioning.html, Retrieved on Mar. 3, 2025, 2 pages.

Fatima, et al., "Eye Movement Based Human Computer Interaction", 3rd International Conference On Recent Advances In Information Technology (RAIT), DOI: 10.1109/RAIT.2016.7507950, 2016, 6 pages.

Fujimoto et al., "Development of Task Control System of Multiple Robots Using Environmental Sensors", Proceedings of the 2017 JSME Conference on Robotics and Mechatronics, Fukushima, Japan, May 10, 2017, 4 pages (Official Copy only). {See Communication under Rule 37 CFR § 1.98(a) (3)}.

Gamedbharat, "I Want to Rotate a Object on Double Tap, Can Any One Help Me With This?", Online Available at: https://discussions.unity.com/t/i-want-to-rotate-a-object-on-double-tap-can-any-one-help-me-with-this/192010, Jul. 26, 2017, 3 pages.

"Home I Virtual Desktop", Available online at: https://www.vrdesktop.net, Jun. 29, 2023, 4 pages.

"If You Can Move Your Head, You Can Move Your World", Introducing Headmaster, Access to the Apple Macintosh for the physically disabled, Dec. 26, 2024, 4 pages.

Keyshot, "Feature Highlights", Available online at: https://manual.keyshot.com/manual/whats-new/feature-highlights/, Retrieved on Jun. 9, 2023, 28 pages.

Keyshot, "Light Manager", Available Online at: https://manual.keyshot.com/manual/lighting/lighting-manager/., Retrieved on Jun. 9, 2023, 3 pages.

Kitansenju Design, "Voxelization with ARKit4 and LiDAR", Retrieved from the Internet: <URL:https://twitter.com/kitasenjudesign/status/1282665402812608513>, Jul. 13, 2020, 1 page.

Kumar, Ajitesh, "Large Language Models (LLMs): Types, Examples", Available online at: https://vitalflux.com/large-language-models-concepts-examples/#How_does_LLM_work_Key_Building_Blocks, Jan. 31, 2024, 12 pages.

Lachambre, et al., "Unity Photogrammetry Workflow", Available Online at: https://unity3d.com/files/solutions/photogrammetry/Unity-Photogrammetry-Workflow_2017-07_v2.pdf, Jun. 23, 2017, 97 pages.

Lin, et al., "Towards Naturally Grabbing and Moving Objects in VR", S&T International Symposium on Electronic Imaging and The Engineering Reality of Virtual Reality, 2016 DOI: 10.2352/ISSN.2470-1173.2016.4.ERVR-415, 2016, 6 pages.

(56) References Cited

OTHER PUBLICATIONS

Lin, et al., "Ubii: Physical World Interaction Through Augmented Reality", Publisher: IEEE, vol. 16, No. 3 DOI:10.1109/TMC.2016. 2567378, Mar. 2017, pp. 872-885.

Locher, et al., "Mobile Phone and Cloud—a Dream Team for 3D Reconstruction", IEEE Winter Conference on Applications of Computer Vision (WACV), 2016, 2016, 8 pages.

Lor Cas, "Reality Capture: Exporting Mesh", Available Online at: https://www.youtube.com/watch?v=PdvTRa2B_s0, Dec. 10, 2020, 2 pages.

Macmostvideo, "A Beginner's Guide to Selecting Items On Your Mac (#1566)", Available Online at: https://www.youtube.com/watch?v=a6MDAuh7M0Q&ab_channel=macmostvideo/, Jan. 4, 2018, 2 pages.

Mcgill, et al., "Expanding The Bounds Of Seated Virtual Workspaces", Available online at: https://core.ac.uk/download/pdf/323988271. pdf, Jun. 5, 2020, 44 pages.

Metalnwood, "Using a Tablet for Touch Control, with VR Headset On", Virtual Reality, ED Forums, Available online at: https://forum. dcs.world/topic/237992-using-a-tablet-for-touch-control-with-vr-headset-ondemo-vid/, Jun. 12, 2020, 9 pages.

Muller, et al., "A Taxonomy for Information Linking in Augmented Reality", Available in: Part of the book series: Lecture Notes in Computer Science, LNIP, vol. 9768, Jun. 2016, pp. 368-387.

"Open Source Voxel Editor for Windows, Mac, Linux, iOS, and Android", Goxel 3D Voxel Editor Online Available at: https://goxel. xyz, Retrieved on Apr. 25, 2024, 3 pages.

Pan et al., "A Chapter-Wise Understanding System for Text-to-Speech in Chinese Novels", IEEE International Conference on Acoustics, Speech and Signal Processing (ICASSP), 2021, pp. 6069-6073.

Pfeuffer, et al., "Gaze + Pinch Interaction in Virtual Reality", In Proceedings of SUI '17, Brighton, United Kingdom, Oct. 16-17, 2017, pp. 99-108.

Pfeuffer, et al., "Gaze and Touch Interaction on Tablets", UIST '16, Tokyo, Japan, ACM, DOI: http://dx.doi.org/10.1145/2984511. 2984514, Oct. 16-19, 2016, pp. 301-311.

Phoria, "shareVOX—Create Voxel Art Together in AR | with Google", Available Online at: https://www.youtube.com/watch?v=ikHM2QZJvhY, May 10, 2018, 2 pages.

Pi3dscan, "Process a 3D Scan With Projection in Reality Capture (RC)", Available Online at: https://web.archive.org/web/20240712130939/https://www.pi3dscan.com/index.php/instructions/item/process-a-3d-scan-with-projection-in-reality-capture-rc, Jul. 1, 2018, 8 pages.

Pradhan et al., "Understanding and Managing Notifications", IEEE INFOCOM 2017—IEEE Conference on Computer Communications, 2017, 9 pages.

Progsoft, "Curious Blocks Alternatives 12", Available online at: https://progsoft.net/en/software/curious-blocks, Retrieved on Apr. 25, 2024, 7 pages.

Qi, et al., "PointNet++: Deep Hierarchical Feature Learning on Point Sets in a Metric Space", Retrieved from the Internet: <URL: https://arxiv.org/abs/1706.02413>, Jun. 7, 2017, 14 pages.

Rahul et al., "Genre Classification using Character Networks", Proceedings of the Fifth International Conference on Intelligent Computing and Control Systems, May 6-8, 2021, pp. 216-222.

RealityScan, "RealityCapture tutorial: Complete model in PPI", Available Online at: https://www.youtube.com/watch?v=tw6wNNEbH_M, Oct. 14, 2021, 2 pages.

Revopoint, "Revopoint POP 2: Handheld 3D Scanner", Online Available At: https://global.revopoint3d.com/products/face-3d-scanner-pop2?_ga=2.182721893.277596832.1650264227-586470518. 1640327512&ref=dh0L07OOzRuqo&utm_campaign=pop2_banner &utm_medium=referral&utm_source=Official_Website, Retrieved on Apr. 25, 2024, 16 pages.

Ro, et al., "AR Pointer: Advanced Ray-Casting Interface Using Laser Pointer Metaphor for Object Manipulation in 3D Augmented Reality Environment", Available Online at: DOI:10.3390/app9153078 Applied Sciences, vol. 9, No. 3078, Jul. 30, 2019, 18 pages.

Rossiev, Denis, "Voxelize: Making a Real-Time AR Voxel Scanner with Export on Snapchat", Available Online at: https://www.rossiev. pro/voxelize/, Retrieved on Apr. 25, 2024, 16 pages.

Sarikaya, Ruhi, "The Technology Behind Personal Digital Assistants: An overview of the system architecture and key components", IEEE Signal Processing Magazine 34.1, Jan. 11, 2017, pp. 67-81.

Sarkar et al., "Data-Driven Pause Prediction for Synthesis of Storytelling Style Speech based on Discourse Modes", 2015 IEEE International Conference on Electronics, Computing and Communication Technologies, 2015, 5 pages.

Sarkar, et al., "Analysis and Modeling Pauses for Synthesis of Storytelling Speech Based on Discourse Modes", Proceedings of the IEEE International Conference on Contemporary Computing (IC3 2015),, Aug. 11-13, 2015, 6 pages.

Sarkar, et al., "Development of Story Text-to-Speech System Based on Story Genres", Workshop on Machine Learning in Speech and Language Processing (MLSLP 2016),, Sep. 13, 2016, 5 pages.

Sarkar, et al., "Modeling Pauses for Synthesis of Storytelling Style Speech Using Unsupervised Word Features", Second International Symposium on Computer Vision and the Internet (VisionNet'15), Procedia Computer Science, vol. 58,, 2015, 8 pages.

Schenk, et al., "SPOCK: A Smooth Pursuit Oculomotor Control Kit", CHI'16 Extended Abstracts, San Jose, CA, USA, ACM, hdp://dx.doi.org/10.1145/2851581.2892291, May 7-12, 2016, pp. 2681-2687.

Schubert, Martin, "Design Sprints at Leap Motion: A Playground of 3D User Interfaces", Available Online at: https://blog.leapmotion. com/design-playground-3duser-interfaces/, Nov. 8, 2017, 17 pages.

Schutz, Markus, "Interactive Exploration of Point Clouds", Available Online at: https://doi.org/10.34726/hss.2021.91668, Mar. 8, 2021, 119 pages.

"Simple Modal Window With Background Blur Effect", CSS Script, Available online at: http://web.archive.org/web/20160313233427/https://www.cssscript.com/simple-modal-window-with-background-blur-effect/, Mar. 7, 2016, 5 pages.

Singh, Sonit, "Natural Language Processing for Information Extraction" arxiv.org, Online Available at: https://arxiv.org/abs/1807. 02383, Jul. 6, 2018, 24 pages.

Sliders, Mixed Reality Toolkit Documentation, Available Online at: https://microsoft.github.io/MixedRealityToolkit-Unity/Documentation/README_Sliders.html, Mar. 21, 2025, 3 pages.

Spatial Audio Head Tracking On Apple Tv Automatically Resets When You Get Up From The Couc . . . , Available Online at: https://forums.appleinsider.com/discussion/222259/spatial-audio-head-trackingon-apple-tv-automatically-resets-when-you-get-up-from-the-couc, Jun. 10, 2021, 6 pages.

Strand, Robin, "Surface Skeletons in Grids with Non-Cubic Voxels", Retrieved from the Internet: <URL: https://www.researchgate.net/publication/4090277_Surface_skeletons_in_grids_with_non-cubic_voxels> DOI: 10.1109/ICPR.2004.1334195, Sep. 2004, 5 pages.

Sun, et al., "MagicHand: Interact with IoT Devices in Augmented Reality Environment", 2019 IEEE Conference on Virtual Reality and 3D User Interfaces, Osaka, Japan, Mar. 23-27, 2019, pp. 1738-1743.

Technomentary, "How to Control Your iPhone with Voice Control", Online Available at: https://www.youtube.com/watch?v=F67x3n_Tx04, Aug. 5, 2021, 3 pages.

Thesandboxgame, "VoxEdit Beta Tutorial—Introduction And How To Animate Voxel Creations", Online Available At: https://www.youtube.com/watch?v=fqcArJWtyqM, Jan. 15, 2021, 2 pages.

Tolle, et al., "Design of Head Movement Controller System (HEMOCS) for Control Mobile Application through Head Pose Movement Detection", Available Online at: https://online-journals.org/index. php/i-jim/article/view/5552/4029, vol. 10, Issue 3, DOI: dx.doi.org/10.3991/ijim.v10i3.5552, 2016, pp. 24-28.

Tripathi, et al., "Sentence Based Discourse Classification for Hindi Story Text-to-Speech (TTS) System", Processing of the thirteenth International Conference on Natural Language Processing (ICON-2016), Dec. 2016, pp. 46-54.

(56) References Cited

OTHER PUBLICATIONS

Tyriel Wood—VR Tech, "The HoloLens 2 Tour!—Discovering a World of Holograms", Available Online at: https://www.youtube.com/watch?v=rMks7sMzPxl, Mar. 23, 2021, 2 pages.

Unbox Therapy, "World's First Under-Display Camera Smartphone is Here", Available online at: https://youtu.be/Y5Dbcw7QWRo?si=8kXJ7Nmop8EOhni3, Sep. 21, 2020, 14 pages.

Verma, et al., "Conversion of Neutral Speech to Storytelling Style Speech", Proceedings of the eighth IEEE International Conference on Advances in Pattern Recognition (ICAPR 2015), 2015, 6 pages.

Wang et al., "Style Tokens: Unsupervised Style Modeling, Control and Transfer in End-to-End Speech Synthesis", Proceedings of the 35th International Conference on Machine Learning, Stockholm, Sweden, PMLR 80, 2018, 10 pages.

Wang, et al. "LM-Combiner: A Contextual Rewriting Model for Chinese Grammatical Error Correction", arxiv.org, Online Available at: https://arxiv.org/pdf/2403.17413, Mar. 26, 2024, 11 pages.

Wang, et al., "WearID: Wearable-Assisted Low-Effort Authentication to Voice Assistants using Cross-Domain Speech Similarity", Online available at : https://arxiv.org/abs/2003.09083, Apr. 9, 2020, 15 pages.

"What are large language models (LLMs)?", Available online at: https://www.elastic.co/what-is/large-language-models,, Retrieved on Apr. 3, 2025, 16 pages.

Worsham, et al., "Genre Identification and the Compositional Effect of Genre in Literature", Proceedings of the 27th International Conference on Computational Linguistics,, Aug. 20-26, 2018, pp. 1963-1973.

Writtenhouse, Sandy, "How to Use Live View on Google Maps", Available online at: https://www.lifewire.com/use-live-view-google-maps-5323691, Jul. 5, 2022, 6 pages.

Yamada, Yoshihiro, "How to Generate a Modal Window with ModalPopup Control", Available Online at: http://web.archive.org/web/20210920015801/https://atmarkit.itmedia.co.jp/fdotnet/dotnettips/580aspajaxmodalpopup/aspajaxmodalpopup.html, Sep. 20, 2021, 8 pages (Official Copy only). {See Communication under Rule 37 CFR § 1.98(a) (3)}.

"Your PC in VR, Virtual Desktop", Available Online at: https://www.vrdesktop.net/, Apr. 17, 2024, 4 pages.

Yue, et al., "Optimal Region Selection for Stereoscopic Video Subtitle Insertion", IEEE Transactions on Circuits and Systems for Video Technology, vol. 28, No. 11, Nov. 2018, pp. 3141-3153.

Zafari, et al. "A Survey of Indoor Localization Systems and Technologies Online", Available at: IEEE Communications Surveys & Tutorials, vol. 21, No. 3, Third Quarter, Issue 3Apr. 2019pp. 2568-2599.

Intention to Grant received for European Patent Application No. 24157846.7, mailed on Oct. 22, 2025, 12 pages.

Intention to Grant received for European Patent Application No. 24157846.7, mailed on Jan. 27, 2026, 12 pages.

Notice of Allowance received for Korean Patent Application No. 10-2024-7031654, mailed on Jan. 13, 2026, 7 pages (2 pages of English Translation and 5 pages of Official Copy).

Decision to Grant received for European Patent Application No. 24157846.7, mailed on Mar. 5, 2026, 4 pages.

* cited by examiner

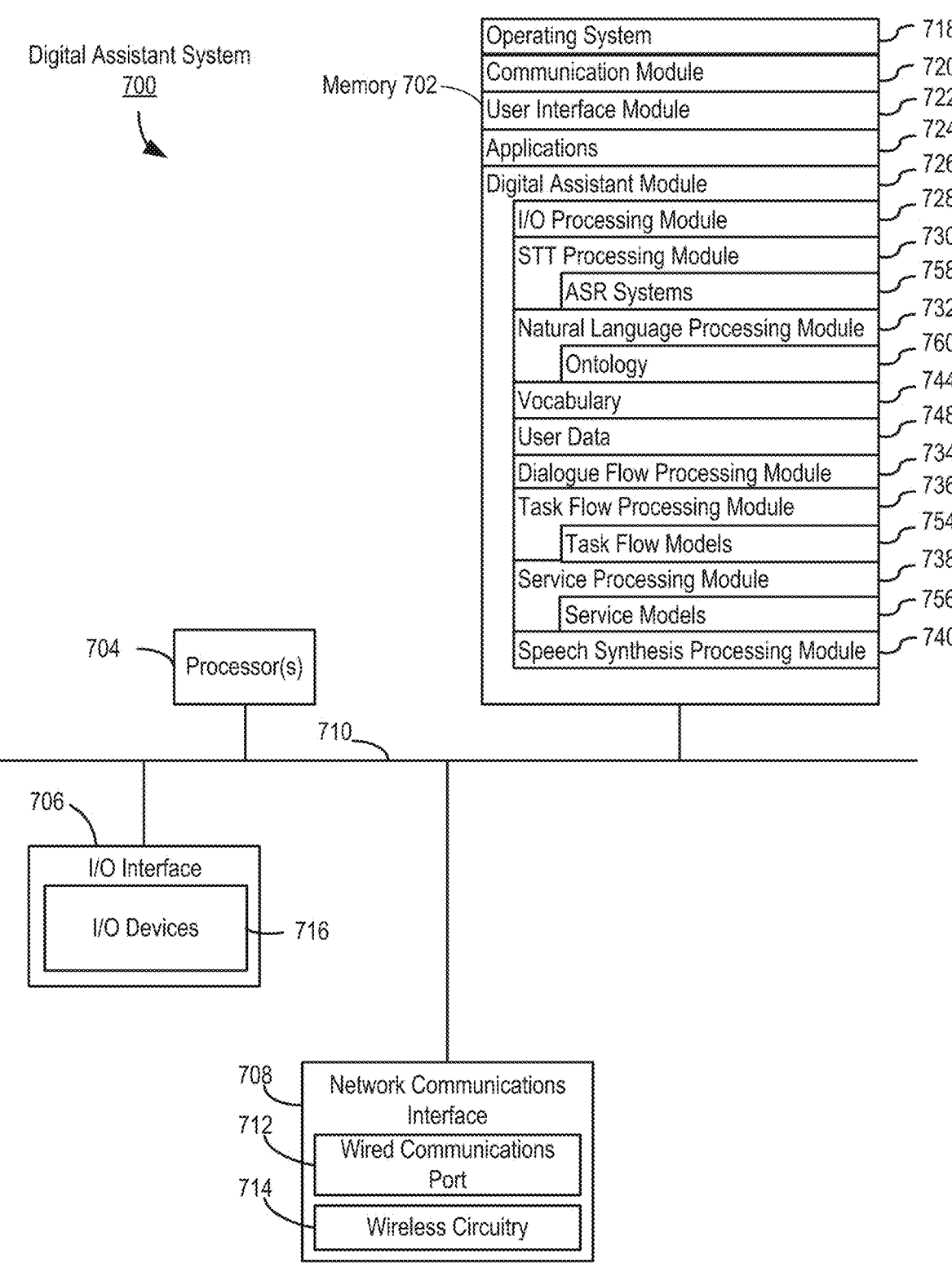

Digital Assistant System
700

Memory 702

Operating System — 718
Communication Module — 720
User Interface Module — 722
Applications — 724
Digital Assistant Module — 726
I/O Processing Module — 728
STT Processing Module — 730
ASR Systems — 758
Natural Language Processing Module — 732
Ontology — 760
Vocabulary — 744
User Data — 748
Dialogue Flow Processing Module — 734
Task Flow Processing Module — 736
Task Flow Models — 754
Service Processing Module — 738
Service Models — 756
Speech Synthesis Processing Module — 740

704 — Processor(s)

710

706 — I/O Interface
I/O Devices — 716

708 — Network Communications Interface
712 — Wired Communications Port
714 — Wireless Circuitry

*FIG. 7A*

ATTENTION AWARE VIRTUAL ASSISTANT DISMISSAL

This application is a continuation of U.S. patent application Ser. No. 18/773,295, entitled "ATTENTION AWARE VIRTUAL ASSISTANT DISMISSAL," filed on Jul. 15, 2024, which is a continuation of U.S. patent application Ser. No. 18/130,346, now U.S. Pat. No. 12,061,752, entitled "ATTENTION AWARE VIRTUAL ASSISTANT DISMISSAL," filed on Apr. 3, 2023, which is a continuation of U.S. patent application Ser. No. 17/836,907, now U.S. Pat. No. 11,630,525, entitled "ATTENTION AWARE VIRTUAL ASSISTANT DISMISSAL," filed on Jun. 9, 2022 which is a continuation of U.S. patent application Ser. No. 17/322, 115, now U.S. Pat. No. 11,360,577, entitled "ATTENTION AWARE VIRTUAL ASSISTANT DISMISSAL," filed on May 17, 2021, which is a continuation of U.S. patent application Ser. No. 16/885,027, now U.S. Pat. No. 11,009, 970, entitled "ATTENTION AWARE VIRTUAL ASSISTANT DISMISSAL," filed on May 27, 2020, which is a continuation of U.S. patent application Ser. No. 16/039,099, now U.S. Pat. No. 10,684,703, entitled "ATTENTION AWARE VIRTUAL ASSISTANT DISMISSAL," filed on Jul. 18, 2018, which claims priority to U.S. Patent Application No. 62/679,332, entitled "ATTENTION AWARE VIRTUAL ASSISTANT DISMISSAL, filed on Jun. 1, 2018. The contents of each of these applications are hereby incorporated by reference in their entireties.

FIELD

This relates generally to intelligent automated assistants and, more specifically, to efficient dismissal of intelligent automated assistant sessions.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

Operating a digital assistant requires electric power, which is a limited resource on handheld or portable devices that rely on batteries and on which digital assistants often run. Accordingly, it can be desirable to operate a digital assistant in an energy efficient manner.

SUMMARY

Example methods are disclosed herein. An example method includes, at an electronic device having one or more processors, initiating a virtual assistant session responsive to receiving user input. In accordance with initiating the virtual assistant session, the method includes determining, based on data obtained using one or more sensors of the electronic device, whether one or more criteria representing expressed user disinterest are satisfied. In accordance with determining that the one or more criteria representing expressed user disinterest are satisfied prior to a first time, the method includes automatically deactivating the virtual assistant session prior to the first time. The first time is defined by a setting of the electronic device. In accordance with determining that the one or more criteria representing expressed user disinterest are not satisfied prior to the first time, the method includes automatically deactivating the virtual assistant session at the first time.

Example non-transitory computer-readable media are disclosed herein. An example non-transitory computer-readable storage medium stores one or more programs. The one or more programs comprise instructions, which when executed by one or more processors of an electronic device, cause the electronic device to: initiate a virtual assistant session responsive to receiving user input; in accordance with initiating the virtual assistant session, determine, based on data obtained using one or more sensors of the electronic device, whether one or more criteria representing expressed user disinterest are satisfied; and in accordance with determining that the one or more criteria representing expressed user disinterest are satisfied prior to a first time, automatically deactivate the virtual assistant session prior to the first time, wherein the first time is defined by a setting of the electronic device; and in accordance with determining that the one or more criteria representing expressed user disinterest are not satisfied prior to the first time, automatically deactivate the virtual assistant session at the first time.

Example electronic devices are disclosed herein. An example electronic device comprises one or more processors; a memory; and one or more programs, where the one or more programs are stored in the memory and configured to be executed by the one or more processors, the one or more programs including instructions for: initiating a virtual assistant session responsive to receiving user input; in accordance with initiating the virtual assistant session, determining, based on data obtained using one or more sensors of the electronic device, whether one or more criteria representing expressed user disinterest are satisfied; and in accordance with determining that the one or more criteria representing expressed user disinterest are satisfied prior to a first time, automatically deactivating the virtual assistant session prior to the first time, wherein the first time is defined by a setting of the electronic device; and in accordance with determining that the one or more criteria representing expressed user disinterest are not satisfied prior to the first time, automatically deactivating the virtual assistant session at the first time.

An example electronic device comprises means for: initiating a virtual assistant session responsive to receiving user input; in accordance with initiating the virtual assistant session, determining, based on data obtained using one or more sensors of the electronic device, whether one or more criteria representing expressed user disinterest are satisfied; and in accordance with determining that the one or more criteria representing expressed user disinterest are satisfied prior to a first time, automatically deactivating the virtual assistant session prior to the first time, wherein the first time is defined by a setting of the electronic device; and in accordance with determining that the one or more criteria representing expressed user disinterest are not satisfied prior to the first time, automatically deactivating the virtual assistant session at the first time.

Example methods are disclosed herein. An example method includes, at an electronic device having one or more processors: initiating a virtual assistant session responsive to receiving user input; in accordance with initiating the virtual assistant session, determining, based on data obtained using one or more sensors of the electronic device, whether one or more criteria representing expressed user engagement are satisfied; in accordance with determining that the one or more criteria representing expressed user engagement are satisfied prior to a first time, forgoing deactivating the virtual assistant session at the first time, wherein the first time is a predetermined duration after a second time at which a final result for the virtual assistant session is presented; and in accordance with determining that the one or more criteria representing expressed user engagement are not satisfied prior to the first time, deactivating the virtual assistant session at the first time.

Example non-transitory computer-readable media are disclosed herein. An example non-transitory computer-readable storage medium stores one or more programs. The one or more programs comprise instructions, which when executed by one or more processors of an electronic device, cause the electronic device to: initiate a virtual assistant session responsive to receiving user input; in accordance with initiating the virtual assistant session, determine, based on data obtained using one or more sensors of the electronic device, whether one or more criteria representing expressed user engagement are satisfied; in accordance with determining that the one or more criteria representing expressed user engagement are satisfied prior to a first time, forgo deactivating the virtual assistant session at the first time, wherein the first time is a predetermined duration after a second time at which a final result for the virtual assistant session is presented; and in accordance with determining that the one or more criteria representing expressed user engagement are not satisfied prior to the first time, deactivate the virtual assistant session at the first time.

Example electronic devices are disclosed herein. An example electronic device comprises one or more processors; a memory; and one or more programs, where the one or more programs are stored in the memory and configured to be executed by the one or more processors, the one or more programs including instructions for: initiating a virtual assistant session responsive to receiving user input; in accordance with initiating the virtual assistant session, determining, based on data obtained using one or more sensors of the electronic device, whether one or more criteria representing expressed user engagement are satisfied; in accordance with determining that the one or more criteria representing expressed user engagement are satisfied prior to a first time, forgoing deactivating the virtual assistant session at the first time, wherein the first time is a predetermined duration after a second time at which a final result for the virtual assistant session is presented; and in accordance with determining that the one or more criteria representing expressed user engagement are not satisfied prior to the first time, deactivating the virtual assistant session at the first time.

An example electronic device comprises means for: initiating a virtual assistant session responsive to receiving user input; in accordance with initiating the virtual assistant session, determining, based on data obtained using one or more sensors of the electronic device, whether one or more criteria representing expressed user engagement are satisfied; in accordance with determining that the one or more criteria representing expressed user engagement are satisfied prior to a first time, forgoing deactivating the virtual assistant session at the first time, wherein the first time is a predetermined duration after a second time at which a final result for the virtual assistant session is presented; and in accordance with determining that the one or more criteria representing expressed user engagement are not satisfied prior to the first time, deactivating the virtual assistant session at the first time.

Determining, based on data obtained using one or more sensors of the electronic device, whether one or more criteria representing expressed user disinterest are satisfied (and/or whether one or more criteria representing expressed user engagement are satisfied) allows determination of whether a user is engaged with a virtual assistant session. Knowing whether a user is engaged allows intelligent decision making about whether to deactivate the virtual assistant session. For example, if the user is not engaged, a device can deactivate the virtual assistant session to save battery and processing power. As another example, if the user is engaged, the device can forgo deactivating the virtual assistant session so the user can continue interacting with the virtual assistant session (and so the virtual assistant session does not deactivate while the user is still interacting with it). In this manner, the user-device interface is made more efficient (e.g., by deactivating a virtual assistant session when a user is not engaged with it, by preventing deactivation of a virtual assistant session while the user is actively engaged with it, or by reducing user input to re-initiate an incorrectly deactivated virtual assistant session) which additionally, reduces power usage and improves battery life of the device by enabling the user to use the device more quickly and efficiently.

BRIEF DESCRIPTION OF THE DRAWINGS

FIG. 7A is a block diagram illustrating a digital assistant system or a server portion thereof, according to various examples.

DETAILED DESCRIPTION

In the following description of examples, reference is made to the accompanying drawings in which are shown by way of illustration specific examples that can be practiced. It is to be understood that other examples can be used and structural changes can be made without departing from the scope of the various examples.

The present disclosure generally relates to determining whether to deactivate a virtual assistant session based on determining whether a user is engaged with the virtual assistant session. For example, if a user is not engaged with a virtual assistant session, the virtual assistant session may be automatically deactivated to conserve battery and processing power. If a user is engaged with the virtual assistant session, automatic deactivation of the virtual assistant may be forgone or delayed so the virtual assistant session does not deactivate while the user is engaged. In this manner, user experience operating virtual assistants is improved.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input are both inputs and, in some cases, are separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

Figure 1:
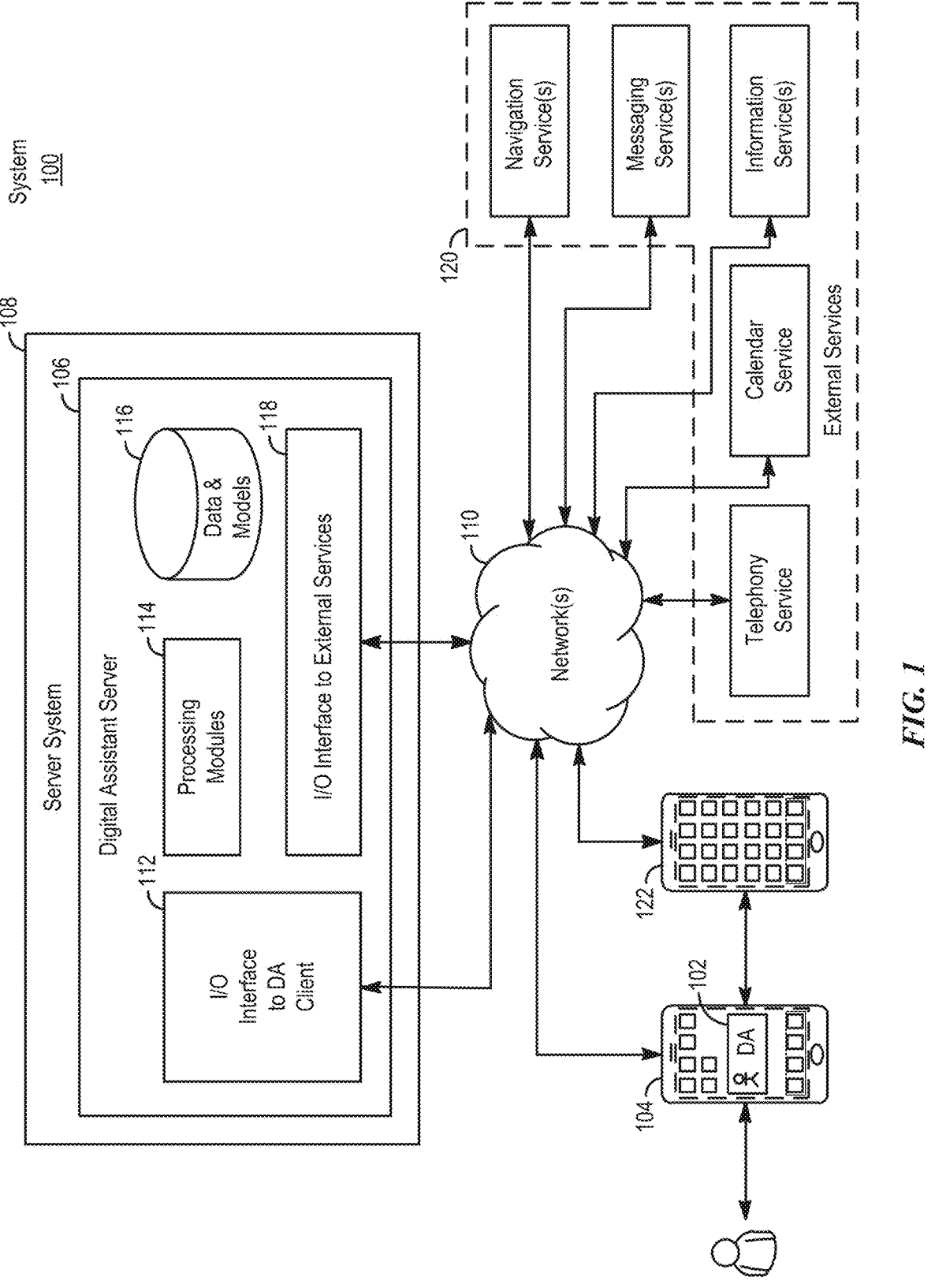
FIG. 1 is a block diagram illustrating a system and environment for implementing a digital assistant, according to various examples.

FIG. 1 illustrates a block diagram of system 100 according to various examples. In some examples, system 100 implements a digital assistant. The terms "digital assistant," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1, in some examples, a digital assistant is implemented according to a client-server model. The digital assistant includes client-side portion 102 (hereafter "DA client 102") executed on user device 104 and server-side portion 106 (hereafter "DA server 106") executed on server system 108. DA client 102 communicates with DA server 106 through one or more networks 110. DA client 102 provides client-side functionalities such as user-facing input and output processing and communication with DA server 106. DA server 106 provides server-side functionalities for any number of DA clients 102 each residing on a respective user device 104.

In some examples, DA server 106 includes client-facing I/O interface 112, one or more processing modules 114, data and models 116, and I/O interface to external services 118. The client-facing I/O interface 112 facilitates the client-facing input and output processing for DA server 106. One or more processing modules 114 utilize data and models 116 to process speech input and determine the user's intent based on natural language input. Further, one or more processing modules 114 perform task execution based on inferred user intent. In some examples, DA server 106 communicates with external services 120 through network(s) 110 for task completion or information acquisition. I/O interface to external services 118 facilitates such communications.

User device 104 can be any suitable electronic device. In some examples, user device 104 is a portable multifunctional device (e.g., device 200, described below with reference to FIG. 2A), a multifunctional device (e.g., device 400, described below with reference to FIG. 4), or a personal electronic device (e.g., device 600, described below with reference to FIG. 6A-B.) A portable multifunctional device is, for example, a mobile telephone that also contains other functions, such as PDA and/or music player functions.

Specific examples of portable multifunction devices include the Apple Watch®, iPhone®, iPod Touch®, and iPad® devices from Apple Inc. of Cupertino, California. Other examples of portable multifunction devices include, without limitation, earphones/headphones, speakers, and laptop or tablet computers. Further, in some examples, user device 104 is a non-portable multifunctional device. In particular, user device 104 is a desktop computer, a game console, a speaker, a television, or a television set-top box. In some examples, user device 104 includes a touch-sensitive surface (e.g., touch screen displays and/or touchpads). Further, user device 104 optionally includes one or more other physical user-interface devices, such as a physical keyboard, a mouse, and/or a joystick. Various examples of electronic devices, such as multifunctional devices, are described below in greater detail.

Examples of communication network(s) 110 include local area networks (LAN) and wide area networks (WAN), e.g., the Internet. Communication network(s) 110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more stand-alone data processing apparatus or a distributed network of computers. In some examples, server system 108 also employs various virtual devices and/or services of third-party service providers (e.g., third-party cloud service providers) to provide the underlying computing resources and/or infrastructure resources of server system 108.

In some examples, user device 104 communicates with DA server 106 via second user device 122. Second user device 122 is similar or identical to user device 104. For example, second user device 122 is similar to devices 200, 400, or 600 described below with reference to FIGS. 2A, 4, and 6A-B. User device 104 is configured to communicatively couple to second user device 122 via a direct communication connection, such as Bluetooth, NFC, BTLE, or the like, or via a wired or wireless network, such as a local Wi-Fi network. In some examples, second user device 122 is configured to act as a proxy between user device 104 and DA server 106. For example, DA client 102 of user device 104 is configured to transmit information (e.g., a user request received at user device 104) to DA server 106 via second user device 122. DA server 106 processes the information and returns relevant data (e.g., data content responsive to the user request) to user device 104 via second user device 122.

In some examples, user device 104 is configured to communicate abbreviated requests for data to second user device 122 to reduce the amount of information transmitted from user device 104. Second user device 122 is configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100, in some examples, includes any number and type of user devices configured in this proxy configuration to communicate with DA server system 106.

Although the digital assistant shown in FIG. 1 includes both a client-side portion (e.g., DA client 102) and a server-side portion (e.g., DA server 106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

2. Electronic Devices

Figure 2A:
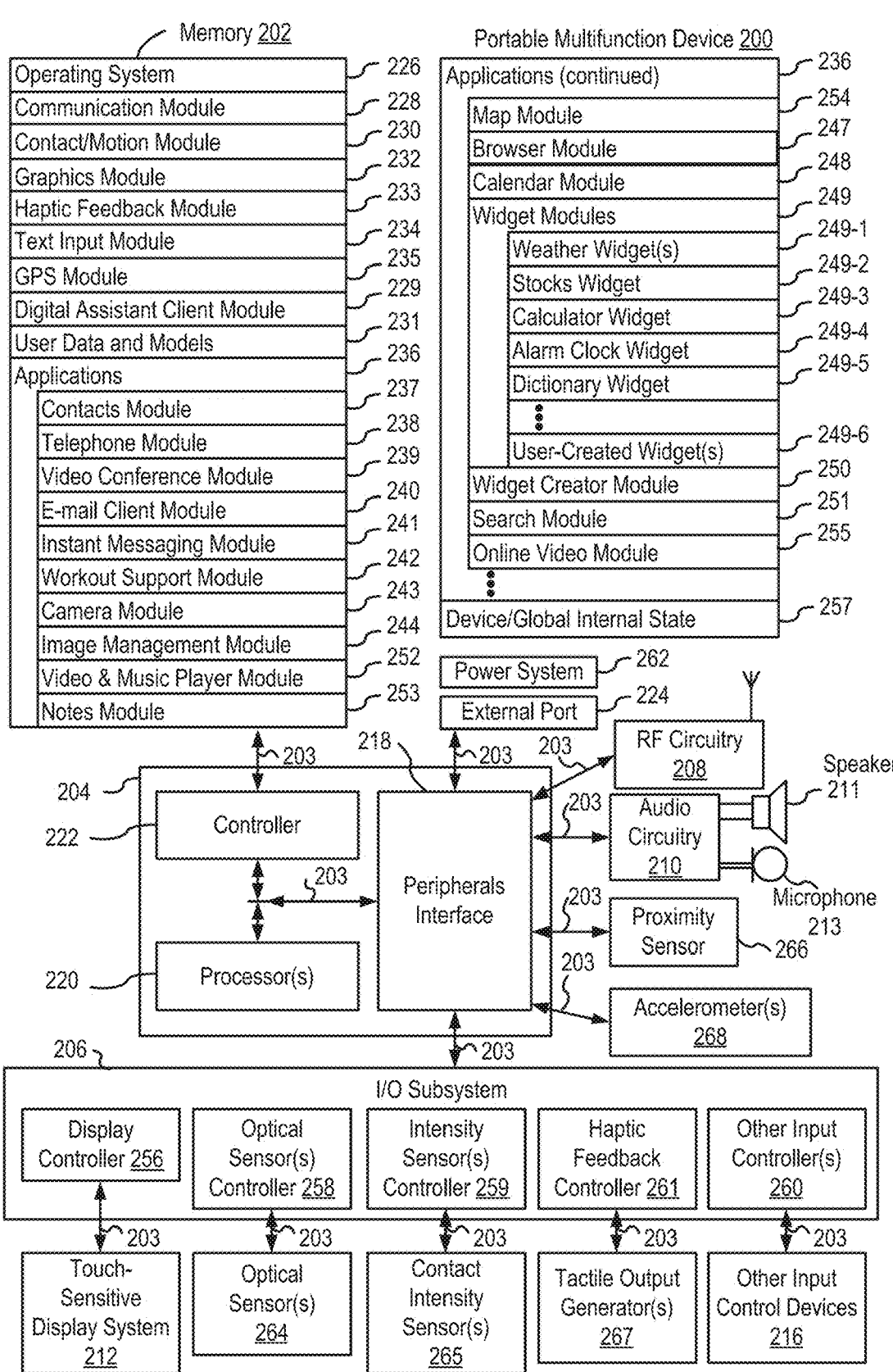
FIG. 2A is a block diagram illustrating a portable multifunction device implementing the client-side portion of a digital assistant, according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 includes one or more computer-readable storage mediums. The computer-readable storage mediums are, for example, tangible and non-transitory. Memory 202 includes high-speed random access memory and also includes non-volatile memory, such as one or more magnetic disk storage devices, flash memory devices, or other non-volatile solid-state memory devices. Memory controller 222 controls access to memory 202 by other components of device 200.

In some examples, a non-transitory computer-readable storage medium of memory 202 is used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) are stored on a non-transitory computer-readable storage medium (not shown) of the server system 108 or are divided between the non-transitory computer-readable storage medium of memory 202 and the non-transitory computer-readable storage medium of server system 108.

Peripherals interface 218 is used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 are implemented on a single chip, such as chip 204. In some other embodiments, they are implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data are retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button disengages a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) turns power to device 200 on or off. The user is able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output includes graphics, text, icons, video, and any combination thereof (collectively termed "graphics"). In some embodiments, some or all of the visual output correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 uses LCD (liquid crystal display) technology, LPD (light emitting polymer display) technology, or LED (light emitting diode) technology, although other display technologies may be used in other embodiments. Touch screen 212 and display controller 256 detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, California.

A touch-sensitive display in some embodiments of touch screen 212 is analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 is as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 has, for example, a video resolution in excess of 100 dpi. In some embodiments, the touch screen has a video resolution of approximately 160 dpi. The user makes contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 includes a touchpad (not shown) for activating or deactivating particular functions. In some embodiments, the touchpad is a touch-sensitive area of the device that, unlike the touch screen, does not display visual output. The touchpad is a touch-sensitive surface that is separate from touch screen 212 or an extension of the touch-sensitive surface formed by the touch screen.

Device 200 also includes power system 262 for powering the various components. Power system 262 includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 also includes one or more optical sensors 264. FIG. 2A shows an optical sensor coupled to optical sensor controller 258 in I/O subsystem 206. Optical sensor 264 includes charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 captures still images or video. In some embodiments, an optical sensor is located on the back of device 200, opposite touch screen display 212 on the front of the device so that the touch screen display is used as a viewfinder for still and/or video image acquisition. In some embodiments, an optical sensor is located on the front of the device so that the user's image is obtained for video conferencing while the user views the other video conference participants on the touch screen display. In some embodiments, the position of optical sensor 264 can be changed by the user (e.g., by rotating the lens and the sensor in the device housing) so that a single optical sensor 264 is used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 also includes one or more proximity sensors 266. FIG. 2A shows proximity sensor 266 coupled to peripherals interface 218. Alternately, proximity sensor 266 is coupled to input controller 260 in I/O subsystem 206. Proximity sensor 266 is performed as described in U.S. patents application Ser. Nos. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 also includes one or more accelerometers 268. FIG. 2A shows accelerometer 268 coupled to peripherals interface 218. Alternately, accelerometer 268 is coupled to an input controller 260 in I/O subsystem 206. Accelerometer 268 performs, for example, as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
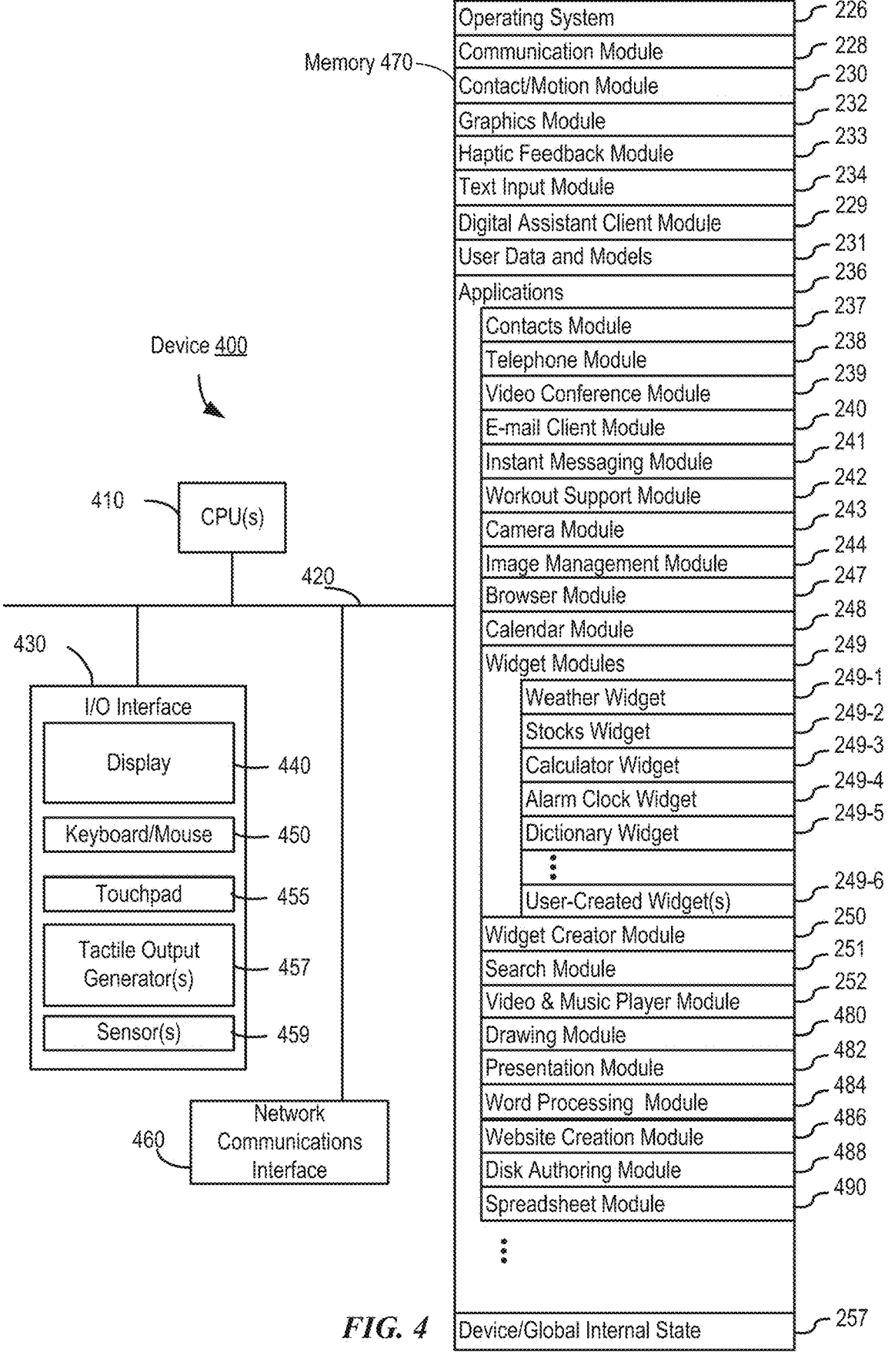
FIG. 4 is a block diagram of an exemplary multifunction device with a display and a touch-sensitive surface, according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 stores data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which is, in some examples, a component of graphics module 232, provides soft keyboards for entering text in various applications (e.g., contacts module 237, email client module 240, IM module 241, browser module 247, and any other application that needs text input).

GPS module 235 determines the location of the device and provides this information for use in various applications (e.g., to telephone module 238 for use in location-based dialing; to camera module 243 as picture/video metadata; and to applications that provide location-based services such as weather widgets, local yellow page widgets, and map/navigation widgets).

Digital assistant client module 229 includes various client-side digital assistant instructions to provide the client-side functionalities of the digital assistant. For example, digital assistant client module 229 is capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 is also capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output is provided as voice, sound, alerts, text messages, menus, graphics, videos, animations, vibrations, and/or combinations of two or more of the above. During operation, digital assistant client module 229 communicates with DA server 106 using RF circuitry 208.

User data and models 231 include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 include various models (e.g., speech recognition models, statistical language models, natural language processing models, ontology, task flow models, service models, etc.) for processing user input and determining user intent.

In some examples, digital assistant client module 229 utilizes the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 provides the contextual information or a subset thereof with the user input to DA server 106 to help infer the user's intent. In some examples, the digital assistant also uses the contextual information to determine how to prepare and deliver outputs to the user. Contextual information is referred to as context data.

In some examples, the contextual information that accompanies the user input includes sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 is provided to DA server 106 as contextual information associated with a user input.

In some examples, the digital assistant client module 229 selectively provides information (e.g., user data 231) stored on the portable multifunction device 200 in response to requests from DA server 106. In some examples, digital assistant client module 229 also elicits additional input from the user via a natural language dialogue or other user interfaces upon request by DA server 106. Digital assistant client module 229 passes the additional input to DA server 106 to help DA server 106 in intent deduction and/or fulfillment of the user's intent expressed in the user request.

A more detailed description of a digital assistant is described below with reference to FIGS. 7A-7C. It should be recognized that digital assistant client module 229 can include any number of the sub-modules of digital assistant module 726 described below.

Applications 236 include the following modules (or sets of instructions), or a subset or superset thereof:

Contacts module 237 (sometimes called an address book or contact list);
Telephone module 238;
Video conference module 239;
E-mail client module 240;
Instant messaging (IM) module 241;
Workout support module 242;
Camera module 243 for still and/or video images;
Image management module 244;
Video player module;
Music player module;
Browser module 247;
Calendar module 248;
Widget modules 249, which includes, in some examples, one or more of: weather widget 249-1, stocks widget 249-2, calculator widget 249-3, alarm clock widget

249-4, dictionary widget 249-5, and other widgets obtained by the user, as well as user-created widgets 249-6;
Widget creator module 250 for making user-created widgets 249-6;
Search module 251;
Video and music player module 252, which merges video player module and music player module;
Notes module 253;
Map module 254; and/or
Online video module 255.

Examples of other applications 236 that are stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 are used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 238, video conference module 239, e-mail client module 240, or IM module 241; and so forth.

In conjunction with RF circuitry 208, audio circuitry 210, speaker 211, microphone 213, touch screen 212, display controller 256, contact/motion module 230, graphics module 232, and text input module 234, telephone module 238 are used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication uses any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that can be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 are used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 are used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules can be combined or otherwise rearranged in various embodiments. For example, video player module can be combined with music player module into a single module (e.g., video and music player module 252, FIG. 2A). In some embodiments, memory 202 stores a subset of the modules and data structures identified above. Furthermore, memory 202 stores additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 is reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
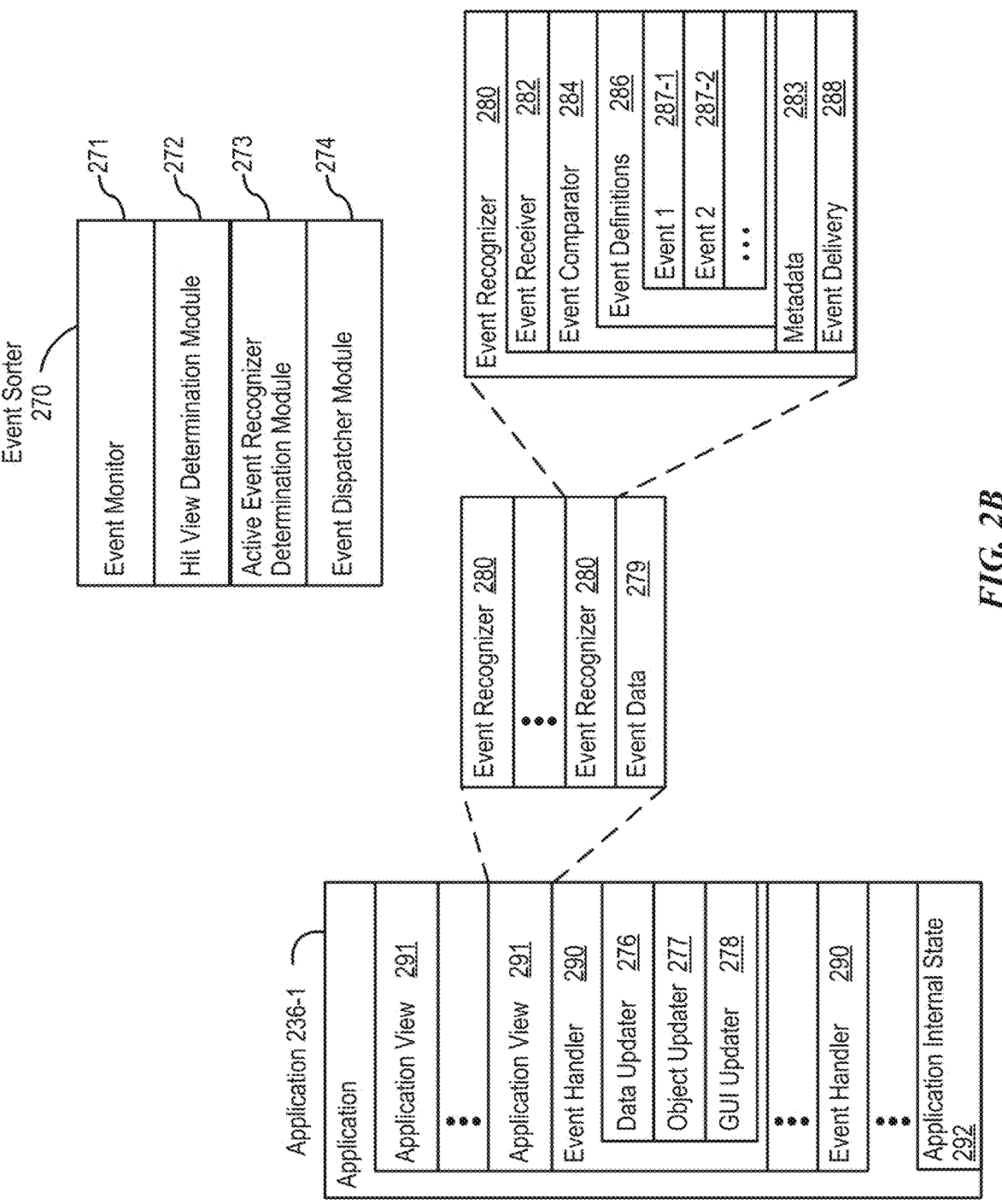
FIG. 2B is a block diagram illustrating exemplary components for event handling, according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected correspond to programmatic levels within a programmatic or view hierarchy of the application. For example, the lowest level view in which a touch is detected is called the hit view, and the set of events that are recognized as proper inputs is determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 utilizes or calls data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
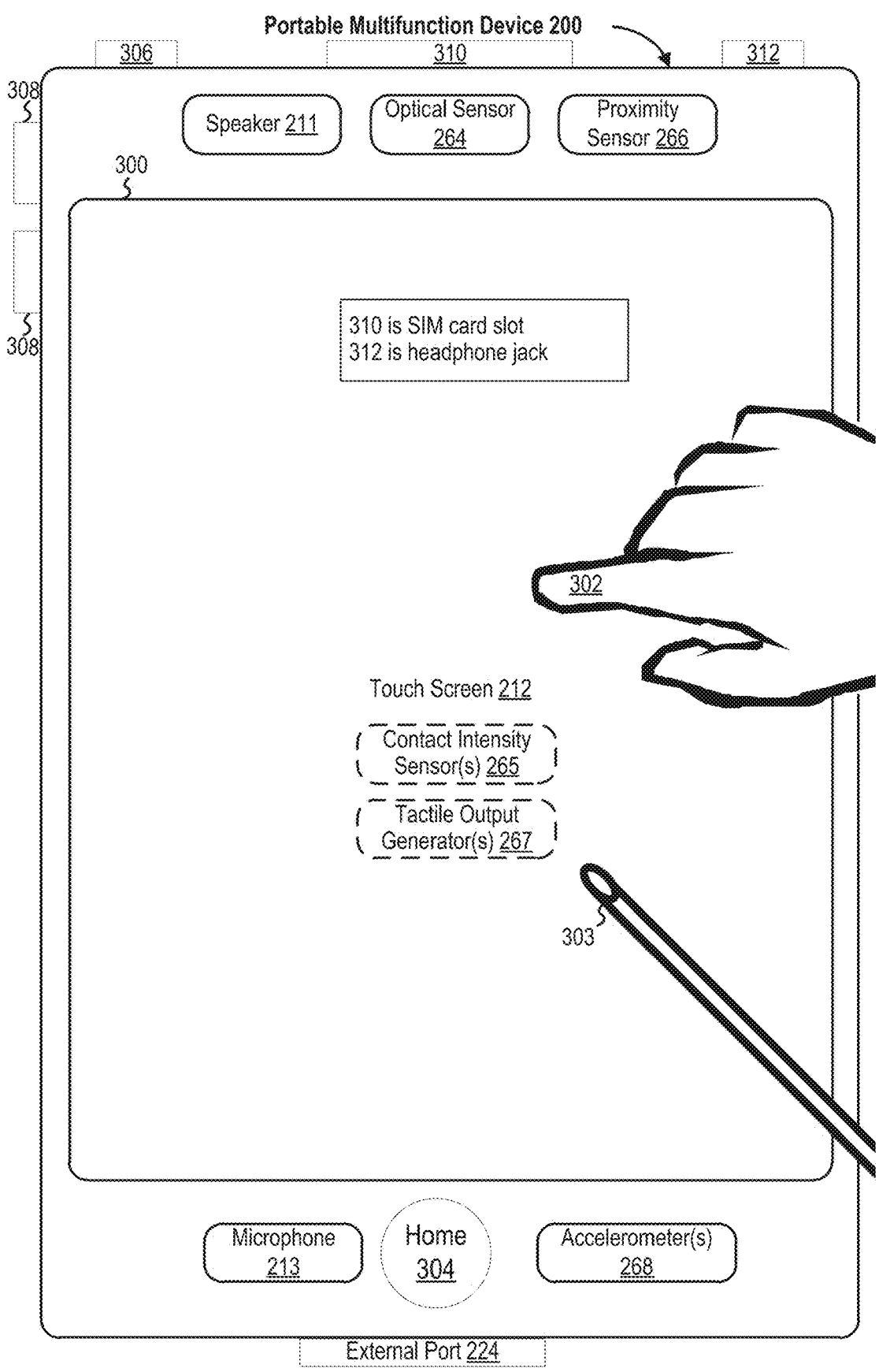
FIG. 3 illustrates a portable multifunction device implementing the client-side portion of a digital assistant, according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 also includes one or more physical buttons, such as "home" or menu button 304. As described previously, menu button 304 is used to navigate to any application 236 in a set of applications that is executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 is, in some examples, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are combined or otherwise rearranged in various embodiments. In some embodiments, memory 470 stores a subset of the modules and data structures identified above. Furthermore, memory 470 stores additional modules and data structures not described above.

Attention is now directed towards embodiments of user interfaces that can be implemented on, for example, portable multifunction device 200.

Figure 5A:
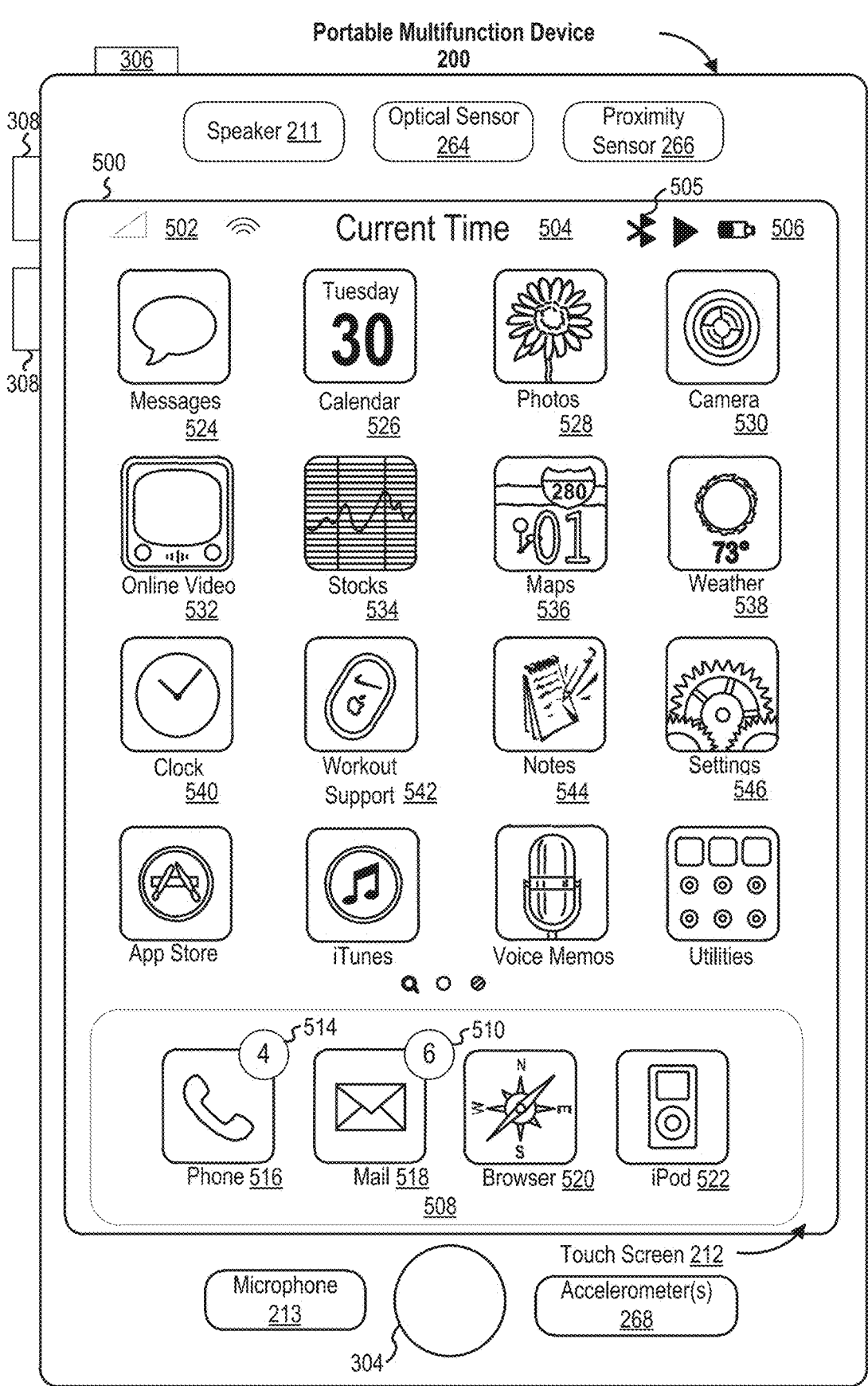
FIG. 5A illustrates an exemplary user interface for a menu of applications on a portable multifunction device, according to various examples.

FIG. 5A illustrates an exemplary user interface for a menu of applications on portable multifunction device 200 in accordance with some embodiments. Similar user interfaces are implemented on device 400. In some embodiments, user interface 500 includes the following elements, or a subset or superset thereof:

Signal strength indicator(s) 502 for wireless communication(s), such as cellular and Wi-Fi signals;

Time 504;

Bluetooth indicator 505;

Battery status indicator 506;

Tray 508 with icons for frequently used applications, such as:

Icon 516 for telephone module 238, labeled "Phone," which optionally includes an indicator 514 of the number of missed calls or voicemail messages;

Icon 518 for e-mail client module 240, labeled "Mail," which optionally includes an indicator 510 of the number of unread e-mails;

Icon 520 for browser module 247, labeled "Browser;" and

Icon 522 for video and music player module 252, also referred to as iPod (trademark of Apple Inc.) module 252, labeled "iPod;" and Icons for other applications, such as:

Icon 524 for IM module 241, labeled "Messages;"

Icon 526 for calendar module 248, labeled "Calendar;"

Icon 528 for image management module 244, labeled "Photos;"

Icon 530 for camera module 243, labeled "Camera;"

Icon 532 for online video module 255, labeled "Online Video;"

Icon 534 for stocks widget 249-2, labeled "Stocks;"

Icon 536 for map module 254, labeled "Maps;"

Icon 538 for weather widget 249-1, labeled "Weather;"

Icon 540 for alarm clock widget 249-4, labeled "Clock;"

Icon 542 for workout support module 242, labeled "Workout Support;"

Icon 544 for notes module 253, labeled "Notes;" and

Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 is optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
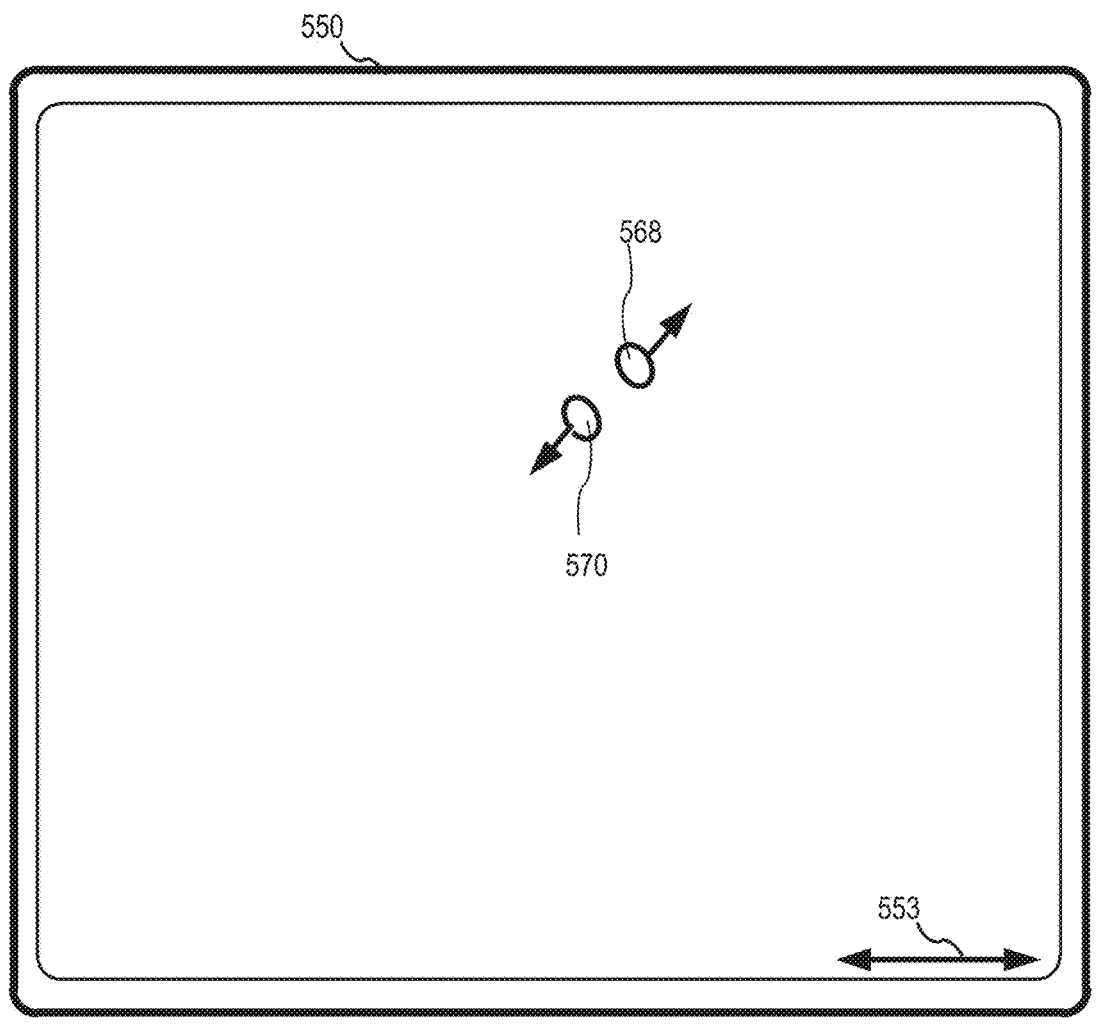
FIG. 5B illustrates an exemplary user interface for a multifunction device with a touch-sensitive surface that is separate from the display, according to various examples.
Figure 5B:
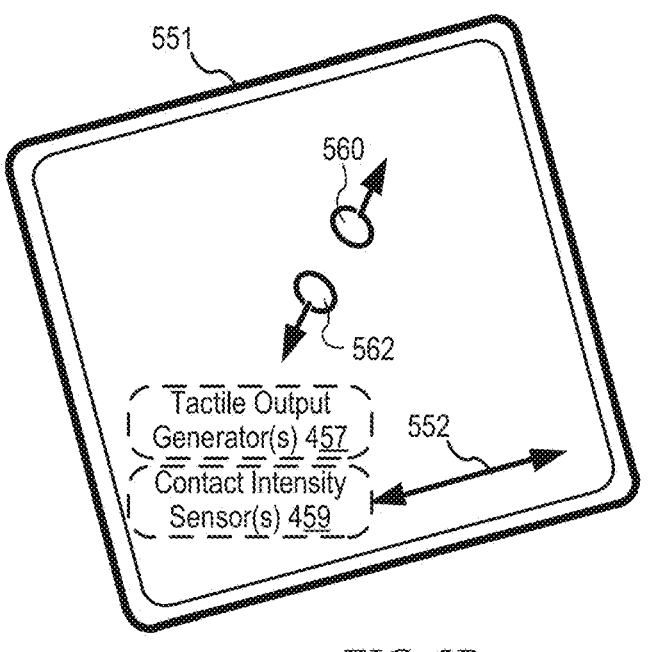

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, contact 560 corresponds to 568 and contact 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
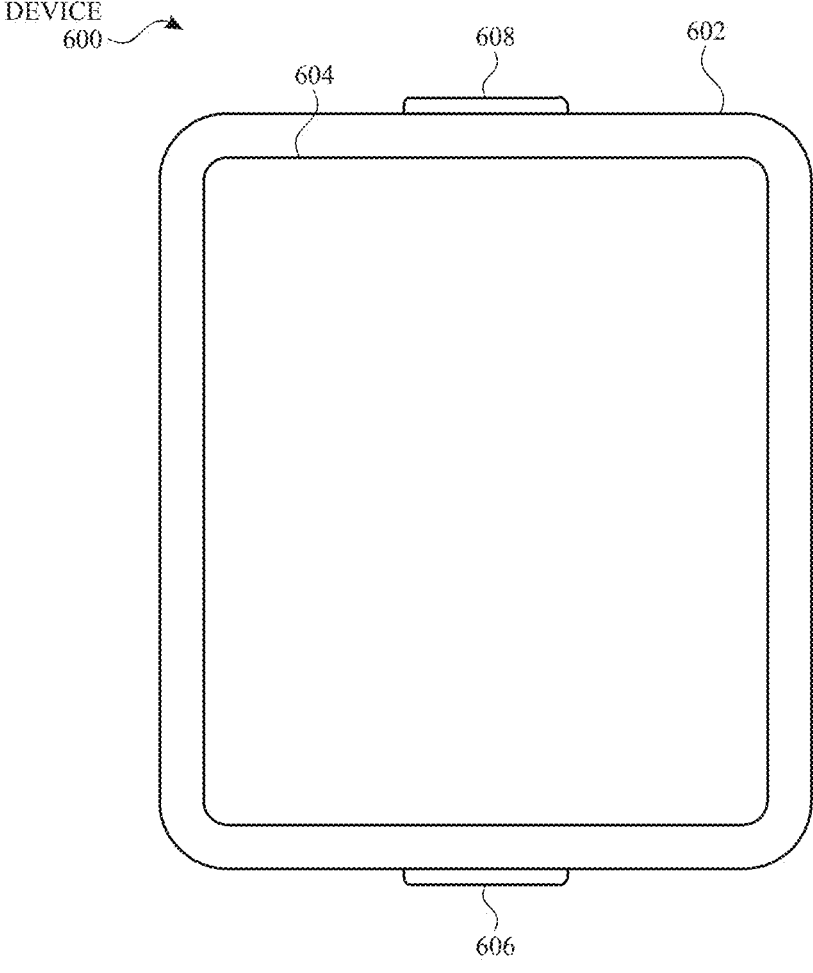
FIG. 6A illustrates a personal electronic device, according to various examples.

FIG. 6A illustrates exemplary personal electronic device 600. Device 600 includes body 602. In some embodiments, device 600 includes some or all of the features described with respect to devices 200 and 400 (e.g., FIGS. 2A-4). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) has one or more intensity sensors for detecting intensity of contacts (e.g., touches) being applied. The one or more intensity sensors of touch screen 604 (or the touch-sensitive surface) provide output data that represents the intensity of touches. The user interface of device 600 responds to touches based on their intensity, meaning that touches of different intensities can invoke different user interface operations on device 600.

Techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, are physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms permit device 600 to be worn by a user.

Figure 6B:
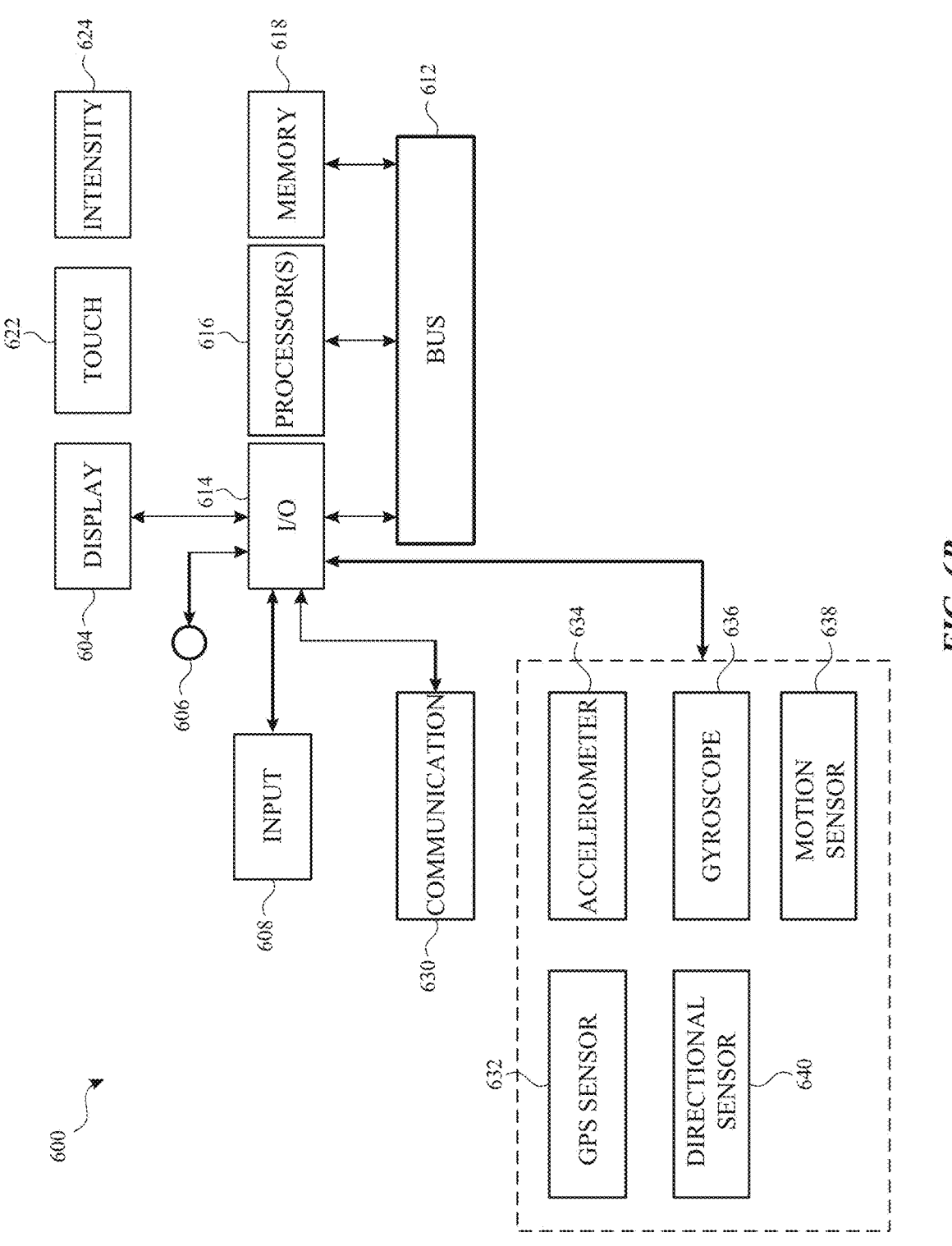
FIG. 6B is a block diagram illustrating a personal electronic device, according to various examples.

FIG. 6B depicts exemplary personal electronic device 600. In some embodiments, device 600 includes some or all of the components described with respect to FIGS. 2A, 2B, and 4. Device 600 has bus 612 that operatively couples I/O section 614 with one or more computer processors 616 and memory 618. I/O section 614 is connected to display 604, which can have touch-sensitive component 622 and, optionally, touch-intensity sensitive component 624. In addition, I/O section 614 is connected with communication unit 630 for receiving application and operating system data, using Wi-Fi, Bluetooth, near field communication (NFC), cellular, and/or other wireless communication techniques. Device 600 includes input mechanisms 606 and/or 608. Input mechanism 606 is a rotatable input device or a depressible and rotatable input device, for example. Input mechanism 608 is a button, in some examples.

Input mechanism 608 is a microphone, in some examples. Personal electronic device 600 includes, for example, various sensors, such as GPS sensor 632, accelerometer 634, directional sensor 640 (e.g., compass), gyroscope 636, motion sensor 638, and/or a combination thereof, all of which are operatively connected to I/O section 614.

Memory 618 of personal electronic device 600 is a non-transitory computer-readable storage medium, for storing computer-executable instructions, which, when executed by one or more computer processors 616, for example, cause the computer processors to perform the techniques and processes described below. The computer-executable instructions, for example, are also stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that is, for example, displayed on the display screen of devices 200, 400, 600, and/or 800 (FIGS. 2A, 4, 6A-B, and 8A-D). For example, an image (e.g., icon), a button, and text (e.g., hyperlink) each constitutes an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface receives a continuous swipe contact transitioning from a start location and reaching an end location, at which point the intensity of the contact increases. In this example, the characteristic intensity of the contact at the end location is based on only a portion of the continuous swipe contact, and not the entire swipe contact (e.g., only the portion of the swipe contact at the end location). In some embodiments, a smoothing algorithm is applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

FIG. 7A illustrates a block diagram of digital assistant system 700 in accordance with various examples. In some examples, digital assistant system 700 is implemented on a standalone computer system. In some examples, digital assistant system 700 is distributed across multiple computers. In some examples, some of the modules and functions of the digital assistant are divided into a server portion and a client portion, where the client portion resides on one or more user devices (e.g., devices 104, 122, 200, 400, 600, or 800) and communicates with the server portion (e.g., server system 108) through one or more networks, e.g., as shown in FIG. 1. In some examples, digital assistant system 700 is an implementation of server system 108 (and/or DA server 106) shown in FIG. 1. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (I/O) interface 706, and network communications interface 708. These components can communicate with one another over one or more communication buses or signal lines 710.

In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 couples input/output devices 716 of digital assistant system 700, such as displays, keyboards, touch screens, and microphones, to user interface module 722. I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to devices 200, 400, 600, or 800 in FIGS. 2A, 4, 6A-B, and 8A-D respectively. In some examples, digital assistant system 700 represents the server portion of a digital assistant implementation, and can interact with the user through a client-side portion residing on a user device (e.g., devices 104, 200, 400, 600, or 800).

In some examples, the network communications interface 708 includes wired communication port(s) 712 and/or wireless transmission and reception circuitry 714. The wired communication port(s) receives and send communication signals via one or more wired interfaces, e.g., Ethernet, Universal Serial Bus (USB), FIREWIRE, etc. The wireless circuitry 714 receives and sends RF signals and/or optical signals from/to communications networks and other communications devices. The wireless communications use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below. One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with RF circuitry 208 of electronic devices such as devices 200, 400, and 600 shown in FIGS. 2A, 4, 6A-B, respectively. Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone), and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touch-pads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following submodules, or a subset or superset thereof: input/output processing module 728, speech-to-text (STT) processing module 730, natural language processing module 732, dialogue flow processing module 734, task flow processing module 736, service processing module 738, and speech synthesis processing module 740. Each of these modules has access to one or more of the following systems or data and models of the digital assistant module 726, or a subset or superset thereof: ontology 760, vocabulary index 744, user data 748, task flow models 754, service models 756, and ASR systems 758.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
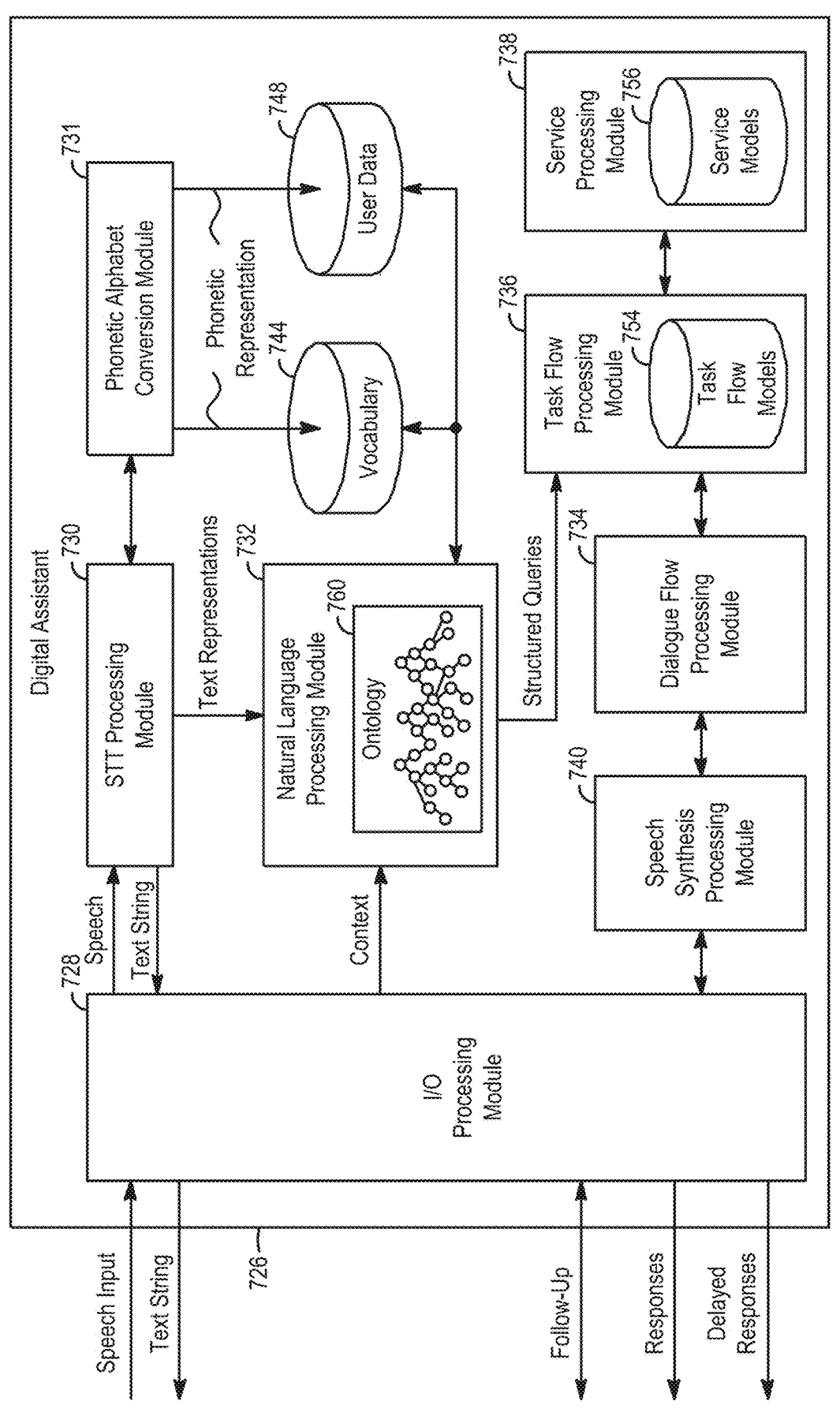
FIG. 7B illustrates the functions of the digital assistant shown in FIG. 7A, according to various examples.

In some examples, as shown in FIG. 7B, I/O processing module 728 interacts with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 also sends follow-up questions to, and receive answers from, the user regarding the user request. When a user request is received by I/O processing module 728 and the user request includes speech input, I/O processing module 728 forwards the speech input to STT processing module 730 (or speech recognizer) for speech-to-text conversions.

STT processing module 730 includes one or more ASR systems 758. The one or more ASR systems 758 can process the speech input that is received through I/O processing module 728 to produce a recognition result. Each ASR system 758 includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system 758 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., device 104, 200, 400, 600, or 800) to produce the recognition result. Once STT processing module 730 produces recognition results containing a text string (e.g., words, or sequence of words, or sequence of tokens), the recognition result is passed to natural language processing module 732 for intent deduction. In some examples, STT processing module 730 produces multiple candidate text representations of the speech input. Each candidate text representation is a sequence of words or tokens corresponding to the speech input. In some examples, each candidate text representation is associated with a speech recognition confidence score. Based on the speech recognition confidence scores, STT processing module 730 ranks the candidate text representations and provides the n-best (e.g., n highest ranked) candidate text representation(s) to natural language processing module 732 for intent deduction, where n is a predetermined integer greater than zero. For example, in one example, only the highest ranked (n=1) candidate text representation is passed to natural language processing module 732 for intent deduction. In another example, the five highest ranked (n=5) candidate text representations are passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 includes and/or accesses a vocabulary of recognizable words via phonetic alphabet conversion module 731. Each vocabulary word is associated with one or more candidate pronunciations of the word represented in a speech recognition phonetic alphabet. In particular, the vocabulary of recognizable words includes a word that is associated with a plurality of candidate pronunciations. For example, the vocabulary includes the word "tomato" that is associated with the candidate pronunciations of /təˈmeɪɾoʊ/ and /təˈmɑtoʊ/. Further, vocabulary words are associated with custom candidate pronunciations that are based on previous speech inputs from the user. Such custom candidate pronunciations are stored in STT processing module 730 and are associated with a particular user via the user's profile on the device. In some examples, the candidate pronunciations for words are determined based on the spelling of the word and one or more linguistic and/or phonetic rules. In some examples, the candidate pronunciations are manually generated, e.g., based on known canonical pronunciations.

In some examples, the candidate pronunciations are ranked based on the commonness of the candidate pronunciation. For example, the candidate pronunciation /təˈmeɪɾoʊ/ is ranked higher than /təˈmɑtoʊ/, because the former is a more commonly used pronunciation (e.g., among all users, for users in a particular geographical region, or for any other appropriate subset of users). In some examples, candidate pronunciations are ranked based on whether the candidate pronunciation is a custom candidate pronunciation associated with the user. For example, custom candidate pronunciations are ranked higher than canonical candidate pronunciations. This can be useful for recognizing proper nouns having a unique pronunciation that deviates from canonical pronunciation. In some examples, candidate pronunciations are associated with one or more speech characteristics, such as geographic origin, nationality, or ethnicity. For example, the candidate pronunciation /təˈmeɪɾoʊ/ is associated with the United States, whereas the candidate pronunciation /təˈmɑtoʊ/ is associated with Great Britain. Further, the rank of the candidate pronunciation is based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /təˈmeɪɾoʊ/ (associated with the United States) is ranked higher than the candidate pronunciation /təˈmɑtoʊ/ (associated with Great Britain). In some examples, one of the ranked candidate pronunciations is selected as a predicted pronunciation (e.g., the most likely pronunciation).

When a speech input is received, STT processing module 730 is used to determine the phonemes corresponding to the speech input (e.g., using an acoustic model), and then attempt to determine words that match the phonemes (e.g., using a language model). For example, if STT processing module 730 first identifies the sequence of phonemes / tə'meɪɾoʊ / corresponding to a portion of the speech input, it can then determine, based on vocabulary index 744, that this sequence corresponds to the word "tomato."

In some examples, STT processing module 730 uses approximate matching techniques to determine words in an utterance. Thus, for example, the STT processing module 730 determines that the sequence of phonemes /tə'meɪɾoʊ / corresponds to the word "tomato," even if that particular sequence of phonemes is not one of the candidate sequence of phonemes for that word.

Natural language processing module 732 ("natural language processor") of the digital assistant takes the n-best candidate text representation(s) ("word sequence(s)" or "token sequence(s)") generated by STT processing module 730, and attempts to associate each of the candidate text representations with one or more "actionable intents" recognized by the digital assistant. An "actionable intent" (or "user intent") represents a task that can be performed by the digital assistant, and can have an associated task flow implemented in task flow models 754. The associated task flow is a series of programmed actions and steps that the digital assistant takes in order to perform the task. The scope of a digital assistant's capabilities is dependent on the number and variety of task flows that have been implemented and stored in task flow models 754, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 730, natural language processing module 732 also receives contextual information associated with the user request, e.g., from I/O processing module 728. The natural language processing module 732 optionally uses the contextual information to clarify, supplement, and/or further define the information contained in the candidate text representations received from STT processing module 730. The contextual information includes, for example, user preferences, hardware, and/or software states of the user device, sensor information collected before, during, or shortly after the user request, prior interactions (e.g., dialogue) between the digital assistant and the user, and the like. As described herein, contextual information is, in some examples, dynamic, and changes with time, location, content of the dialogue, and other factors.

In some examples, the natural language processing is based on, e.g., ontology 760. Ontology 760 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 760 defines how a parameter represented by the property node pertains to the task represented by the actionable intent node.

In some examples, ontology 760 is made up of actionable intent nodes and property nodes. Within ontology 760, each actionable intent node is linked to one or more property nodes either directly or through one or more intermediate property nodes. Similarly, each property node is linked to one or more actionable intent nodes either directly or through one or more intermediate property nodes. For example, as shown in FIG. 7C, ontology 760 includes a "restaurant reservation" node (i.e., an actionable intent node). Property nodes "restaurant," "date/time" (for the reservation), and "party size" are each directly linked to the actionable intent node (i.e., the "restaurant reservation" node).

Figure 7C:
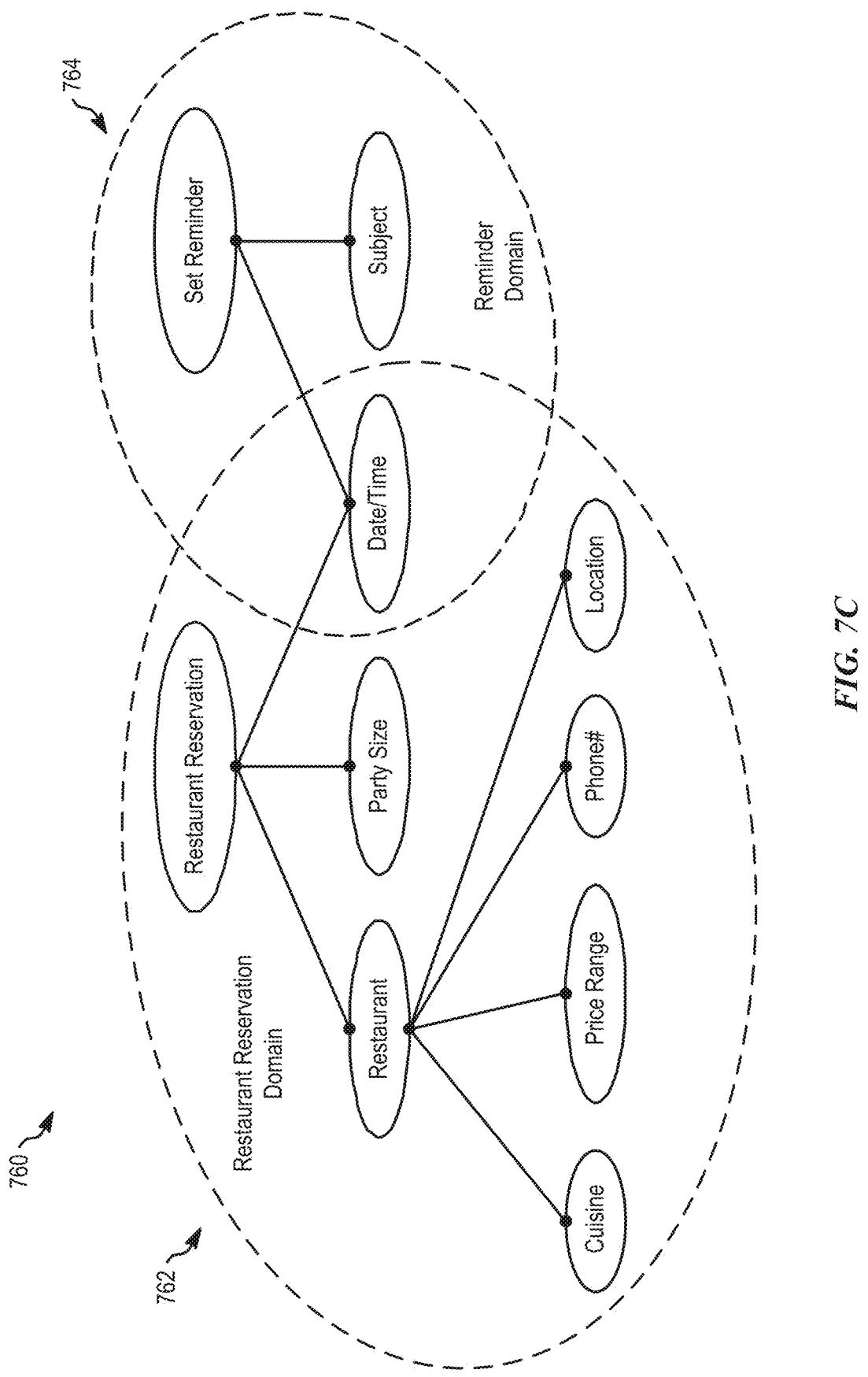
FIG. 7C illustrates a portion of an ontology, according to various examples.

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 7C, ontology 760 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable intent node, along with its linked property nodes, is described as a "domain." In the present discussion, each domain is associated with a respective actionable intent, and refers to the group of nodes (and the relationships there between) associated with the particular actionable intent. For example, ontology 760 shown in FIG. 7C includes an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 includes the actionable intent node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable intents) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable intents are clustered under a "super domain" in ontology 760. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 744 in association with the property or actionable intent represented by the node. For example, returning to FIG. 7B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index 744 optionally includes words and phrases in different languages.

Natural language processing module 732 receives the candidate text representations (e.g., text string(s) or token sequence(s)) from STT processing module 730, and for each candidate representation, determines what nodes are implicated by the words in the candidate text representation. In some examples, if a word or phrase in the candidate text representation is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user intent. For example, for a user request "invite my friends to my birthday party," natural language processing module 732 is able to access user data 748 to determine who the "friends" are and when and where the "birthday party" would be held, rather than requiring the user to provide such information explicitly in his/her request.

It should be recognized that in some examples, natural language processing module 732 is implemented using one or more machine learning mechanisms (e.g., neural networks). In particular, the one or more machine learning mechanisms are configured to receive a candidate text representation and contextual information associated with the candidate text representation. Based on the candidate text representation and the associated contextual information, the one or more machine learning mechanisms are configured to determine intent confidence scores over a set of candidate actionable intents. Natural language processing module 732 can select one or more candidate actionable intents from the set of candidate actionable intents based on the determined intent confidence scores. In some examples, an ontology (e.g., ontology 760) is also used to select the one or more candidate actionable intents from the set of candidate actionable intents.

Other details of searching an ontology based on a token string are described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 generates a structured query to represent the identified actionable intent. In some examples, the structured query includes parameters for one or more nodes within the domain for the actionable intent, and at least some of the parameters are populated with the specific information and requirements specified in the user request. For example, the user says "Make me a dinner reservation at a sushi place at 7." In this case, natural language processing module 732 is able to correctly identify the actionable intent to be "restaurant reservation" based on the user input. According to the ontology, a structured query for a "restaurant reservation" domain includes parameters such as {Cuisine}, {Time}, {Date}, {Party Size}, and the like. In some examples, based on the speech input and the text derived from the speech input using STT processing module 730, natural language processing module 732 generates a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} are not specified in the structured query based on the information currently available. In some examples, natural language processing module 732 populates some parameters of the structured query with received contextual information. For example, in some examples, if the user requested a sushi restaurant "near me," natural language processing module 732 populates a {location} parameter in the structured query with GPS coordinates from the user device.

In some examples, natural language processing module 732 identifies multiple candidate actionable intents for each candidate text representation received from STT processing module 730. Further, in some examples, a respective structured query (partial or complete) is generated for each identified candidate actionable intent. Natural language processing module 732 determines an intent confidence score for each candidate actionable intent and ranks the candidate actionable intents based on the intent confidence scores. In some examples, natural language processing module 732 passes the generated structured query (or queries), including any completed parameters, to task flow processing module 736 ("task flow processor"). In some examples, the structured query (or queries) for the m-best (e.g., m highest ranked) candidate actionable intents are provided to task flow processing module 736, where m is a predetermined integer greater than zero. In some examples, the structured query (or queries) for the m-best candidate actionable intents are provided to task flow processing module 736 with the corresponding candidate text representation(s).

Other details of inferring a user intent based on multiple candidate actionable intents determined from multiple candidate text representations of a speech input are described in U.S. Utility application Ser. No. 14/298,725 for "System and Method for Inferring User Intent From Speech Inputs," filed Jun. 6, 2014, the entire disclosure of which is incorporated herein by reference.

Task flow processing module 736 is configured to receive the structured query (or queries) from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable intent.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses. The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable intent, task flow processing module 736 proceeds to perform the ultimate task associated with the actionable intent. Accordingly, task flow processing module 736 executes the steps and instructions in the task flow model according to the specific parameters contained in the structured query. For example, the task flow model for the actionable intent of "restaurant reservation" includes steps and instructions for contacting a restaurant and actually requesting a reservation for a particular party size at a particular time. For example, using a structured query such as: {restaurant reservation, restaurant=ABC Café, date=3/12/2012, time=7 pm, party size=5}, task flow processing module 736 performs the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738

("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generates requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and sends the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's intent, obtain information to further clarify and refine the user intent, and finally generate a response (i.e., an output to the user, or the completion of a task) to fulfill the user's intent. The generated response is a dialogue response to the speech input that at least partially fulfills the user's intent. Further, in some examples, the generated response is output as a speech output. In these examples, the generated response is sent to speech synthesis processing module 740 (e.g., speech synthesizer) where it can be processed to synthesize the dialogue response in speech form. In yet other examples, the generated response is data content relevant to satisfying a user request in the speech input.

In examples where task flow processing module 736 receives multiple structured queries from natural language processing module 732, task flow processing module 736 initially processes the first structured query of the received structured queries to attempt to complete the first structured query and/or execute one or more tasks or actions represented by the first structured query. In some examples, the first structured query corresponds to the highest ranked actionable intent. In other examples, the first structured query is selected from the received structured queries based on a combination of the corresponding speech recognition confidence scores and the corresponding intent confidence scores. In some examples, if task flow processing module 736 encounters an error during processing of the first structured query (e.g., due to an inability to determine a necessary parameter), the task flow processing module 736 can proceed to select and process a second structured query of the received structured queries that corresponds to a lower ranked actionable intent. The second structured query is selected, for example, based on the speech recognition confidence score of the corresponding candidate text representation, the intent confidence score of the corresponding candidate actionable intent, a missing necessary parameter in the first structured query, or any combination thereof.

Speech synthesis processing module 740 is configured to synthesize speech outputs for presentation to the user. Speech synthesis processing module 740 synthesizes speech outputs based on text provided by the digital assistant. For example, the generated dialogue response is in the form of a text string. Speech synthesis processing module 740 converts the text string to an audible speech output. Speech synthesis processing module 740 uses any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis processing module 740 is configured to synthesize individual words based on phonemic strings corresponding to the words. For example, a phonemic string is associated with a word in the generated dialogue response. The phonemic string is stored in metadata associated with the word. Speech synthesis processing module 740 is configured to directly process the phonemic string in the metadata to synthesize the word in speech form.

In some examples, instead of (or in addition to) using speech synthesis processing module 740, speech synthesis is performed on a remote device (e.g., the server system 108), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Exemplary Techniques for Operating a Virtual Assistant

FIGS. 8A-8D depict exemplary techniques for operating a virtual assistant at an electronic device 800. Device 800 is, for example, similar or the same as device 200 or 400, described above. In some examples, device 800 includes the modules and functions of a digital assistant described above in FIGS. 7A-7C. In some examples, device 800 includes the components and functions of system 900 (FIG. 9), described below.

Figure 8A:
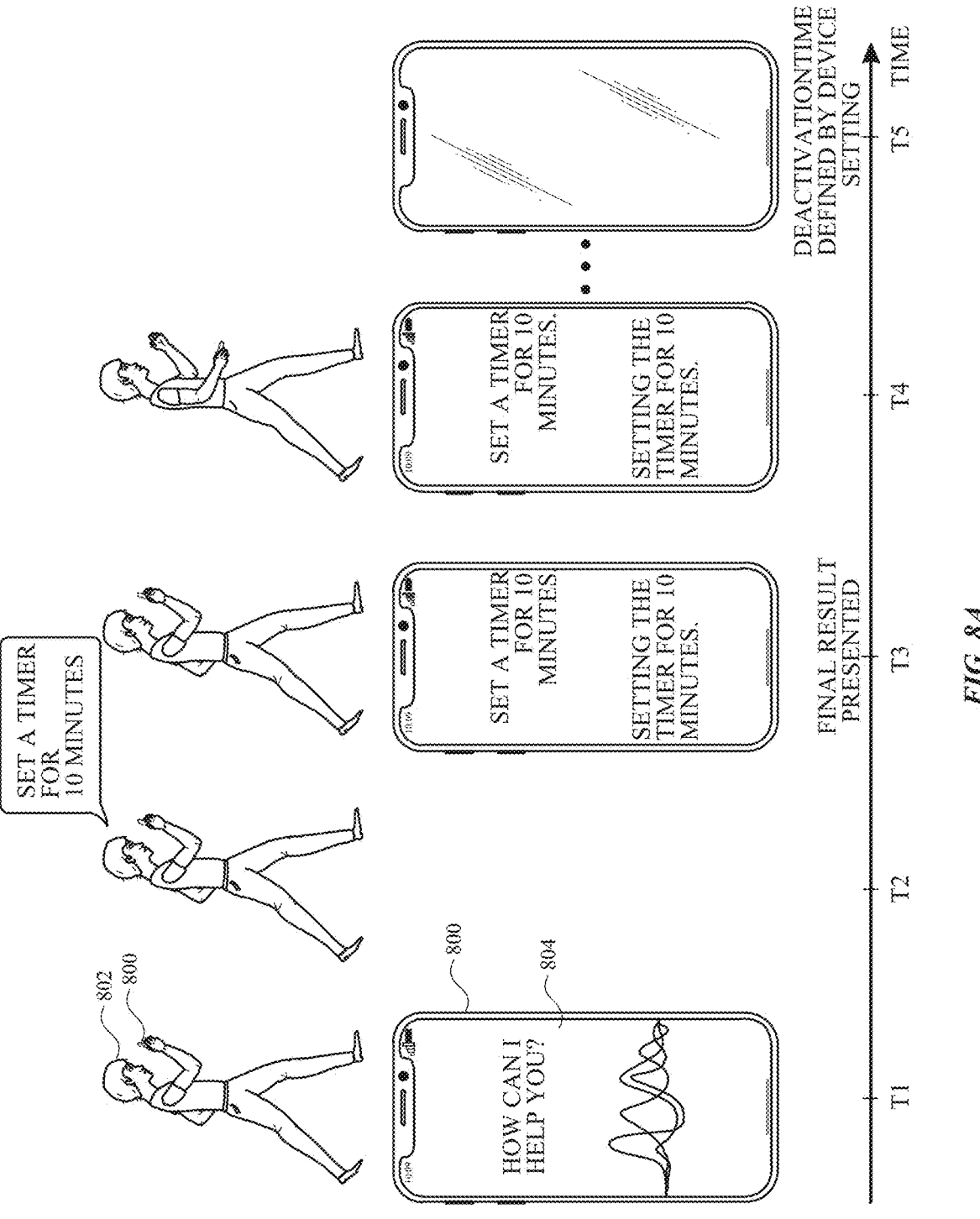
FIGS. 8A-8D depict exemplary techniques for operating a digital assistant at an electronic device.
Figure 8B:
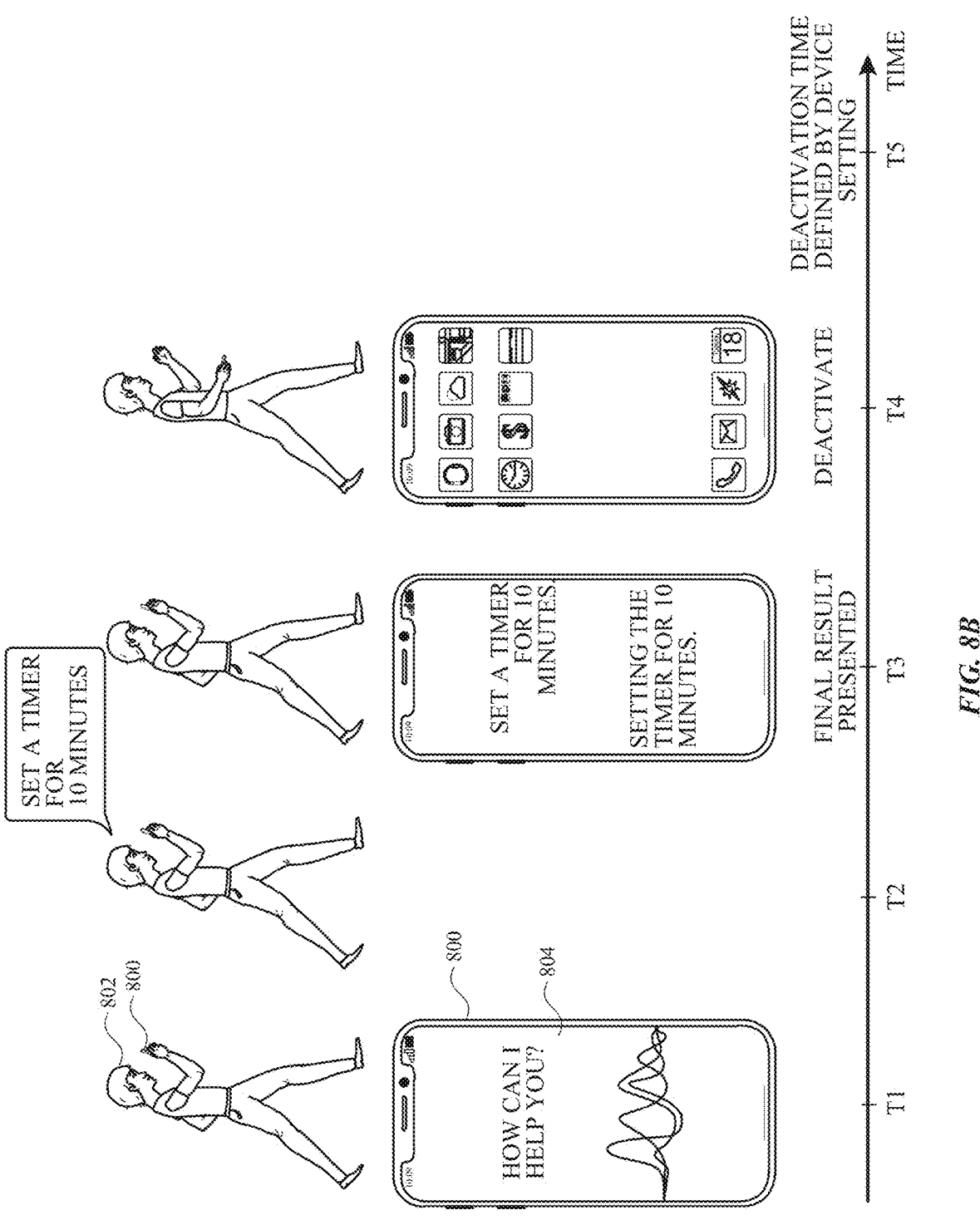
Figure 8C:
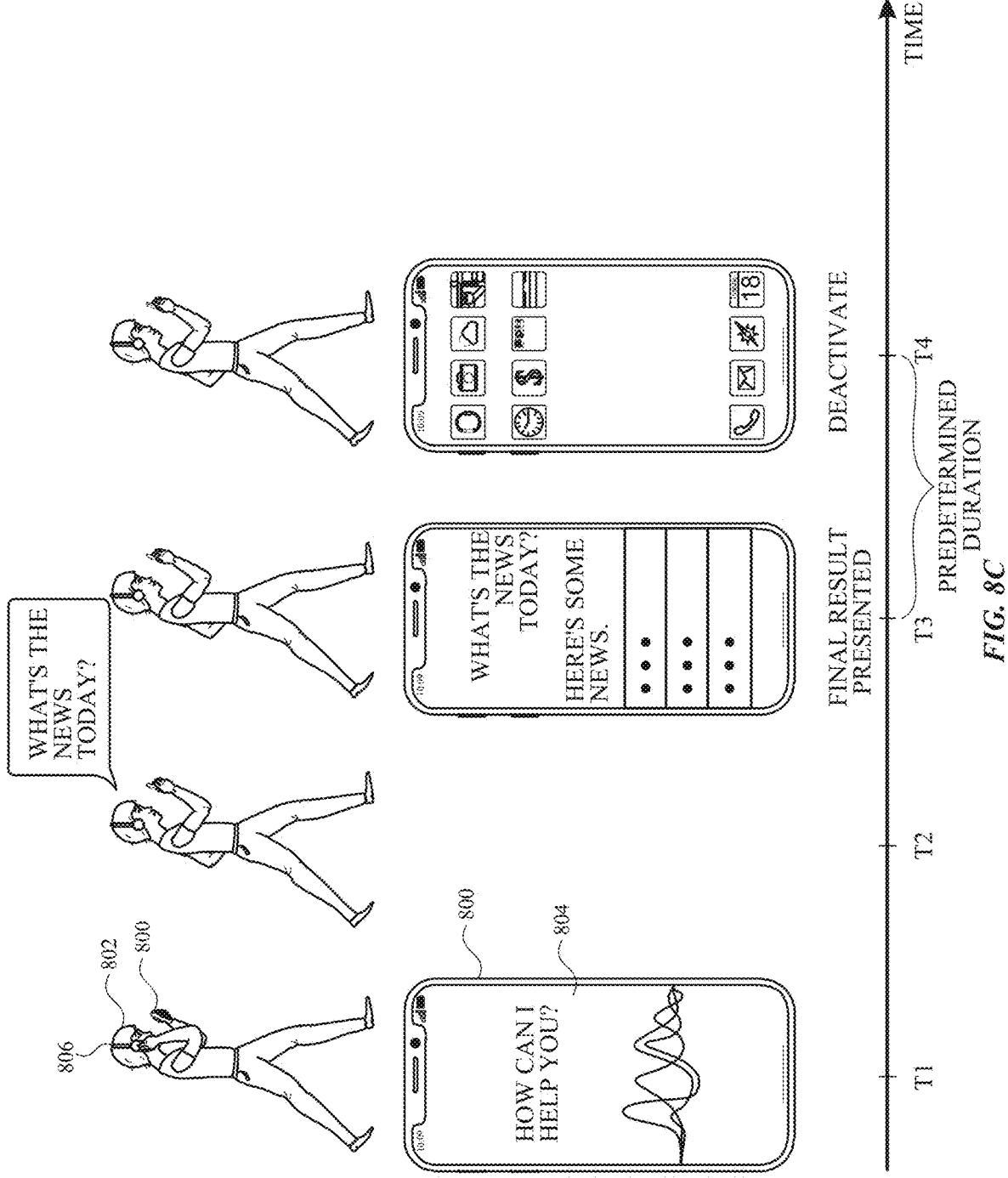

As described below, in some examples, depending on how a virtual assistant session is initiated, different default behaviors for deactivating the virtual assistant session are employed. For example, if user input received via a button of the electronic device initiates the virtual assistant session, it may be likely that the user is holding the device and thus wishes to interact with the virtual assistant session for an extended duration. Accordingly, as shown in FIG. 8A, the default behavior for such manner of initiation is not to deactivate the virtual assistant session (e.g., until a display screen of the electronic device is powered off). As another example, if user input at an external electronic device (e.g., a wired or wireless headset) initiates the virtual assistant session, it may be likely that the user initiates the virtual assistant session for a quick request (e.g., to check the weather, to check stock prices, etc.). Accordingly, as shown in FIG. 8C, the default behavior for such manner of initiation is to deactivate the virtual assistant session shortly after the request is completed (e.g., after the virtual assistant provides a response).

However, in some examples, the default behavior associated with each manner of initiating a virtual assistant may be undesirable. For example, if the default behavior is not to deactivate the virtual assistant session, and the user is not engaged with the virtual assistant session, it can be undesirable to continue execution of the virtual assistant session (e.g., because executing the virtual assistant session consumes battery power and/or because the user is not interested in interacting with the virtual assistant session). As another example, if the default behavior is to deactivate a virtual assistant session shortly after request completion, and a user is still engaged with the virtual assistant session after request completion, it can be undesirable to deactivate the virtual assistant session (e.g., because the user is still reading a presented result and/or wishes to issue another request to the virtual assistant session).

Figure 8D:
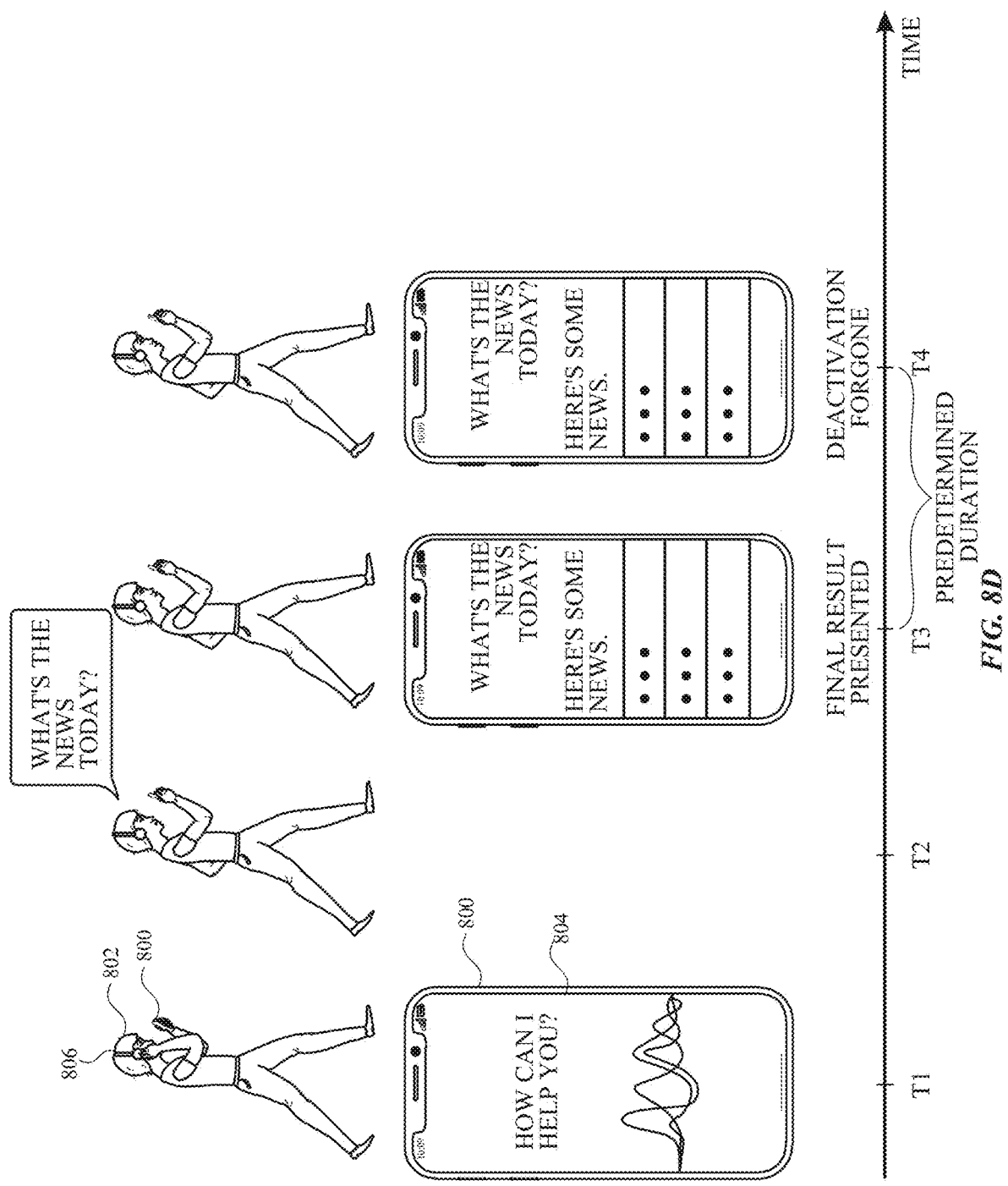

Accordingly, in some examples, it may be desirable to override a default behavior for deactivating a virtual assistant session based on whether the user is engaged with the virtual assistant session. For example, if the default behavior is not to deactivate the virtual assistant session (e.g., until a display screen of the electronic device is powered off), it is determined whether the user is not engaged with the virtual assistant session. As shown in FIG. 8B, if the user is not engaged, the default behavior is overridden, and the virtual assistant deactivates (e.g., before the time a display is powered off). As another example, if the default behavior is to deactivate the virtual assistant session shortly after request completion, it is determined whether the user is engaged with the virtual assistant session after request completion. As shown in FIG. 8D, if the user is engaged, the default behavior of deactivating the virtual assistant session shortly after request completion is overridden, and the virtual assistant session continues to execute.

FIG. 8A depicts an exemplary timeline of operating a virtual assistant session on device 800 according to a default behavior of not deactivating the virtual assistant session until a time defined by a device setting (e.g., a time a display is powered off). As discussed, in some examples, the default behavior may be undesirable, resulting in a virtual assistant continuing to execute despite a user not being engaged with it.

As shown, at time T1, device 800 initiates a virtual assistant session responsive to receiving user input corresponding to one or more predetermined types. For example, user 802 interacts with a button (e.g., a physical or a virtual button) on device 800 to cause device 800 to initiate a virtual assistant session. In some examples, initiating a virtual assistant session includes providing audio output. In some examples, initiating a virtual assistant session includes displaying a user interface associated with the virtual assistant session (e.g., in the foreground of a user interface displayed on display 804). In some examples, initiating a virtual assistant session includes powering on processor circuitry configured to operate a virtual assistant. In some examples, initiating a virtual assistant includes initiating one or more programs or modules (e.g., digital assistant module 726).

In some examples, device 800 determines a type of the user input for initiating the virtual assistant session. For example, device 800 determines whether the type of the user input is a first type or a second type. In some examples, the first type of user input includes gesture input (e.g., a swipe) received via a touch sensitive display of an electronic device, input received via a physical button (e.g., a "home"

button) of the electronic device, and/or via a virtual button (e.g., a button displayed on a display) of the electronic device. In some examples, the second type of user input includes input received from an external electronic device (e.g., input from wired or wireless headsets), voice input (e.g., voice input for initiating a virtual assistant such as "Hey Siri"), and/or motion input (e.g., a motion of an electronic device that initiates a virtual assistant).

In some examples, each type of the user input is associated with different default behaviors for deactivating the virtual assistant session. For example, device 800 infers from the first type of input that the user wishes to interact with the virtual assistant session for an extended duration. Accordingly, if device 800 determines that the type of user input is the first type, the default behavior is not to deactivate the virtual assistant session (e.g., until a time a display of the electronic device is powered off (e.g., not displaying)). As another example, device 800 infers from the second type of input that the user does not wish to interact with the virtual assistant session for an extended duration. Accordingly, if device 800 determines that the type of user input is the second type, the default behavior is to deactivate the virtual assistant session a predetermined duration (e.g., a short duration) after the completion of the user request.

In the present example of FIG. 8A, the input for initiating the virtual assistant session is the first type of input (e.g., a swipe or virtual button). Accordingly, as shown, the default behavior is not to deactivate the virtual assistant session (e.g., until a time defined by a device setting).

After initiating the virtual assistant session, at time T2, user 802 provides input to the virtual assistant session (e.g., "Set a timer for ten minutes"). The virtual assistant of device 800 receives the input and performs a task based on the input (e.g., according to the techniques discussed above with respect to FIGS. 7A-C). For example, the virtual assistant session performs the task of setting a timer and presents the result "Setting the timer for 10 minutes" (e.g., on display 804).

In some examples, a result presented during the virtual assistant session is a final result (e.g., "Setting the timer for 10 minutes"). However, in some examples, some results presented during the virtual assistant session are not final results. For example, if the virtual assistant session is engaged in a multi-turn interaction (e.g., an interaction where input is provided to the virtual assistant and the virtual assistant responds by eliciting further input), the result eliciting further input is not a final result. For example, if the user provides the input "send a message," and the virtual assistant session responds by outputting "send a message to who?", "send a message to who?" is not a final result. Accordingly, in some examples, a final result is a presented result for which no further user response is expected and/or for which no further result is expected to be presented by the virtual assistant.

Device 800 presents a final result for the virtual assistant session at a time (e.g., at time T3 in FIG. 8A). For example, if the virtual assistant provides audio output of the final result (e.g., the virtual assistant performs text-to-speech of "Setting the timer for 10 minutes") the final result time is when the virtual assistant finishes providing the audio output (e.g., finishes audio output of "10 minutes"). In some examples, a virtual assistant session displays the final result (e.g., displays "Setting the timer for 10 minutes" on display 804). Accordingly, in some examples, the final result time is when the final result is displayed. In some examples, the final result time is a predetermined duration (e.g., 0.5 seconds, 1 second, 2 seconds, etc.) after the time the final result is displayed.

In the present example, after device 800 presents the final result, user 802 is no longer engaged with the virtual assistant session. For example, as shown, user 802 at time T4 is not looking at device 800 and has dropped device 800 to be near his side. However, because user 802 initiated the virtual assistant session using the first type of input (e.g., a button press), device 800 operates according to the default behavior of not deactivating the virtual assistant session until a time defined by a device setting (e.g., a screen lock time). As shown, this may undesirably result in a virtual assistant continuing to execute (e.g., between times T4 and T5) even though a user is not engaged with it.

In some examples, the device setting is a user configurable setting associated with a screen lock time or a screen dimming time. For example, a user specifies a screen lock time and/or a screen dimming time of 30 seconds, 1, 2, 3, 4, or 5 minutes. A screen lock time of 2 minutes specifies, for instance, that the device powers off a display screen after 2 minutes of not detecting user input at the device (e.g., tactile input, motion input, audio input, gaze input, and/or detection of a user's face, etc.). In some examples, the device setting specifies to not automatically power off the screen and/or to not automatically dim the screen. In such examples, a virtual assistant session operating according to a default behavior of not deactivating the virtual assistant session would not deactivate (e.g., until the electronic device runs out of battery).

In some examples, the device setting is a user configurable setting associated with the virtual assistant. For example, a device setting specifies to automatically deactivate the virtual assistant session a predetermined duration (e.g., 30 seconds, 1 minute, 2 minutes) after the time at which the virtual assistant session was initiated. As another example, a device setting specifies to automatically deactivate the virtual assistant session a predetermined duration after the time at which a final result for the virtual assistant session is presented.

In some examples, device 800 automatically deactivates the virtual assistant session at the time defined by the device setting (e.g., at time T5 in FIG. 8A). For example, a screen lock setting specifies to power off display 804 five minutes after not detecting user input. When display 804 powers off at time T5, device 800 deactivates the virtual assistant session at time T5. As another example, a screen dimming setting specifies to dim display 804 five minutes after not detecting user input. When display 804 dims, device 800 deactivates the virtual assistant session. In some examples, automatically deactivating the virtual assistant session includes deactivating the virtual assistant session without receiving explicit user input to deactivate the virtual assistant session. Explicit user input to deactivate a virtual assistant session includes, for instance, a touch or a press of a physical or a virtual button, a swipe gesture on a display, and/or audio and/or textual input (e.g., explicit audio and/or textual input for deactivating a virtual assistant session such as "Shut off," "Go away," "turn off," and the like).

In some examples, deactivating a virtual assistant session includes ceasing the display of a user interface associated with the virtual assistant session (e.g., the display of a virtual assistant user interface is replaced with the display of a home screen user interface or a user interface associated with another application). In some examples, deactivating a virtual assistant session includes powering off a display. In some examples, deactivating a virtual assistant session includes powering off processor circuitry (e.g., circuitry of a main processor) configured to operate a virtual assistant. In some examples, deactivating a virtual assistant includes deactivating one or more programs or modules (e.g., digital assistant module 726).

As demonstrated by FIG. 8A, the default behavior of not deactivating a virtual assistant session until a time defined by a device setting may be undesirable. In particular, there is a period (e.g., between T4 and T5) during which the virtual assistant continues to execute (e.g., a virtual assistant user interface is displayed in the foreground of the user interface), despite the user not being engaged with the virtual assistant session. This may be a significant battery power and processing power drain for the device (e.g., especially if the screen lock time is long or the device setting specifies to not power off the screen). Accordingly, in some examples, it may be desirable to override a default behavior by automatically deactivating the virtual assistant when (or shortly after) it is determined that the user is not engaged with the virtual assistant session.

FIG. 8B illustrates an exemplary timeline for automatically deactivating a virtual assistant session. In FIG. 8B, a default behavior of not deactivating a virtual assistant session (e.g., until a screen lock time) is overridden. In particular, as discussed below, a device determines that the user is disinterested in (e.g., not engaged with) the virtual assistant session, and the device deactivates the virtual assistant session prior to the time associated with the device setting (e.g., the screen lock time).

In FIG. 8B, at time T1, user 802 initiates a virtual assistant session by providing user input (e.g., by interacting with a button of device 800). In response, device 800 initiates a virtual assistant session. For example, device 800 displays a virtual assistant user interface on display 804.

In some examples, device 800 determines a type of the user input. In the present example, because the user input was received via a button of device 800, device 800 determines that the type of the user input is the first type. Accordingly, the default behavior is to not deactivate the virtual assistant session until a time defined by a device setting (recall that in some examples, different types of input are respectively associated with different default behaviors).

At time T2, user 802 provides input requesting a task (e.g., "Set a timer for 10 minutes") to the virtual assistant session. Device 800 determines a task based on the input, performs the task, and presents a final result for the virtual assistant session at time T3. For example, device 800 presents the audio output "Setting the timer for 10 minutes" at time T3.

In some examples, after a time at which a final result for the virtual assistant session is presented, device 800 determines whether the user is disinterested in the virtual assistant session. For example, device 800 determines whether the user is disinterested in the virtual assistant session a predetermined duration (e.g., 1, 2, 3, 4, 5, 6 seconds) after a time at which a final result for the virtual assistant session is presented. In some examples, device 800 determines whether the user is disinterested in the virtual assistant session as soon as the final result is presented. In some examples, device 800 determines whether the user is disinterested in the virtual assistant session as soon as the virtual assistant session is initiated.

In some examples, device 800 determines whether the user is disinterested in the virtual assistant session in accordance with determining that the type of the user input for initiating the virtual assistant session is the first type. For example, as discussed, the first type of input is associated with the default behavior of not deactivating the virtual assistant session. Accordingly, device 800 determines whether the user is disinterested with the virtual assistant session to determine whether to override the default behavior (e.g., by automatically deactivating the virtual assistant session before a screen lock time).

In some examples, determining whether the user is disinterested in the virtual assistant session includes, determining based on data obtained using one or more sensors of an electronic device, whether one or more criteria representing expressed user disinterest are satisfied. In some examples, determining whether the user is disinterested in the virtual assistant session includes determining a probability of disinterest in the virtual assistant session. For example, if one or more criteria representing expressed user disinterest are satisfied, a probability of disinterest in the virtual assistant session is increased. If one or more criteria representing expressed user disinterest are not satisfied, the probability of disinterest in the virtual assistant session is decreased. In some examples, the user is determined to be disinterested in the virtual assistant session if the probability of disinterest is greater than a predetermined threshold and/or if one or more criteria representing expressed user disinterest are satisfied.

Exemplary criteria representing expressed user disinterest are discussed below.

An exemplary criterion includes a direction of a user gaze. For example, device 800 includes one or more front and/or rear facing cameras. Device 800 analyzes data collected by the one or more cameras to determine a direction of a user gaze. If device 800 determines that the direction of the user gaze is directed to the device, a criterion representing expressed user disinterest is not satisfied. If device 800 determines that the direction of the user gaze is not directed to the device, a criterion representing expressed user disinterest is satisfied. In some examples, if device 800 cannot determine a user gaze direction from camera data, the data is not considered in determining whether a user is disinterested in the virtual assistant session. In some examples, if device 800 cannot determine a user gaze direction from camera data (e.g., a user's face and/or gaze is not detected by one or more cameras), the data is considered to indicate that the user gaze is not directed to the device.

An exemplary criterion includes a duration for which a user gaze is determined not to be directed to the device. For example, device 800 collects data from one or more cameras and determines whether a user gaze is directed to the electronic device for a predetermined duration (e.g., 1, 2, 3, 4, 5, 6, 7, 8, 9, 10, etc. seconds). If device 800 determines that the user gaze is not directed to the device during the predetermined duration (e.g., camera data indicates that a user gaze is not directed to the device for any portion of the predetermined duration), a criterion representing expressed user disinterest is satisfied. In some examples, if device 800 determines that the user gaze is directed to the electronic device during the predetermined duration (e.g., camera data indicates that a user gaze is directed to the device for at least a portion of the predetermined duration), a criterion representing expressed user disinterest is not satisfied.

In some examples, determining whether a user gaze is directed to the electronic device for a predetermined duration includes collecting one or more samples of the user gaze during the predetermined duration. For example, during an exemplary predetermined duration of 6 seconds, device 800 collects four samples of camera data. By way of example, a first sample is collected at 0 seconds (e.g., a predetermined duration after which a final result is presented), a second sample is collected at 2 seconds, a third sample is collected at 4 seconds, and a fourth sample is collected at 6 seconds. In some examples, if each of the samples of camera data indicates that a user gaze is not directed to the device, a criterion representing expressed user disinterest is satisfied. In some examples, if at least one of the samples of camera data indicates that a user gaze is directed to the device, a criterion representing expressed user disinterest is not satisfied. In some examples, if only the first sample indicates that a user gaze is directed to the device, a criterion representing expressed user disinterest is satisfied.

An exemplary criterion includes a determination that user gaze towards the electronic device has discontinued. In some examples, determining that user gaze towards the electronic device has discontinued includes determining that the user gaze is directed to the device at a first time, and then determining that the user gaze is no longer directed to the device (e.g., for a predetermination duration) at a second time after the first time. In some examples, if device 800 determines that user gaze towards the electronic device has discontinued, a criterion representing expressed user disinterest is satisfied. In some examples, if device 800 does not determine that user gaze towards the electronic device has discontinued, a criterion representing expressed user disinterest is not satisfied.

An exemplary criterion includes whether a user face (or a portion thereof) is detected. For example, device 800 includes one or more cameras and device 800 analyzes data collected from the one or more cameras to determine whether a user face is detected (e.g., a particular user's face, a human face not particular to any user). In some examples, if device 800 does not detect a user face, a criterion representing expressed user disinterest is satisfied. In some examples, if device 800 detects a user face, a criterion representing expressed user disinterest is not satisfied.

An exemplary criterion includes a duration for which a user face is not detected. In some examples, determining a duration for which a user face is not detected is performed analogously to the above described techniques for determining a duration for which a user gaze is not directed to an electronic device.

An exemplary criterion includes that a user face is no longer detected by the electronic device. In some examples, determining that the user face is no longer detected by the electronic device is performed analogously to the above described techniques for determining that user gaze towards the electronic device has discontinued.

In some examples, a user chooses how he or she would like to deactivate the virtual assistant session based on face detection and/or gaze detection. For example, device 800 includes a user configurable setting that specifies either (1) to deactivate the virtual assistant session when a direction of a gaze is determined to not be directed to the device (e.g., for a predetermined duration) (e.g., even if a face is detected) or (2) to deactivate the virtual assistant session when a face is not detected (e.g., for a predetermined duration).

An exemplary criterion includes a lowering of the electronic device. For example, device 800 includes one or more sensors configured to detect motion of the electronic device (e.g., accelerometer(s), gyroscope(s), magnetometer(s), etc.). Device 800 analyzes data collected using the one or more sensors to determine a lowering of the device (e.g., a lowering of a device from near a user's face to near the user's waist, a lowering motion placing the device on a table, etc.). If device 800 determines the lowering, a criterion representing expressed user disinterest is satisfied. If device 800 does not determine a lowering, a criterion representing expressed user disinterest is not satisfied.

An exemplary criterion includes an orientation of the electronic device. For example, device 800 includes one or more sensors configured to detect an orientation of the device (e.g., gyroscopes(s), camera(s), proximity sensors(s), light sensor(s), etc.). Device 800 analyzes data collected using the one or more sensors to determine whether the electronic device is facing down (e.g., horizontal and a display facing down). If device 800 determines it is facing down, a criterion representing expressed user disinterest is satisfied. If device 800 determines it is not facing down, a criterion representing expressed user disinterest is not satisfied.

An exemplary criterion includes whether an electronic device is in an enclosed space. Exemplary enclosed spaces include a pocket, a bag, a drawer, a purse, etc. For example, device 800 includes one or more sensors configured to determine whether the electronic device is in an enclosed space (e.g., camera(s), light sensors(s), microphone(s), proximity sensor(s), etc.). Device 800 analyzes data collected from the one or more sensors to determine whether it is in an enclosed space. Any technique, currently known or later developed, for determining whether an electronic device is in an enclosed space may be employed. For example, device 800 uses proximity sensor data indicating the presence of an object very close to the device (e.g., touching the device, less than 2 cm away from the device, etc.) in conjunction with light sensor data indicating a low level of light to determine that the device is in an enclosed space. If device 800 determines that it is in an enclosed space, a criterion representing expressed user disinterest is satisfied. If device 800 determines that it is not in an enclosed space, a criterion representing expressed user disinterest is not satisfied.

An exemplary criterion includes whether a display of an electronic device is covered (e.g., by a user hand). For example, device 800 includes one or more sensors configured to determine whether a display of the device is covered (e.g., camera(s), light sensors(s), microphone(s), proximity sensor(s), etc.). Device 800 analyzes data collected from the one or more sensors to determine whether its display is covered. For example, device 800 uses front-facing light sensor data indicating that a low level of light (or no light) is detected and/or front facing proximity sensor data indicating that an object is touching the display of the device to determine that the display is covered. If device 800 determines that its display is covered, a criterion representing expressed user disinterest is satisfied. If device 800 determines that its display is not covered, a criterion representing expressed user disinterest is not satisfied.

In some examples, device 800 determines whether the user is disinterested in the virtual assistant session for a first predetermined duration (e.g., 15 seconds, 30 seconds, 45 seconds, 1 minute, etc.). For example, device 800 determines whether the user is disinterested in the virtual assistant session for a first predetermined duration after the time at which a final result for the virtual assistant session is presented (e.g., time T3). In some examples, if device 800 determines that the user is disinterested in the virtual assistant session during the first predetermined duration, device 800 automatically deactivates the virtual assistant session (e.g., when user disinterest is determined). In some examples, if device 800 does not determine that the user is disinterested in the virtual assistant session during the first predetermined duration (e.g., none of the above criteria representing expressed user disinterest is determined to be satisfied), device 800 forgoes automatically deactivating the virtual assistant session (e.g., until the time defined by a device setting) and device 800 ceases determining whether the user is disinterested in the virtual assistant session (e.g., ceases sampling camera data).

Accordingly, in some examples, if device 800 does not determine user disinterest in a virtual assistant session during the first predetermined duration, device 800 resorts to a default behavior of not automatically deactivating the virtual assistant session (e.g., until the time defined by a device setting). This may provide the advantage of saving battery power and processing power otherwise consumed by determining whether the user is disinterested in the virtual assistant session (e.g., for longer than the first predetermined duration). This may also improve device usability by continuing execution of a virtual assistant session when the user is engaged with it (e.g., because if user disinterest is not determined during the first predetermined duration, the user may likely be engaged with the virtual assistant session).

In some examples, determining that a user is engaged with the virtual assistant session prevents automatic deactivation of the virtual assistant session (e.g., until a time defined by a device setting). For example, if device 800 determines that the user is engaged with the virtual assistant session during the first predetermined duration (and before time T4 at which the virtual assistant deactivates due to determining user disinterest), device 800 resorts to the default behavior of not automatically deactivating the virtual assistant session.

In some examples, if device 800 determines that the user is engaged with the virtual assistant session during the first predetermined duration, device 800 continues to determine whether the user is disinterested in the virtual assistant session for a second predetermined duration (e.g., 15 seconds, 30 seconds, 45 seconds, etc.). For example, device 800 determines whether the user is disinterested in the virtual assistant session (e.g., according to the examples discussed above) for a second predetermined duration starting from a time at which user engagement was determined.

In some examples, determining whether the user is engaged with the virtual assistant session includes, determining based on data obtained using one or more sensors of an electronic device, whether one or more criteria representing expressed user engagement are satisfied. In some examples, determining whether the user is engaged with the virtual assistant session includes determining a probability of engagement with the virtual assistant session. For example, if one or more criteria representing expressed user engagement are satisfied, a probability of engagement with the virtual assistant session is increased. If one or more criteria representing expressed user engagement are not satisfied, the probability of engagement with the virtual assistant session is decreased. In some examples, the user is determined to be engaged with the virtual assistant session if the probability of engagement is greater than a predetermined threshold and/or if one or more criteria representing expressed user engagement are satisfied.

Exemplary criteria representing expressed user engagement are discussed below.

An exemplary criterion includes a direction of a user gaze. For example, analogous to the above discussed techniques, device 800 determines a direction of a user gaze. If device 800 determines that the direction of the user gaze is directed to the device (e.g., for a predetermined duration), a criterion representing expressed user engagement is satisfied. If device 800 determines that the direction of the user gaze is not directed to the device, a criterion representing expressed user engagement is not satisfied.

An exemplary criterion includes whether a user face (or a portion thereof) is detected. For example, analogous to the above discussed techniques, device 800 analyzes obtained camera data to determine whether a user's face is detected. If device 800 detects a user face, a criterion representing expressed user engagement is satisfied. If device 800 does not detect a user face, a criterion representing expressed user engagement is not satisfied.

An exemplary criterion includes whether a touch on the electronic device is detected. For example, device 800 determines whether a touch is detected on a touch sensitive display and/or on a touch sensitive button of the device. If device 800 detects a user touch, a criterion representing expressed user engagement is satisfied. If device 800 does not detect a user touch, a criterion representing expressed user engagement is not satisfied.

An exemplary criterion includes a raising of an electronic device (e.g., a raising motion lifting an electronic device to eye level). For example, device 800 determines whether data obtained using one or more motion sensors indicate a raising of the device. If the data indicate a raising, a criterion representing expressed user engagement is satisfied. If the data does not indicate a raising, a criterion representing expressed user engagement is not satisfied.

In the example depicted in FIG. 8B, device 800 determines that user 802 is disinterested in the virtual assistant session. For example, device 800 determines that user 802's gaze is not directed to device 800. Further, device 800 does not detect any indication that the user is engaged with the virtual assistant session, for instance.

In some examples, in accordance with determining that the user is disinterested in a virtual assistant session (e.g., prior to time T5 defined by a device setting), device 800 automatically deactivates the virtual assistant session at time T4 (e.g., prior to time T5). For example, at time T4, a home screen user interface replaces a virtual assistant user interface. In some examples, operating and displaying a home screen user interface requires less battery and processing power than operating a virtual assistant (e.g., displaying a virtual assistant user interface). Accordingly, as shown in FIG. 8B, battery and processing power are conserved by not operating the virtual assistant session between deactivation time and the deactivation time defined by the device setting (e.g., between T4 and T5).

In some examples, in accordance with determining that the user is disinterested in a virtual assistant session (e.g., prior to a time defined by a device setting), device 800 displays an affordance indicating that the virtual assistant session will be deactivated. For example, device 800 displays an affordance on display 804 for a predetermined duration (e.g., 1, 2, 3, 4, 5, 6, etc. seconds). During the predetermined duration, if a user interacts with the affordance (e.g., touches it and/or clicks it with a mouse cursor), deactivation of the virtual assistant session is forgone. For example, device 800 resorts to a default behavior of not deactivating the virtual assistant session (e.g., until time T5 defined by a device setting). If a user does not interact with the affordance, device 800 automatically deactivates the virtual assistant session at the end of the predetermined duration. Accordingly, in some examples, a displayed affordance provides a visual indication that deactivation is imminent and a user interacts with the affordance to prevent deactivation.

In some examples, in accordance with not determining that the user is disinterested in the virtual assistant session, device 800 automatically deactivates the virtual assistant session at the time defined by the device setting (e.g., at time T5).

In some examples, the context of an electronic device affects whether and/or how a virtual assistant session is deactivated. For example, if a navigation application was executing when the virtual assistant was initiated, it may be undesirable for a virtual assistant user interface to replace a user interface associated with the navigation application for an extended duration. This may be because the user wishes to see navigation instructions while driving. Accordingly, in some examples, if the navigation application was executing when the virtual assistant session was initiated, the virtual assistant session automatically deactivates a short duration after a final result is presented.

Exemplary device contexts and how the device contexts affect virtual assistant deactivation are discussed below.

As discussed, an exemplary device context includes an application context. For example, device 800 determines whether a predetermined application is executing on device 800 when the virtual assistant session is initiated. If the predetermined application is executing, a virtual assistant session is automatically deactivated a short duration (e.g., 1, 2, 3, 4, 5, or 6 seconds) after a final result is presented. If the predetermined application is not executing, in some examples, the device determines whether to deactivate the virtual assistant session according to any of the techniques discussed herein. In some examples, the predetermined application is an application configured to provide navigation services (e.g., a maps application).

An exemplary device context includes whether the device is paired to an external electronic device. For example, device 800 determines whether it is paired to an external electronic device through a wired or wireless communication medium (e.g., Bluetooth®, Wi-Fi, etc.). If device 800 is paired to an external electronic device, a virtual assistant session is automatically deactivated a short duration (e.g., 1, 2, 3, 4, 5, or 6 seconds) after a final result is presented. In some examples, an electronic device being paired to an external electronic device (e.g., a Bluetooth® enabled vehicle console) indicates that the user is in a vehicle, and may not wish to be disturbed by an initiated virtual assistant session. Accordingly, in some examples, if device 800 is paired to an external electronic device, device 800 automatically deactivates the virtual assistant session shortly after a final result is presented.

An exemplary device context includes a device mode and/or setting. For example, device 800 determines whether it is in a "do not disturb mode" (e.g., a device mode where audio and/or haptic output notifying a user about incoming communications is limited). If device 800 is in the "do not disturb" mode, device 800 automatically deactivates a virtual assistant session a short duration (e.g., 1, 2, 3, 4, 5, or 6 seconds) after a final result is presented.

As another example, device 800 determines whether it is in a "low power mode" (e.g., a mode configured to save battery power). In some examples, device 800 enters a low power mode (e.g., by user request) if the battery level of device 800 falls below a predefined level (e.g., below 20%, 10%, 5%, etc.). If device 800 determines that it is in a low power mode, device 800 automatically deactivates a virtual assistant session a short duration (e.g., 1, 2, 3, 4, 5, or 6 seconds) after a final result is presented. In this manner, if battery level is low, device 800 automatically deactivates an initiated virtual assistant session shortly after request completion to save battery power.

It is to be understood that the above described contexts are merely exemplary, and in some examples, other device contexts are considered in determining whether and/or how to deactivate a virtual assistant sessions. For example, device 800 may consider its location, a current time, its speed of movement, its device type (e.g., phone, watch, speaker, vehicle console, etc.), whether it was locked (e.g., via a passcode) when the virtual assistant session was initiated, whether it was outputting audio when the virtual assistant session was initiated, a domain of a result presented by the virtual assistant session, and/or a type of an external electronic device paired with it in determining whether and/or how to deactivate a virtual assistant session.

In some examples, device 800 determines whether one or more of the above described contexts satisfy a predetermined condition (e.g., a predetermined location, a predetermined time, a predetermined device type, a predetermined domain, etc.). If the context satisfies the predetermined condition, the virtual assistant session operates according to a first default behavior (e.g., automatically deactivating a short duration (e.g., 1, 2, 3, 4, 5, or 6 seconds) after a final result is presented). In some examples, device 800 determines whether to override the first default behavior according to the techniques discussed herein. If the context does not satisfy the predetermined condition, the virtual assistant session operates according to a second default behavior (e.g., not automatically deactivating until a time defined by a device setting). In some examples, device 800 determines whether to override the second default behavior according to the techniques discussed herein.

FIG. 8C depicts an exemplary timeline of operating a virtual assistant session according to a default behavior of automatically deactivating a virtual assistant session a predetermined duration (e.g., a short duration) after a time at which a final result is presented. As discussed, deactivating the virtual assistant session according to the predetermined duration may be undesirable if the user is still engaging with the virtual assistant session.

In FIG. 8C, at time T1 user 802 initiates a virtual assistant session by providing input via an external electronic device (e.g., a press of a button on wireless headset 806). Device 800 determines that the input is a second type of input, and operates the virtual assistant session according to a default behavior of automatically deactivating a virtual assistant session a predetermined duration after a time at which a final result is presented.

At time T2, user 802 provides a request to the virtual assistant session (e.g., "What's the news today?"). The virtual assistant performs a task based on the user request and presents a final result at time T3. For example, the virtual assistant session provides audio output "Here's some news" and displays one or more news articles (e.g., on display 804) at time T3.

User 802 is engaged with the virtual assistant session after the final result is presented. For example, as shown, a direction of user 802's gaze is directed to device 800 (e.g., because user 802 is reading news articles). However, due to the default behavior, device 800 automatically deactivates the virtual assistant session at time T4. Time T4 is predetermined duration (e.g., 3, 4, 5, 6, etc. seconds) after time T3 associated with the presentation of the final result. For example, device 800 replaces a virtual assistant user interface (containing news articles) with a home screen user interface at time T4.

As shown, such default behavior may be undesirable, as the virtual assistant session deactivates despite the user being engaged with the virtual assistant session. Accordingly, in some examples, it can be desirable to forgo automatically deactivating the virtual assistant session.

FIG. 8D illustrates an exemplary timeline for forgoing automatically deactivating a virtual assistant session. In FIG.

8D, a default behavior of automatically deactivating a virtual assistant session a predetermined duration after a final result is presented is overridden based on determining that the user is engaged with the virtual assistant session.

In FIG. 8D, at time T1, user 802 initiates a virtual assistant session by providing input via an external electronic device (e.g., a press of a button on wireless headset 806). The input is the second type of input. Accordingly, the default behavior is to deactivate the virtual assistant session a predetermined duration after which a final result is presented (e.g., at time T4).

At time T2, user 802 provides a request to the virtual assistant session (e.g., "What's the news today?"). The virtual assistant performs a task based on the user request and presents a final result at time T3. For example, the virtual assistant session provides audio output "Here's some news" and displays one or more news articles. As discussed below, device 800 then determines whether the user is engaged with the virtual assistant session to determine whether to override the default behavior of automatically deactivating the virtual assistant session shortly after request completion.

In some examples, device 800 determines whether the user is engaged with the virtual assistant session as soon as a final result is presented. In some examples, device 800 determines whether the user is engaged with the virtual assistant session a predetermined duration (e.g., 1, 2, 3, 4, 5, 6 seconds) after a time when a final result is presented.

In some examples, device 800 determines whether the user is engaged with the virtual assistant session in accordance with determining that the type of the user input for initiating the virtual assistant session is the second type. For example, as discussed, the second type of input is associated with the default behavior of automatically deactivating the virtual assistant session shortly after request completion. Accordingly, device 800 determines whether the user is engaged with the virtual assistant session to determine whether to override the default behavior (e.g., by forgoing automatically deactivating the virtual assistant session shortly after request completion).

In the present example, device 800 determines that user 802 is engaged with the virtual assistant session (e.g., prior to time T4 at which the virtual assistant session would automatically deactivate).

Determining whether a user is engaged with the virtual assistant session is performed according to any of the above discussed techniques. For example, device 800 determines that the user is engaged with the virtual assistant session if one or more criteria representing expressed user engagement are satisfied. For example, as shown in FIG. 8D, device 800 determines that user 802 is engaged with the virtual assistant session because user 802's gaze is directed to device 800 (e.g., because user 802 is reading news articles).

In some examples, in accordance with determining that a user is engaged with a virtual assistant session (e.g., prior to time T4), device 800 forgoes automatically deactivating the virtual assistant session at time T4. For example, as shown, a virtual assistant user interface remains displayed on display 804 at time T4. In this manner, device usability is improved by forgoing automatically deactivating a virtual assistant session when a user is engaged with it.

In some examples, in accordance with forgoing automatically deactivating the virtual assistant session at time T4, device 800 determines whether a user is disinterested in the virtual assistant session (e.g., according to any of the above discussed techniques). For example, if after time T4, user 802 becomes disinterested in the virtual assistant session (e.g., user 802 looks away from device 800), device 800 automatically deactivates the virtual assistant session when the user disinterest is detected (e.g., when or shortly after user 802 looks away).

In some examples, in accordance with forgoing automatically deactivating the virtual assistant session at time T4, device 800 forgoes automatically deactivating the virtual assistant session (e.g., until a time defined by a device setting).

In some examples, in accordance with not determining that a user is engaged with the virtual assistant session prior to time T4, device 800 automatically deactivates the virtual assistant session at time T4. For example, if device 800 determines that none of the above described criteria representing expressed user engagement is satisfied prior to time T4, device 800 automatically deactivates the virtual assistant session at time T4.

Figure 9:
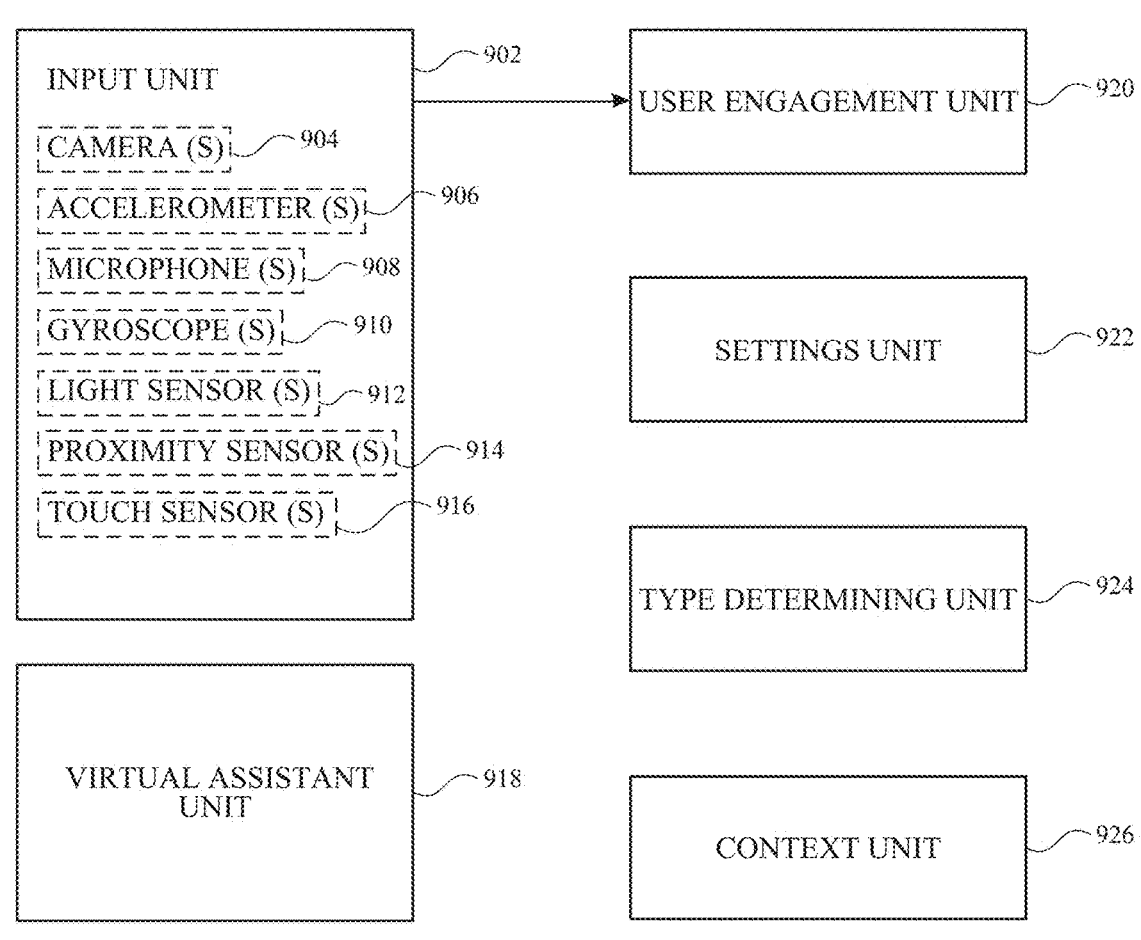
FIG. 9 illustrates a block diagram of a system configured to operate a digital assistant session according to various examples.

FIG. 9 illustrates a block diagram of a system configured to operate a virtual assistant session according to various examples. In some examples, system 900 is implemented on a standalone computer system (e.g., any of devices 104, 106, 200, 400, 600, or 800). In some examples, system 900 is distributed across multiple devices. For example, some of the components and functions of system 900 are divided into a server portion and a client portion, where the client portion resides on one or more user devices (e.g., devices 104, 106, 200, 400, 600, or 800) and communicates with the server portion (e.g., server system 108) through one or more networks, e.g., as shown in FIG. 1.

The respective functions of each of the blocks of FIG. 9 discussed below are, optionally, implemented by hardware, software, or a combination of hardware and software to carry out the principles of the examples described herein. Further, it should be noted that system 900 is only one example of a system for deactivating a virtual assistant session and system 900 can have more or fewer components than shown, can combine two or more components, or can have a different configuration or arrangement of the components. Further, although the below discussion describes functions being performed at a single component of system 900, it is to be understood that such functions can be performed at other components of system 900 and that such functions can be performed at more than one component of system 900.

System 900 includes input unit 902, virtual assistant unit 918, user engagement unit 920, settings unit 922, type determining unit 924, and context unit 926. In some examples, the components of system 900 include instructions for automatically deactivating a virtual assistant session and for foregoing automatically deactivating a virtual assistant session described in FIGS. 8B and 8D above. In some examples, the components of system 900 include instructions for performing the operations of process 1000 (FIGS. 10A-B), described below.

Input unit 902 includes various input devices, such as one or more cameras 904, one or more accelerometers 906, one or more microphones 908, one or more gyroscopes 910, one or more light sensors 912, one or more proximity sensors 914, and/or one or more touch sensors 916 (e.g., a touch sensitive button, a touch sensitive display screen, etc.). The depicted input devices are merely exemplary, and many other types of input devices can be included in input unit 902.

Inputs respectively collected by the various input devices are provided to, for instance, user engagement unit 920 and virtual assistant unit 918. As discussed below, based on input from input unit 902, user engagement unit 920 and/or virtual assistant unit 918 determine whether to deactivate a virtual assistant session according to the techniques discussed herein.

Virtual assistant unit 918 is configured to operate a virtual assistant session according to any of the techniques discussed herein. For example, virtual assistant unit 918 provides the functionalities discussed above with respect to FIGS. 7A-C. In some examples, virtual assistant unit 918 initiates a virtual assistant session responsive to receiving user input. In some examples, virtual assistant unit 918 automatically deactivates a virtual assistant session (e.g., based on a determination from user engagement unit 920 to automatically deactivate a virtual assistant session).

User engagement unit 920 determines whether a user is engaged with a virtual assistant session according to any of the techniques discussed herein. For example, user engagement unit 920 determines whether one or more criteria representing expressed user engagement are satisfied and determines whether one or more criteria representing expressed user disinterest are satisfied. In some examples, user engagement unit 920 determines to automatically deactivate a virtual assistant session (e.g., at a time) according to any of the examples discussed herein. In some examples, user engagement unit 920 determines to forgo automatically deactivating a virtual assistant session (e.g., at a time) according to any of the examples discussed herein.

In some examples, user engagement unit 920 includes a neural network and/or is implemented using any suitable machine learning technique. For example, based on inputs respectively provided by input unit 902, settings unit 922, type determining unit 924, and/or context unit 926, a machine learning model determines whether and/or when to deactivate a virtual assistant session according to the examples herein. In some examples, the machine learning model is trained (e.g., over time) to determine whether and/or when to deactivate a virtual assistant session based on the respective inputs.

Settings unit 922 is configured to operate an electronic device according to device settings. For example, settings unit 922 is configured to accept user input specifying a device setting (e.g., a screen lock time) and to operate an electronic device according to the device setting. In some examples, settings unit 922 provides one or more device settings to user engagement unit 920 and user engagement unit 920 considers the one or more device settings in determining whether and/or when to deactivate a virtual assistant session according to the techniques discussed herein.

Type determining unit 924 is configured to determine a type of user input for initiating a virtual assistant session. For example, type determining unit 924 determines whether user input is a first type or a second type according to the examples herein. In some examples, type determining unit 924 provides a determined user input type to user engagement unit 920. User engagement unit 920 determines whether and/or when to deactivate the virtual assistant session based on the determined user input type according to the examples herein.

Context unit 926 is configured to determine a context of the electronic device according to the examples herein. For example, context unit 926 determines whether a predetermined application is executing when a virtual assistant is initiated. In some examples, context unit 926 provides one or more determined contexts to user engagement unit 920. User engagement unit 920 determines whether and/or when to deactivate the virtual assistant session based on the one or more determined contexts according to the examples herein.

5. Process for Automatically Deactivating a Virtual Assistant Session

Figure 10A:
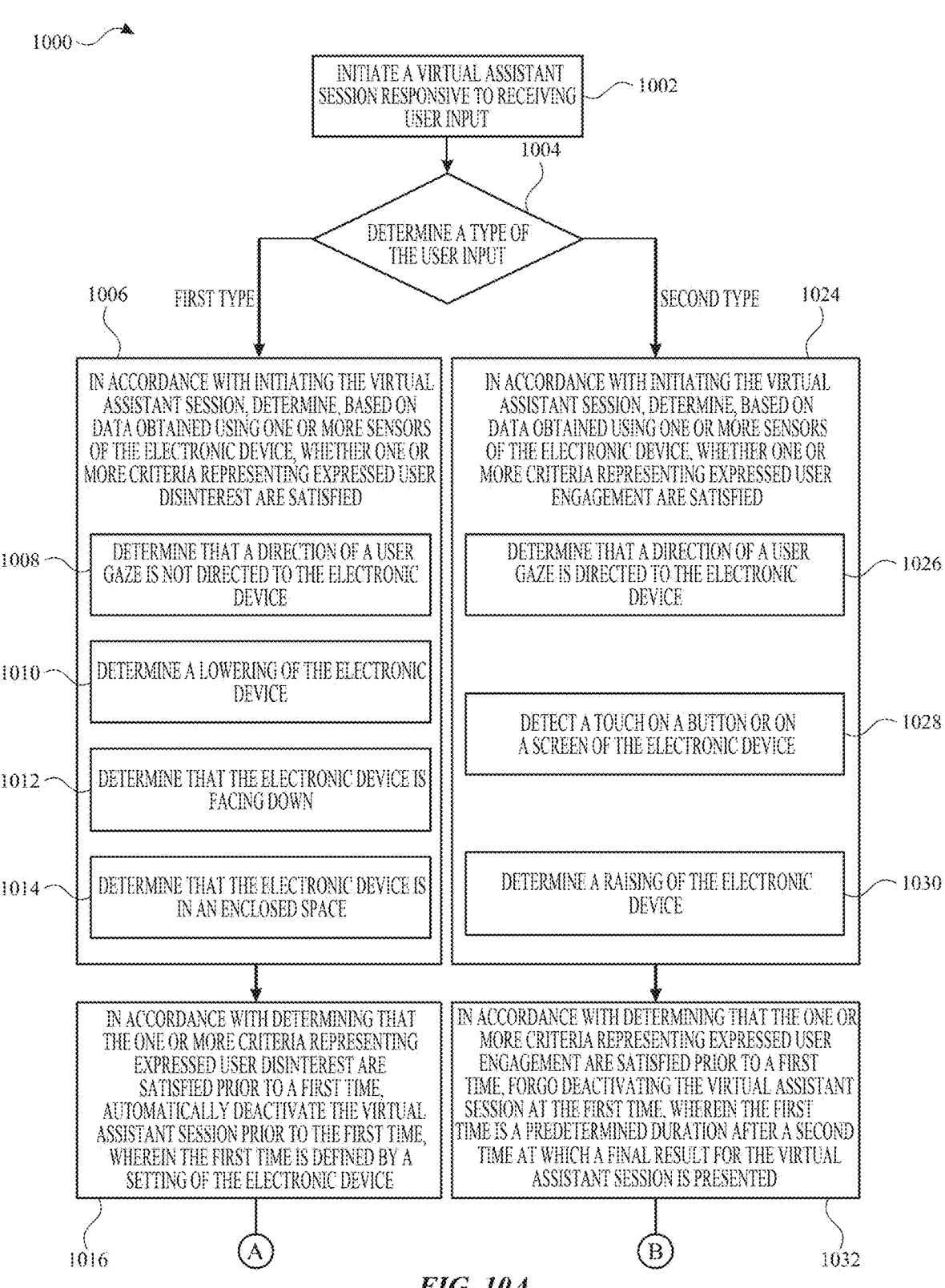
FIGS. 10A-10B illustrate a process for operating a digital assistant according to various examples.
Figure 10B:
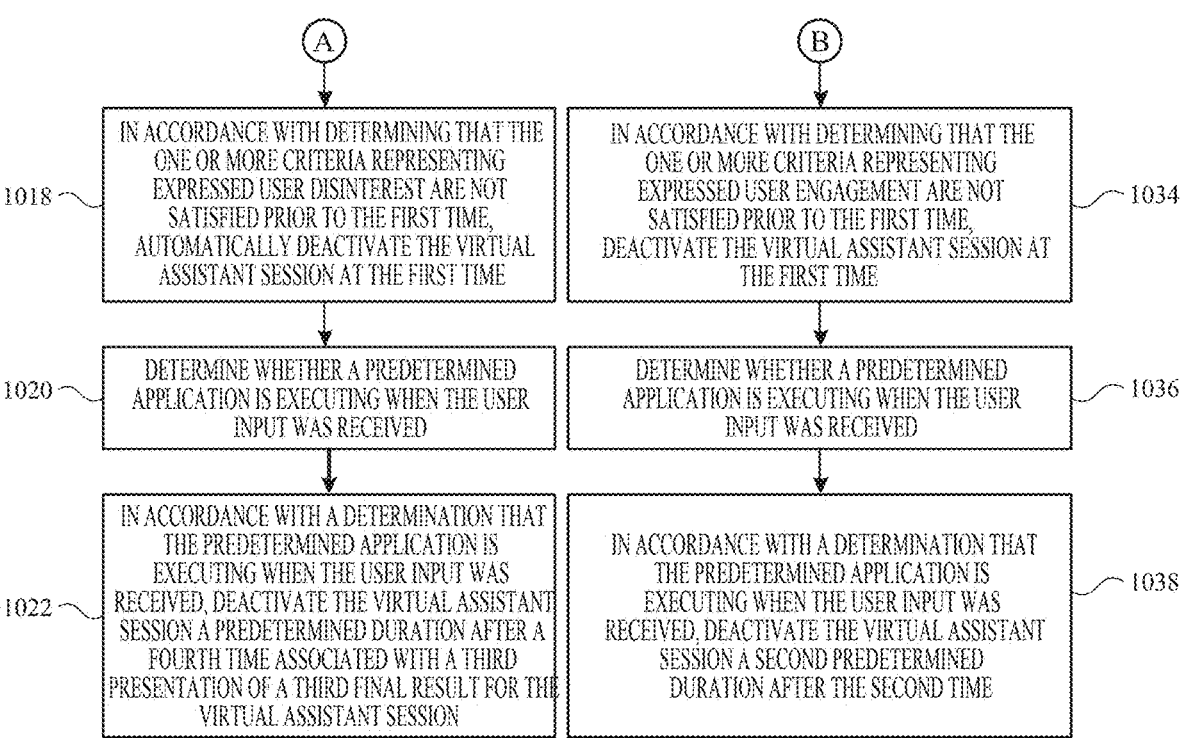

FIGS. 10A-10B illustrate process 1000 for operating a digital assistant according to various examples. Process 1000 is performed, for example, using one or more electronic devices implementing a digital assistant (e.g., device 800). In some examples, process 1000 is performed using a client-server system (e.g., system 100), and the blocks of process 1000 are divided up in any manner between the server (e.g., DA server 106) and a client device. In other examples, the blocks of process 1000 are divided up between the server and multiple client devices (e.g., a mobile phone and a smart watch). Thus, while portions of process 1000 are described herein as being performed by particular devices of a client-server system, it will be appreciated that process 1000 is not so limited. In other examples, process 1000 is performed using only a client device (e.g., user device 104) or only multiple client devices. In process 1000, some blocks are, optionally, combined, the order of some blocks is, optionally, changed, and some blocks are, optionally, omitted. In some examples, additional steps may be performed in combination with process 1000.

As described below, process 1000 includes initiating a virtual assistant session responsive to receiving user input (e.g., a button press or audio input such as "Hey Siri"). In some examples, as discussed, a type of the user input is determined and different strategies for deactivating the virtual assistant session are employed depending on the determined input type. For example, in accordance with determining that the input is a first type (e.g., a button press), it is determined whether one or more criteria representing expressed user disinterest are satisfied (e.g., whether a user gaze is not directed to an electronic device). In accordance with determining that the one or more criteria representing expressed user disinterest are satisfied prior to a first time defined by a setting of an electronic device (e.g., prior to a time specified by a screen lock setting), the virtual assistant session is automatically deactivated prior to the first time. In accordance with determining that the one or more criteria representing expressed user disinterest are not satisfied prior to the first time, the virtual assistant session is automatically deactivated at the first time (e.g., when a display screen powers off).

In some examples, in accordance with determining that the input is a second type (e.g., an audio input such as "Hey Siri"), it is determined whether one or more criteria representing expressed user engagement are satisfied (e.g., whether a user gaze is directed to the device). In accordance with determining that the one or more criteria representing expressed user engagement are satisfied prior to a second time a predetermined duration after a third time at which a final result for the virtual session is presented (e.g., prior to when the virtual assistant session would automatically deactivate), deactivation of the virtual assistant session at the second time is forgone. In accordance with determining that the one or more criteria representing expressed user engagement are not satisfied prior to the second time, the virtual assistant session is deactivated at the second time.

Determining, based on data obtained using one or more sensors of the electronic device, whether one or more criteria representing expressed user disinterest are satisfied (and/or whether one or more criteria representing expressed user engagement are satisfied) allows determination of whether a user is engaged with a virtual assistant session. Knowing whether a user is engaged allows intelligent decision making about whether to deactivate the virtual assistant session. For example, if the user is not engaged, a device can deactivate the virtual assistant session to save battery and processing power. As another example, if the user is engaged, the device can forgo deactivating the virtual assistant session so the user can continue interacting with the virtual assistant session (and so the virtual assistant session does not deactivate while the user is still interacting with it). In this manner, the user-device interface is made more efficient (e.g., by deactivating a virtual assistant session when a user is not engaged with it, by preventing deactivation of a virtual assistant session while the user is actively engaged with it, or by reducing user input to re-initiate an incorrectly deactivated virtual assistant session) which additionally, reduces power usage and improves battery life of the device by enabling the user to use the device more quickly and efficiently.

At block 1002 a virtual assistant session is initiated (e.g., by virtual assistant unit 918) responsive to receiving user input (e.g., from input unit 902). For example, as shown in FIG. 8B, a virtual assistant user interface including "How can I help you?" is displayed on display 804.

In some examples, initiating the virtual assistant session includes providing audio output. In some examples, initiating the virtual assistant session includes displaying a user interface associated with the virtual assistant session (e.g., on display 804).

At block 1004, a type of the user input is determined (e.g., by unit 924). As discussed, in some examples, different types of user input are associated with different default behaviors for deactivating the virtual assistant session which may be overridden. Accordingly, determining the type of the user input allows correct determination of a default behavior for deactivating the virtual assistant session, which in turn, allows correct determination of the strategy used to override the default behavior. In this manner, a virtual assistant session may be deactivated when a user is not engaged with it and may not be deactivated when the user is engaged with it, making the user-device interface more efficient as discussed above.

At block 1006, in accordance with initiating the virtual assistant session, it is determined, based on data obtained using one or more sensors of the electronic device (e.g., data from input unit 902), whether one or more criteria representing expressed user disinterest are satisfied (e.g., by unit 920).

In some examples, determining whether the one or more criteria representing expressed user disinterest are satisfied is performed in accordance with determining that the type of the user input is a first type (block 1004 FIRST TYPE). In some examples, the first type of user input includes input received via a physical button on the electronic device or via a virtual button on the electronic device.

In some examples, a first final result for the virtual assistant session is presented at a second time and determining whether the one or more criteria representing expressed user disinterest are satisfied is performed after the second time. For example, determining whether the one or more criteria representing expressed user disinterest is performed after time T3 in FIG. 8B.

Determining whether the one or more criteria representing expressed user disinterest are satisfied after the second time allows user disinterest to be determined at an appropriate time. For example, the user is likely interested in the virtual assistant session before the second time (e.g., when the virtual assistant session is presenting a result), so it may be unnecessary to determine whether the user is disinterested in the virtual assistant session before the second time. In this manner, consumption of battery and processing power to determine user disinterest at inappropriate times is prevented.

The below described techniques for determining whether one or more criteria representing expressed user disinterest are satisfied may allow for accurate determination that a user is disinterested in a virtual assistant session. In this manner, an electronic device can accurately determine to deactivate a virtual assistant session when a user is disinterested in it.

In some examples, the one or more criteria representing expressed user disinterest are satisfied in accordance with determining that a direction of a user gaze is not directed to the electronic device (e.g., by unit 920), as shown in block 1008.

In some examples, the one or more criteria representing expressed user disinterest are satisfied in accordance with determining a lowering of the electronic device (e.g., by unit 920), as shown in block 1010.

In some examples, the one or more criteria representing expressed user disinterest are satisfied in accordance with determining that the electronic device is facing down (e.g., by unit 920), as shown in block 1012.

In some examples, the one or more criteria representing expressed user disinterest are satisfied in accordance with determining that the electronic device is in an enclosed space (e.g., by unit 920), as shown in block 1014.

In some examples, the one or more criteria representing expressed user disinterest are determined to be satisfied if one or more of the respective determinations of blocks 1008, 1010, 1012, and 1014 are made.

At block 1016, in accordance with determining that the one or more criteria representing expressed user disinterest are satisfied prior to a first time (e.g., time T5 in FIG. 8B), the virtual assistant session is automatically deactivated prior to the first time (e.g., by unit 918 at time T4 in FIG. 8B).

In some examples, the first time is defined by a setting of the electronic device. In some examples, the setting of the electronic device is a user configurable setting associated with a screen lock time or a screen dimming time.

In some examples, deactivating the virtual assistant session includes ceasing the display of the user interface associated with the virtual assistant session. For example as shown in FIG. 8B, a virtual assistant user interface displaying a result is replaced with a home screen user interface.

In some examples, automatically deactivating the virtual assistant session prior to the first time is performed at a fifth time (e.g., time T4 in FIG. 8B), and automatically deactivating the virtual assistant session at the fifth time is performed further in accordance with not detecting a touch on a screen or on a button of the electronic device between a third time associated with a second presentation of a second final result for the virtual assistant session and the fifth time (e.g., between times T3 and T4 in FIG. 8B). In some examples, this advantageously prevents deactivation of a virtual assistant session if the user is determined to be engaged with the virtual assistant session (e.g., a user touch likely indicates engagement with the virtual assistant session).

At block 1018, in accordance with determining that the one or more criteria representing expressed user disinterest are not satisfied prior to the first time (e.g., by unit 920), the virtual assistant session is automatically deactivated at the first time (e.g., time T5 in FIG. 8B).

In some examples, it is determined (e.g., by unit 926) whether a predetermined application (e.g., a maps application) is executing when the user input was received, as shown in block 1020.

In some examples, in accordance with a determination that the predetermined application is executing when the user input was received, the virtual assistant session is deactivated a predetermined duration after a fourth time associated with a third presentation of a third final result for the virtual assistant session, as shown in block 1022.

In some examples, it can be undesirable for a virtual assistant user interface to disrupt the display of a user interface associated with certain applications (e.g., especially in examples where display of a virtual assistant user interface replaces display of a user interface associated with the application). For example, if the application is configured to provide navigation services (e.g., a maps application), it can be undesirable to replace such application's user interface with a virtual assistant user interface for an extended duration (e.g., because a user wishes to see navigation directions while driving, biking, running, etc.). Accordingly, deactivating a virtual assistant session in this manner improves user experience by allowing a device to quickly return to a desired application's user interface. User experience is further improved because the initiated virtual assistant can perform a user requested task and the effect of the initiated virtual assistant on displayed application user interfaces is minimized.

Returning to FIG. 10A, at block 1024, in accordance with initiating the virtual assistant session, it is determined (e.g., by unit 920), based on data obtained using one or more sensors of the electronic device, whether one or more criteria representing expressed user engagement are satisfied.

In some examples, determining whether the one or more criteria representing expressed user engagement are satisfied is performed in accordance with determining that the type of the user input is a second type (block 1004 SECOND TYPE). In some examples, the second type of user input includes input received from an external electronic device (e.g., headset 806) or audio input.

The below described techniques for determining whether one or more criteria representing expressed user engagement are satisfied may allow for accurate determination that a user is engaged with a virtual assistant session. In this manner, an electronic device can accurately determine to forgo deactivating the virtual assistant session when a user is engaged with it.

In some examples, the one or more criteria representing expressed user engagement are satisfied in accordance with determining that a direction of a user gaze is directed to the electronic device (e.g., by unit 920), as shown in block 1026.

In some examples, the one or more criteria representing expressed user engagement are satisfied in accordance with detecting a touch on a button or on a screen of the electronic device (e.g., by unit 920), as shown in block 1028.

In some examples, the one or more criteria representing expressed user engagement are satisfied in accordance with determining a raising of the electronic device (e.g., by unit 920), as shown in block 1030.

In some examples, the one or more criteria representing expressed user engagement are determined to be satisfied if one or more of the respective determinations of blocks 1026, 1028, and 1030 are made.

At block 1032, in accordance with determining that the one or more criteria representing expressed user engagement are satisfied prior to a first time (e.g., time T4 in FIG. 8D), deactivating the virtual assistant at the first time is forgone.

The first time is a predetermined duration after a second time at which a final result for the virtual assistant session is presented (e.g., time T3 in FIG. 8D). For example, as shown in FIG. 8D, at time T4, a virtual assistant user interface displaying a result remains displayed.

At block 1034, in accordance with determining that the one or more criteria representing expressed user engagement are not satisfied prior to the first time, the virtual assistant session is deactivated at the first time (e.g., by unit 918). In some examples, deactivating the virtual assistant session includes ceasing the display of the user interface associated with the virtual assistant session.

In some examples, it is determined (e.g., by unit 926) whether a predetermined application is executing when the user input was received, as shown in block 1036.

In some examples, in accordance with a determination that the predetermined application is executing when the user input was received, the virtual assistant session is deactivated (e.g., by unit 918) a second predetermined duration after the second time, as shown in block 1038.

The operations described above with reference to FIGS. 10A-10B are optionally implemented by components depicted in FIGS. 1-4, 6A-6B, 7A-7C, 8A-8D, and 9. For example, the operations of process 1000 may be implemented by, inter alia, virtual assistant unit 918 and user engagement unit 920. It would be clear to a person having ordinary skill in the art how other processes are implemented based on the components depicted in FIGS. 1-4, 6A-6B, and 7A-7C, 8A-8D, and 9.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve decision making about whether and/or when to deactivate a virtual assistant session. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to determine that a user is engaged with a virtual assistant session (e.g., through detection of the user's face). Accordingly, use of such personal information enables accurate determination of whether to deactivate a virtual assistant session based on determined user engagement. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of collecting and storing the user's facial characteristics, the present technology can be configured to allow users to select to "opt in" or "opt out" of participation in the collection of personal information data during registration for services or anytime thereafter. In another example, users can select not to provide data representing facial characteristics to an electronic device. In yet another example, users can select to limit the length of time data representing facial characteristics is maintained or entirely prohibit the collection and usage of data representing facial characteristics. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, it can be determined whether a user is engaged with a virtual assistant session based on non-personal information data or a bare minimum amount of personal information, such as the content being requested by the device associated with a user, other non-personal information such as an orientation and/or a raising or lowering of the device, or publicly available information.

What is claimed is:

1. A non-transitory computer-readable storage medium storing one or more programs, the one or more programs comprising instructions, which when executed by one or more processors of an electronic device with one or more sensors, cause the electronic device to:

initiate a virtual assistant session, wherein the virtual assistant session is initiated for at least a time period that includes a first time, a second time that is after the first time, a third time, and a fourth time that is after the third time;

while the virtual assistant session is initiated, detect, via the one or more sensors, sensor data; and in response to detecting, via the one or more sensors, the sensor data:

in accordance with a determination, based on the sensor data, that a set of one or more virtual assistant disinterest criteria is satisfied, wherein the set of one or more virtual assistant disinterest criteria includes a first criterion that is satisfied when a user is detected at the first time and when the user is not detected at the second time and a second criterion that is satisfied when a gaze of the user is directed to the electronic device at the third time and when the gaze of the user is not directed to the electronic device at the fourth time, deactivate the virtual assistant session at a fifth time; and in accordance with a determination, based on the sensor data, that the set of one or more virtual assistant disinterest criteria is not satisfied, forgo deactivating the virtual assistant session at the fifth time.

2. The non-transitory computer-readable storage medium of claim 1, wherein the user is detected at the first time when a face of the user is detected at the first time and wherein the user is not detected at the second time when the face of the user is not detected at the second time.

3. The non-transitory computer-readable storage medium of claim 1, wherein the sensor data is detected in response to initiating the virtual assistant session.

4. The non-transitory computer-readable storage medium of claim 1, wherein the one or more programs further comprise instructions, which when executed by the one or more processors, cause the electronic device to:

while the virtual assistant session is initiated, present a final result for the virtual assistant session, wherein the sensor data is detected in response to presenting the final result for the virtual assistant session.

5. The non-transitory computer-readable storage medium of claim 1, wherein the one or more programs further comprise instructions, which when executed by the one or more processors, cause the electronic device to:

while the virtual assistant session is initiated, present a final result for the virtual assistant session, wherein the sensor data is detected a predetermined duration after presenting the final result for the virtual assistant session.

6. The non-transitory computer-readable storage medium of claim 1, wherein the set of one or more virtual assistant disinterest criteria includes a third criterion that is satisfied when the gaze of the user is not directed to the electronic device for a predetermined duration.

7. The non-transitory computer-readable storage medium of claim 1, wherein the set of one or more virtual assistant disinterest criteria includes a third criterion that is satisfied when the user is not detected for a predetermined duration.

8. The non-transitory computer-readable storage medium of claim 1, wherein initiating the virtual assistant session includes displaying a virtual assistant user interface.

9. The non-transitory computer-readable storage medium of claim 8, wherein deactivating the virtual assistant session at the fifth time includes ceasing to display the virtual assistant user interface at the fifth time.

10. The non-transitory computer-readable storage medium of claim 8, wherein the fifth time is before a default time for deactivating the virtual assistant session, wherein the default time for deactivating the virtual assistant session is defined by a setting of the electronic device.

11. An electronic device, comprising:
one or more processors;
a memory;
one or more sensors; and
one or more programs, wherein the one or more programs are stored in the memory and configured to be executed by the one or more processors, the one or more programs including instructions for:

initiating a virtual assistant session, wherein the virtual assistant session is initiated for at least a time period that includes a first time, a second time that is after the first time, a third time, and a fourth time that is after the third time;

while the virtual assistant session is initiated, detecting, via the one or more sensors, sensor data; and in response to detecting, via the one or more sensors, the sensor data:

in accordance with a determination, based on the sensor data, that a set of one or more virtual assistant disinterest criteria is satisfied, wherein the set of one or more virtual assistant disinterest criteria includes a first criterion that is satisfied when a user is detected at the first time and when the user is not detected at the second time and a second criterion that is satisfied when a gaze of the user is directed to the electronic device at the third time and when the gaze of the user is not directed to the electronic device at the fourth time, deactivating the virtual assistant session at a fifth time; and in accordance with a determination, based on the sensor data, that the set of one or more virtual assistant disinterest criteria is not satisfied, forgoing deactivating the virtual assistant session at the fifth time.

12. The electronic device of claim 11, wherein the user is detected at the first time when a face of the user is detected at the first time and wherein the user is not detected at the second time when the face of the user is not detected at the second time.

13. The electronic device of claim 11, wherein the sensor data is detected in response to initiating the virtual assistant session.

14. The electronic device of claim 11, wherein the one or more programs further include instructions for:

while the virtual assistant session is initiated, presenting a final result for the virtual assistant session, wherein the sensor data is detected in response to presenting the final result for the virtual assistant session.

15. The electronic device of claim 11, wherein the one or more programs further include instructions for:

while the virtual assistant session is initiated, presenting a final result for the virtual assistant session, wherein the sensor data is detected a predetermined duration after presenting the final result for the virtual assistant session.

16. The electronic device of claim 11, wherein the set of one or more virtual assistant disinterest criteria includes a third criterion that is satisfied when the gaze of the user is not directed to the electronic device for a predetermined duration.

17. The electronic device of claim 11, wherein the set of one or more virtual assistant disinterest criteria includes a third criterion that is satisfied when the user is not detected for a predetermined duration.

18. The electronic device of claim 11, wherein initiating the virtual assistant session includes displaying a virtual assistant user interface.

19. The electronic device of claim 18, wherein deactivating the virtual assistant session at the fifth time includes ceasing to display the virtual assistant user interface at the fifth time.

20. The electronic device of claim 18, wherein the fifth time is before a default time for deactivating the virtual assistant session, wherein the default time for deactivating the virtual assistant session is defined by a setting of the electronic device.

21. A method, comprising:

at an electronic device with one or more processors, a memory, and one or more sensors:

initiating a virtual assistant session, wherein the virtual assistant session is initiated for at least a time period that includes a first time, a second time that is after the first time, a third time, and a fourth time that is after the third time;

while the virtual assistant session is initiated, detecting, via the one or more sensors, sensor data; and in response to detecting, via the one or more sensors, the sensor data:

in accordance with a determination, based on the sensor data, that a set of one or more virtual assistant disinterest criteria is satisfied, wherein the set of one or more virtual assistant disinterest criteria includes a first criterion that is satisfied when a user is detected at the first time and when the user is not detected at the second time and a second criterion that is satisfied when a gaze of the user is directed to the electronic device at the third time and when the gaze of the user is not directed to the electronic device at the fourth time, deactivating the virtual assistant session at a fifth time; and in accordance with a determination, based on the sensor data, that the set of one or more virtual assistant disinterest criteria is not satisfied, forgoing deactivating the virtual assistant session at the fifth time.

22. The method of claim 21, wherein the user is detected at the first time when a face of the user is detected at the first time and wherein the user is not detected at the second time when the face of the user is not detected at the second time.

23. The method of claim 21, wherein the sensor data is detected in response to initiating the virtual assistant session.

24. The method of claim 21, further comprising:

while the virtual assistant session is initiated, presenting a final result for the virtual assistant session, wherein the sensor data is detected in response to presenting the final result for the virtual assistant session.

25. The method of claim 21, further comprising:

while the virtual assistant session is initiated, presenting a final result for the virtual assistant session, wherein the sensor data is detected a predetermined duration after presenting the final result for the virtual assistant session.

26. The method of claim 21, wherein the set of one or more virtual assistant disinterest criteria includes a third criterion that is satisfied when the gaze of the user is not directed to the electronic device for a predetermined duration.

27. The method of claim 21, wherein the set of one or more virtual assistant disinterest criteria includes a third criterion that is satisfied when the user is not detected for a predetermined duration.

28. The method of claim 21, wherein initiating the virtual assistant session includes displaying a virtual assistant user interface.

29. The method of claim 28, wherein deactivating the virtual assistant session at the fifth time includes ceasing to display the virtual assistant user interface at the fifth time.

30. The method of claim 28, wherein the fifth time is before a default time for deactivating the virtual assistant session, wherein the default time for deactivating the virtual assistant session is defined by a setting of the electronic device.

* * * * *